United States Patent
Zhang et al.

(10) Patent No.: US 11,868,862 B2
(45) Date of Patent: Jan. 9, 2024

(54) SEMISUPERVISED AUTOENCODER FOR SENTIMENT ANALYSIS

(71) Applicant: The Research Foundation for The State University of New York, Binghamton, NY (US)

(72) Inventors: Zhongfei Zhang, Vestal, NY (US); Shuangfei Zhai, Binghamton, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 78 days.

(21) Appl. No.: 17/555,493

(22) Filed: Dec. 19, 2021

(65) Prior Publication Data

US 2022/0114405 A1 Apr. 14, 2022

Related U.S. Application Data

(63) Continuation of application No. 15/838,000, filed on Dec. 11, 2017, now Pat. No. 11,205,103.

(Continued)

(51) Int. Cl.
| | |
|---|---|
| *G06N 20/10* | (2019.01) |
| *G06N 3/084* | (2023.01) |
| *G06F 18/2411* | (2023.01) |
| *G06F 18/214* | (2023.01) |
| *G06N 3/045* | (2023.01) |
| *G06N 3/047* | (2023.01) |

(Continued)

(52) U.S. Cl.
CPC ............ *G06N 20/10* (2019.01); *G06F 18/214* (2023.01); *G06F 18/2411* (2023.01); *G06N 3/045* (2023.01); *G06N 3/047* (2023.01); *G06N 3/084* (2013.01); *G06N 7/01* (2023.01); *G06V 10/764* (2022.01); *G06V 10/774* (2022.01)

(58) Field of Classification Search
CPC .......... G06N 20/10; G06N 3/047; G06N 7/01; G06N 3/045; G06N 3/084; G06V 10/774; G06V 10/764; G06F 18/2411; G06F 18/214

See application file for complete search history.

(56) References Cited

U.S. PATENT DOCUMENTS

| | | | | |
|---|---|---|---|---|
| 8,285,719 | B1 * | 10/2012 | Long | G06F 16/285 |
| | | | | 707/739 |
| 8,527,432 | B1 * | 9/2013 | Guo | G06N 20/10 |
| | | | | 706/14 |
| 2003/0046277 | A1 * | 3/2003 | Jackson | G06F 16/334 |

OTHER PUBLICATIONS

Chen, Minmin, et al. "Marginalized denoising autoencoders for domain adaptation." arXiv preprint arXiv:1206.4683 (2012). (Year: 2012).*

(Continued)

*Primary Examiner* — Eric Nilsson
(74) *Attorney, Agent, or Firm* — Hoffberg & Associates; Steven M. Hoffberg

(57) ABSTRACT

A method of modelling data, comprising: training an objective function of a linear classifier, based on a set of labeled data, to derive a set of classifier weights; defining a posterior probability distribution on the set of classifier weights of the linear classifier; approximating a marginalized loss function for an autoencoder as a Bregman divergence, based on the posterior probability distribution on the set of classifier weights learned from the linear classifier; and classifying unlabeled data using the autoencoder according to the marginalized loss function.

20 Claims, 2 Drawing Sheets

Related U.S. Application Data

(60) Provisional application No. 62/432,070, filed on Dec. 9, 2016.

(51) Int. Cl.
  *G06N 7/01* (2023.01)
  *G06V 10/764* (2022.01)
  *G06V 10/774* (2022.01)

(56) References Cited

OTHER PUBLICATIONS

Socher, Richard, et al. "Semi-supervised recursive autoencoders for predicting sentiment distributions." Proceedings of the 2011 conference on empirical methods in natural language processing. 2011. (Year: 2011).*

* cited by examiner

SEMISUPERVISED AUTOENCODER FOR SENTIMENT ANALYSIS

CROSS REFERENCE TO RELATED APPLICATIONS

The present application is a Continuation of U.S. patent application Ser. No. 15/838,000, filed Dec. 11, 2017, now U.S. Pat. No. 11,205,103, issued Dec. 21, 2021, which is a non-provisional of, and claims benefit of priority from, U.S. Provisional Patent Application No. 62/432,070, field Dec. 9, 2016, the entirety of which are expressly incorporated herein by reference.

GOVERNMENT LICENSE RIGHTS

This invention was made with government support under CCF-1017828 awarded by the National Science Foundation. The government has certain rights in the invention.

BACKGROUND OF THE INVENTION

In machine learning, documents are usually represented as Bag of Words (BoW), which nicely reduces a piece of text with arbitrary length to a fixed length vector. Despite its simplicity, BoW remains the dominant representation in many applications including text classification. There has also been a large body of work dedicated to learning useful representations for textual data (Turney and Pantel 2010; Blei, Ng, and Jordan 2003; Deerwester et al. 1990; Mikolov et al. 2013; Glorot, Bordes, and Bengio 2011). By exploiting the co-occurrence pattern of words, one can learn a low dimensional vector that forms a compact and meaningful representation for a document. The new representation is often found useful for subsequent tasks such as topic visualization and information retrieval. The application of one of the most popular representation learning methods, namely autoencoders (Bengio 2009), is applied to learn task-dependent representations for textual data. The present model naturally incorporates label information into its objective function, which allow the learned representation to be directly coupled with the task of interest.

See, U.S. Pat. Nos. 5,116,061; 5,405,266; 6,199,034; 6,502,213; 6,507,829; 6,539,396; 6,549,899; 6,571,722; 6,687,339; 6,963,841; 7,047,221; 7,280,964; 7,289,964; 7,409,372; 7,415,445; 7,529,719; 7,613,633; 7,617,016; 7,647,243; 7,711,747; 7,949,186; 7,970,652; 7,970,739; 8,073,818; 8,108,204; 8,128,520; 8,176,011; 8,194,986; 8,209,080; 8,266,098; 8,332,278; 8,332,279; 8,341,028; 8,352,328; 8,355,956; 8,374,881; 8,379,920; 8,385,971; 8,386,574; 8,392,273; 8,447,120; 8,459,999; 8,463,045; 8,465,425; 8,489,585; 8,489,589; 8,498,991; 8,503,791; 8,509,537; 8,510,257; 8,520,979; 8,538,955; 8,539,000; 8,546,302; 8,548,951; 8,566,349; 8,606,021; 8,645,123; 8,729,502; 8,755,837; 8,768,313; 8,787,682; 8,788,258; 8,798,362; 8,805,110; 8,805,117; 8,824,742; 8,825,669; 8,831,358; 8,837,773; 8,849,259; 8,855,372; 8,855,421; 8,855,712; 8,873,813; 8,873,853; 8,879,813; 8,880,563; 8,885,901; 8,886,206; 8,891,908; 8,892,488; 8,893,024; 8,917,169; 8,929,877; 8,972,316; 8,977,573; 9,002,085; 9,008,391; 9,008,724; 9,020,806; 9,043,329; 9,056,368; 9,058,580; 9,072,496; 9,075,796; 9,082,047; 9,092,734; 9,104,915; 9,104,946; 9,105,077; 9,117,174; 9,128,116; 9,171,213; 9,171,578; 9,190,026; 9,195,941; 9,202,178; 9,204,038; 9,208,205; 9,208,384; 9,232,205; 9,235,812; 9,244,924; 9,251,465; 9,271,133; 9,275,310; 9,280,560; 9,280,709; 9,298,818; 9,317,498; 9,317,533; 9,320,967; 9,323,745; 9,326,716; 9,336,498; 9,345,965; 9,355,441; 9,355,635; 9,363,483; 9,373,163; 9,392,431; 9,396,409; 9,403,092; 9,406,021; 9,418,283; 9,424,337; 9,430,563; 9,460,076; 9,460,557; 9,471,851; 9,477,750; 9,483,704; 9,484,015; 9,484,016; 9,492,886; 9,498,159; 9,501,470; 9,502,038; 20010033639; 20020088387; 20020120619; 20030031987; 20030182111; 20030216228; 20030229497; 20040243463; 20050069848; 20050089828; 20050187071; 20060041448; 20070067293; 20070134631; 20070141541; 20070156594; 20070198120; 20070217676; 20070239643; 20070255965; 20070294223; 20080004864; 20080062625; 20080077907; 20080249999; 20090098958; 20090152391; 20090174142; 20090253106; 20090276291; 20090276457; 20100023421; 20100046842; 20100048242; 20100100607; 20100106486; 20100116658; 20100129621; 20100131260; 20100162135; 20100261526; 20100274433; 20100296728; 20110034176; 20110078191; 20110093449; 20110103682; 20110119264; 20110143811; 20110184832; 20110193290; 20110196859; 20110212717; 20110219056; 20110278277; 20110280447; 20110284512; 20120012624; 20120033874; 20120033949; 20120052930; 20120078873; 20120089615; 20120095952; 20120114249; 20120123780; 20120179662; 20120190386; 20120190404; 20120213426; 20120233127; 20120233128; 20120243789; 20120258776; 20120262290; 20120269439; 20120310627; 20120317102; 20120330921; 20130011062; 20130022280; 20130044944; 20130063613; 20130151232; 20130163860; 20130178952; 20130178953; 20130183022; 20130204885; 20130211229; 20130216983; 20130217440; 20130223724; 20130232159; 20130251340; 20130260346; 20130262458; 20130263181; 20130273968; 20130282747; 20130295894; 20140006013; 20140006318; 20140006321; 20140006323; 20140025382; 20140079297; 20140080428; 20140080560; 20140095144; 20140105509; 20140106878; 20140113704; 20140133759; 20140135102; 20140135104; 20140156567; 20140156569; 20140169686; 20140193087; 20140201126; 20140214417; 20140214732; 20140219566; 20140220527; 20140222425; 20140222783; 20140236577; 20140236578; 20140248590; 20140250034; 20140267301; 20140279726; 20140294360; 20140317033; 20140317038; 20140328570; 20140330552; 20140337271; 20140337272; 20140344103; 20140358745; 20150003701; 20150007632; 20150011194; 20150022675; 20150052084; 20150055783; 20150055854; 20150058019; 20150066496; 20150100530; 20150110348; 20150110368; 20150110370; 20150110372; 20150119721; 20150120788; 20150138322; 20150169644; 20150170004; 20150170085; 20150186497; 20150189239; 20150193523; 20150199617; 20150206070; 20150242762; 20150257238; 20150269123; 20150278254; 20150278441; 20150286853; 20150286884; 20150286885; 20150304797; 20150330640; 20150339288; 20150347489; 20150356401; 20150358525; 20150363196; 20150363197; 20150363294; 20150366219; 20150370782; 20150371149; 20150378986; 20160004911; 20160012688; 20160025028; 20160042252; 20160042253; 20160048587; 20160055760; 20160059412; 20160065534; 20160071010; 20160071117; 20160073969; 20160077547; 20160078880; 20160092751; 20160092791; 20160094964; 20160100057; 20160110630; 20160111130; 20160117574; 20160117589; 20160125048; 20160125243; 20160125572; 20160125635; 20160140300; 20160140425; 20160140434; 20160147763; 20160147871; 20160148074; 20160154882; 20160155016; 20160162467; 20160162758; 20160171336; 20160171429; 20160171707; 20160171827; 20160171835; 20160180234; 20160189000; 20160199215; 20160203209; 20160210556; 20160217157; 20160224622; 20160232540; 20160243701; 20160253597; 20160267179; 20160283955; 20160292589; 20160292843; 20160307068; 20160307305; 20160307566; 20160314506;

20160314818; 20160321522; 20160335234; 20160342860; 20160342904; 20160343054; each of which is expressly incorporated herein by reference in its entirety.

A specific class of task in text mining is addressed as an example of an application of the technology: Sentiment Analysis (SA). A special case of SA is addressed as a binary classification problem, where a given piece of text is either of positive or negative attitude. This problem is interesting largely due to the emergence of online social networks, where people consistently express their opinions about certain subjects. Also, it is easy to obtain a large amount of clean labeled data for SA by crawling reviews from websites such as IMDB or Amazon. Thus, SA is an ideal benchmark for evaluating text classification models (and features). However, the technology itself is not limited to this example.

See, U.S. Pat. Nos. 7,475,007; 7,523,085; 7,536,637; 7,596,552; 7,600,017; 7,660,783; 7,689,624; 7,698,129; 7,725,414; 7,730,017; 7,788,086; 7,844,483; 7,844,484; 7,877,345; 7,894,677; 7,930,302; 7,930,322; 7,970,808; 7,987,188; 7,996,210; 8,010,539; 8,019,756; 8,041,669; 8,073,849; 8,166,032; 8,166,161; 8,180,717; 8,229,864; 8,229,929; 8,244,724; 8,250,009; 8,266,148; 8,271,316; 8,302,030; 8,306,921; 8,311,888; 8,311,967; 8,312,029; 8,316,041; 8,326,630; 8,341,169; 8,347,326; 8,352,405; 8,356,030; 8,359,362; 8,364,470; 8,364,540; 8,364,613; 8,370,279; 8,370,280; 8,380,697; 8,386,335; 8,392,360; 8,402,036; 8,417,713; 8,434,001; 8,438,120; 8,438,122; 8,443,013; 8,468,195; 8,473,044; 8,473,431; 8,478,676; 8,484,622; 8,489,390; 8,504,550; 8,515,739; 8,516,374; 8,521,664; 8,528,018; 8,532,981; 8,533,208; 8,533,222; 8,533,224; 8,543,454; 8,549,013; 8,553,065; 8,554,701; 8,554,854; 8,566,217; 8,589,396; 8,595,151; 8,595,154; 8,600,796; 8,600,985; 8,606,815; 8,607,295; 8,612,293; 8,615,434; 8,620,021; 8,620,136; 8,620,837; 8,630,843; 8,630,845; 8,630,975; 8,631,473; 8,635,674; 8,639,696; 8,650,023; 8,650,143; 8,650,587; 8,655,667; 8,661,039; 8,666,922; 8,667,169; 8,667,520; 8,671,098; 8,676,730; 8,682,830; 8,694,540; 8,700,480; 8,706,659; 8,706,754; 8,725,494; 8,725,495; 8,731,995; 8,737,599; 8,738,363; 8,762,299; 8,764,652; 8,769,417; 8,775,429; 8,781,989; 8,782,061; 8,782681; 8,793,715; 8,799,773; 8,805,845; 8,805,937; 8,831,403; 8,832,092; 8,838,435; 8,838,633; 8,856,050; 8,856,052; 8,856,235; 8,862,577; 8,862,591; 8,873,813; 8,874,071; 8,874,727; 8,880,440; 8,886,581; 8,886,797; 8,892,488; 8,898,163; 8,909,568; 8,909,624; 8,918,344; 8,930,304; 8,930,366; 8,935,274; 8,938,403; 8,938,450; 8,949,243; 8,949,263; 8,955,001; 8,965,822; 8,965,835; 8,965,967; 8,972,424; 8,972,428; 8,973,022; 8,978,086; 8,983,885; 8,984,398; 8,989,835; 8,990,083; 8,990,097; 8,996,350; 9,002,740; 9,002,892; 9,009,027; 9,009,126; 9,015,035; 9,020,861; 9,026,551; 9,031,888; 9,047,347; 9,047,563; 9,053,497; 9,058,406; 9,060,671; 9,063,927; 9,064,009; 9,069,736; 9,070,089; 9,076,108; 9,077,804; 9,081,854; 9,082,154; 9,087,178; 9,092,421; 9,092,789; 9,092,829; 9,100,669; 9,106,812; 9,107,617; 9,111,216; 9,116,985; 9,129,008; 9,135,243; 9,135,666; 9,141,600; 9,152,623; 9,158,855; 9,165,051; 9,171,256; 9,176,994; 9,177,060; 9,177,260; 9,177,554; 9,183,203; 9,183,230; 9,185,095; 9,189,538; 9,189,747; 9,195,646; 9,201,863; 9,201,866; 9,201,965; 9,201,979; 9,203,860; 9,204,098; 9,208,202; 9,208,441; 9,215,978; 9,215,996; 9,218,101; 9,223,831; 9,229,977; 9,230,220; 9,235,846; 9,237,377; 9,239,986; 9,240,016; 9,244,910; 9,246,867; 9,251,132; 9,251,180; 9,251,182; 9,256,670; 9,262,493; 9,262,517; 9,264,764; 9,269,051; 9,292,490; 9,294,576; 9,298,816; 9,304,989; 9,305,140; 9,305,302; 9,307,275; 9,317,542; 9,317,559; 9,317,567; 9,320,450; 9,323,836; 9,324,112; 9,330,420; 9,332,223; 9,336,205; 9,336,259; 9,336,268; 9,336,296; 9,336,302; 9,336,533; 9,342,798; 9,342,836; 9,342,846; 9,348,817; 9,349,132; 9,351,658; 9,355,088; 9,355,181; 9,355,367; 9,361,323; 9,361,627; 9,367,853; 9,374,555; 9,384,501; 9,390,149; 9,390,428; 9,391,855; 9,397,904; 9,400,779; 9,400,975; 9,405,928; 9,406,019; 9,412,102; 9,418,083; 9,418,375; 9,424,522; 9,430,460; 9,430,773; 9,432,713; 9,445,716; 9,454,767; 9,455,891; 9,460,455; 9,465,795; 9,471,874; 9,471,883; 9,477,749; 9,477,929; 9,483,544; 9,483,554; 9,489,373; 9,489,680; 9,495,344; 9,495,358; 9,495,425; 9,495,695; 9,501,475; 20050187932; 20060069589; 20080077582; 20080154883; 20080249764; 20080270116; 20090018891; 20090030862; 20090100078; 20090164417; 20090182554; 20090204600; 20090222329; 20090234711; 20090234861; 20090240568; 20090240569; 20090240586; 20090300043; 20100042403; 20100042421; 20100042469; 20100042470; 20100049590; 20100050118; 20100063877; 20100076904; 20100076994; 20100094878; 20100114899; 20100121857; 20100145940; 20100161604; 20100257117; 20100262454; 20100306251; 20100332287; 20110040759; 20110040760; 20110041080; 20110078167; 20110093293; 20110093417; 20110106589; 20110106807; 20110209043; 20110258049; 20110276553; 20110295722; 20110295787; 20110302006; 20110320387; 20110320541; 20110320542; 20110320543; 20120011158; 20120030027; 20120046938; 20120047219; 20120100825; 20120123854; 20120173358; 20120173359; 20120173360; 20120173361; 20120173362; 20120173363; 20120173364; 20120173365; 20120173366; 20120173367; 20120173368; 20120173369; 20120173370; 20120173371; 20120173372; 20120173373; 20120173374; 20120173375; 20120173376; 20120173377; 20120173378; 20120173379; 20120179562; 20120179563; 20120179564; 20120179565; 20120179566; 20120179567; 20120179568; 20120179751; 20120185349; 20120185415; 20120185544; 20120209705; 20120209706; 20120209707; 20120209708; 20120209709; 20120209710; 20120209852; 20120209879; 20120210203; 20120215602; 20120215612; 20120215622; 20120215623; 20120215624; 20120215625; 20120215626; 20120215635; 20120215639; 20120215640; 20120215784; 20120215903; 20120221485; 20120221486; 20120226695; 20120230564; 20120233258; 20120291070; 20120296845; 20120303559; 20120311623; 20120316916; 20130013332; 20130013539; 20130013540; 20130014136; 20130014137; 20130014138; 20130014141; 20130014143; 20130014144; 20130014145; 20130014146; 20130014153; 20130014158; 20130014222; 20130014223; 20130018824; 20130018909; 20130018954; 20130019258; 20130019262; 20130024440; 20130041652; 20130054502; 20130055097; 20130086489; 20130091141; 20130091274; 20130096909; 20130097176; 20130108996; 20130124193; 20130124545; 20130129076; 20130132289; 20130151258; 20130166374; 20130173254; 20130179450; 20130198180; 20130204613; 20130212061; 20130227401; 20130238531; 20130254035; 20130260727; 20130263019; 20130268262; 20130268596; 20130275891; 20130282430; 20130282595; 20130282735; 20130289991; 20130290317; 20130291079; 20130304581; 20130304904; 20130311329; 20130325437; 20130346330; 20140012849; 20140012855; 20140012863; 20140019118; 20140019443; 20140019468; 20140040281; 20140040301; 20140040387; 20140045165; 20140058763; 20140067370; 20140074828; 20140074845; 20140079297; 20140089125; 20140089144; 20140089334; 20140108565; 20140114705; 20140114898; 20140122405; 20140136188; 20140136544; 20140164061; 20140173641; 20140173643; 20140188552; 20140188623; 20140188780; 20140195518; 20140195562; 20140201126; 20140201613; 20140214895; 20140219437; 20140222612; 20140229164;

20140236663; 20140244399; 20140278339; 20140278478; 20140278754; 20140278755; 20140278771; 20140279760; 20140279761; 20140279794; 20140280065; 20140280066; 20140280149; 20140280153; 20140280190; 20140280191; 20140280192; 20140280193; 20140280257; 20140280314; 20140280361; 20140289174; 20140289386; 20140297635; 20140297639; 20140317089; 20140317118; 20140324541; 20140324752; 20140325151; 20140330548; 20140330669; 20140337257; 20140337328; 20140344186; 20140365240; 20140365424; 20140365525; 20140379386; 20140379729; 20150006516; 20150019555; 20150019912; 20150032675; 20150046233; 20150051946; 20150052129; 20150066711; 20150081725; 20150088593; 20150089409; 20150095021; 20150100572; 20150106078; 20150106156; 20150106157; 20150112883; 20150113018; 20150120283; 20150120788; 20150140530; 20150142595; 20150149153; 20150149461; 20150161606; 20150169593; 20150169758; 20150178367; 20150186378; 20150186771; 20150186789; 20150205863; 20150206153; 20150220854; 20150236997; 20150256475; 20150256675; 20150269267; 20150281208; 20150286693; 20150286697; 20150286928; 20150286945; 20150288573; 20150296235; 20150331563; 20150334469; 20150348216; 20150356099; 20150358667; 20150370887; 20150371651; 20150381933; 20160006629; 20160007083; 20160019195; 20160019621; 20160034512; 20160036748; 20160036972; 20160036980; 20160037127; 20160042061; 20160048547; 20160048760; 20160048886; 20160062982; 20160071015; 20160071120; 20160071162; 20160072890; 20160078245; 20160085803; 20160085804; 20160085805; 20160085806; 20160085818; 20160085819; 20160085820; 20160085821; 20160085822; 20160085823; 20160085824; 20160085825; 20160085826; 20160085827; 20160088333; 20160093123; 20160100753; 20160110429; 20160110502; 20160125011; 20160125344; 20160132608; 20160132777; 20160140580; 20160140588; 20160140627; 20160142917; 20160148293; 20160162808; 20160162930; 20160171386; 20160171391; 20160179933; 20160180043; 20160188601; 20160188633; 20160189171; 20160189174; 20160196248; 20160217130; 20160217419; 20160217522; 20160232160; 20160232941; 20160239877; 20160241818; 20160246801; 20160246896; 20160255139; 20160259822; 20160267503; 20160267528; 20160292199; 20160292204; 20160292734; 20160294755; 20160299955; 20160300135; 20160300227; 20160306751; 20160306984; 20160321336; 20160330084; 20160335345; 20160335674; 20160337709; each of which is expressly incorporated herein by reference in its entirety.

Autoencoders have attracted a lot of attention in recent years as a building block of Deep Learning (Bengio 2009). They act as the feature learning methods by reconstructing inputs with respect to a given loss function. In a neural network implementation of autoencoders, the hidden layer is taken as the learned feature. While it is often trivial to obtain good reconstructions with plain autoencoders, much effort has been devoted on regularizations in order to prevent them against overfitting (Bengio 2009; Vincent et al. 2008; Rifai et al. 2011b). However, little attention has been devoted to the loss function, which is important for modeling textual data. The problem with the commonly adopted loss functions (squared Euclidean distance and element-wise KL Divergence, for instance) is that they try to reconstruct all dimensions of input independently and indiscriminately. However, this is not the optimal approach when the interest is text classification. The reason is two-fold. First, it is well known that in natural language the distribution of word occurrences follows the power-law. This means that a few of the most frequent words will account for most of the probability mass of word occurrences. An immediate result is that the Autoencoder puts most of its effort on reconstructing the most frequent words well but (to a certain extent) ignores the less frequent ones. This may lead to a bad performance especially when the class distribution is not well captured by merely the frequent words. For sentiment analysis, this problem is especially severe because it is obvious that the truly useful features (words or phrases expressing a clear polarity) only occupy a small fraction of the whole vocabulary; and reconstructing irrelevant words such as 'actor' or 'movie' very well is not likely to help learn more useful representations to classify the sentiment of movie reviews. Second, explicitly reconstructing all the words in an input text is expensive, because the latent representation has to contain all aspects of the semantic space carried by the words, even if they are completely irrelevant. As the vocabulary size can easily reach the range of tens of thousands even for a moderate sized dataset, the hidden layer size has to be chosen very large to obtain a reasonable reconstruction, which causes a huge waste of model capacity and makes it difficult to scale to large problems.

In fact, the reasoning above applies to all the unsupervised learning methods in general, which is one of the most important problems to address in order to learn task-specific representations.

See, U.S. Pat. Nos. 7,555,399; 7,822,745; 7,844,116; 7,844,117; 7,953,676; 8,150,858; 8,185,481; 8,285,719; 8,369,595; 8,417,648; 8,437,513; 8,463,050; 8,483,450; 8,494,994; 8,566,260; 8,581,189; 8,586,921; 8,635,067; 8,650,138; 8,675,925; 8,676,805; 8,687,891; 8,700,547; 8,704,176; 8,724,857; 8,725,663; 8,744,141; 8,775,335; 8,787,628; 8,819,531; 8,826,109; 8,862,962; 8,868,475; 8,880,525; 8,886,283; 8,996,528; 9,104,921; 9,311,535; 9,314,160; 9,336,302; 9,337,815; 9,361,681; 9,372,915; 9,489,639; 20070282785; 20080267519; 20080294686; 20090055139; 20090067746; 20090112865; 20090177443; 20090222389; 20100169158; 20100191743; 20100254573; 20110004578; 20110015991; 20110246080; 20110286627; 20120005142; 20120084235; 20120150536; 20120296907; 20130036116; 20130037714; 20130188856; 20130262465; 20130304392; 20130309666; 20140032454; 20140032999; 20140044318; 20140044319; 20140044320; 20140044321; 20140068381; 20140095961; 20140122039; 20140198959; 20140270405; 20140279755; 20140294252; 20140307958; 20140372342; 20150100244; 20150134576; 20150193666; 20150198584; 20150254331; 20160042428; 20160055132; 20160132735; 20160184608; 20160259960; each of which is expressly incorporated herein by reference in its entirety.

In any labelled data, a bias may be incurred dependent on the labelling process. This bias may be a priori, that is, selectively creating the labels across the dataset with an intrinsic bias, or ex post facto, selecting data having a particular bias from a larger set of data, which itself may be biased or objective.

For example, subjective user feedback regarding a datum, compiled for that respective user, would generally lead to an a priori biased labelled dataset, representing the user's subjective responses, which may differ from responses of other members of the general population. Likewise, the bias need not be for a single individual, but may be representative of a family, company, group, community, demographic group, sex, age, race, national origin, sexual orientation, etc. In some cases, the user labels or characteristics are known in advance, and the labelled data classified according to the characteristics of the source. In this example, the classifications are predetermined, and the data may be segregated or labelled with the classification, and thereafter the data selective used based on its original classification or classification characteristics.

Alternately, the labelled data may be compiled without a predetermined classification of the source or bias represented, or predetermined grouping of the set of data pertinent to a particular class, and the available data about the user/source/bias stored as additional parameters of an unsegregated set of data. In this case, typically a larger pool of data may be available for analysis, and a subsequent process is employed to prepare or select the data for use.

In a multiparametric user/source/bias space, the data may be clustered using a statistical clustering algorithm, in order to automatically classify the user/source/bias, and perhaps the data content itself, either according to an automatically optimized classification/segmentation, or according to arbitrary or not predetermined classification at any time, including after collection of the labelled data. Further, according to a statistical process, data other than that within the selected class of user/source/bias may be exploited to provide improved statistical reliability, distinctive power, etc. For example, where the user/source/bias has an antithesis, the antithetical bias labelled data may be processed with the biased labelled data, weighted to improve decision-making between the two groups. Similarly, the weighting is not limited to opposites, and in a multiparametric classification space, each axis may have independent variation.

In some cases, the active learning process is not limited to a preprocessing of the data for later use in an autoencoder. Rather, the later process may be integrated with the user/source/bias classification, and this potentially rich classification data carrier through the analysis, for example as additional dimensions or degrees of freedom.

Data clustering is a process of grouping together data points having common characteristics. In automated processes, a cost function or distance function is defined, and data is classified is belonging to various clusters by making decisions about its relationship to the various defined clusters (or automatically defined clusters) in accordance with the cost function or distance function. Therefore, the clustering problem is an automated decision-making problem. The science of clustering is well established, and various different paradigms are available. After the cost or distance function is defined and formulated as clustering criteria, the clustering process becomes one of optimization according to an optimization process, which itself may be imperfect or provide different optimized results in dependence on the particular optimization employed. For large data sets, a complete evaluation of a single optimum state may be infeasible, and therefore the optimization process subject to error, bias, ambiguity, or other known artifacts.

In some cases, the distribution of data is continuous, and the cluster boundaries sensitive to subjective considerations or have particular sensitivity to the aspects and characteristics of the clustering technology employed. In contrast, in other cases, the inclusion of data within a particular cluster is relatively insensitive to the clustering methodology. Likewise, in some cases, the use of the clustering results focuses on the marginal data, that is, the quality of the clustering is a critical factor in the use of the system.

Clustering acts to effectively reduce the dimensionality of a data set by treating each cluster as a degree of freedom, with a distance from a centroid or other characteristic exemplar of the set. In a non-hybrid system, the distance is a scalar, while in systems that retain some flexibility at the cost of complexity, the distance itself may be a vector. Thus, a data set with 10,000 data points, potentially has 10,000 degrees of freedom, that is, each data point represents the centroid of its own cluster. However, if it is clustered into 100 groups of 100 data points, the degrees of freedom is reduced to 100, with the remaining differences expressed as a distance from the cluster definition. Cluster analysis groups data objects based on information in or about the data that describes the objects and their relationships. The goal is that the objects within a group be similar (or related) to one another and different from (or unrelated to) the objects in other groups. The greater the similarity (or homogeneity) within a group and the greater the difference between groups, the "better" or more distinct is the clustering.

It is noted that, in a text or semantic application, these degrees of freedom typically represent words, phrases, linkages, etc. In a labelled data application, the data set is supplemented with external and/or explicit labels, in addition to possible available information about the source or origin of the labels. While labelled data typically is static, when user, source, origin or other information about the labelling is updated after the labelling, that information may be propagated into the labelled data set.

In some cases, the dimensionality may be reduced to one, in which case all of the dimensional variety of the data set is reduced to a distance according to a distance function. This corresponds to a binary classification. This distance function may be useful, since it permits dimensionless comparison of the entire data set, and allows a user to modify the distance function to meet various constraints. Likewise, in certain types of clustering, the distance functions for each cluster may be defined independently, and then applied to the entire data set. In other types of clustering, the distance function is defined for the entire data set, and is not (or cannot readily be) tweaked for each cluster. Similarly, feasible clustering algorithms for large data sets preferably do not have interactive distance functions in which the distance function itself changes depending on the data. Many clustering processes are iterative, and as such produce a putative clustering of the data, and then seek to produce a better clustering, and when a better clustering is found, making that the putative clustering. However, in complex data sets, there are relationships between data points such that a cost or penalty (or reward) is incurred if data points are clustered in a certain way. Thus, while the clustering algorithm may split data points which have an affinity (or group together data points, which have a negative affinity, the optimization becomes more difficult.

Thus, for example, a semantic database may be represented as a set of documents with words or phrases. Words may be ambiguous, such as "apple", representing a fruit, a computer company, a record company, and a musical artist. In order to effectively use the database, the multiple meanings or contexts need to be resolved. In order to resolve the context, an automated process might be used to exploit available information for separating the meanings, i.e., clustering documents according to their context. This automated process can be difficult as the data set grows, and in some cases the available information is insufficient for accurate automated clustering. On the other hand, a human can often determine a context by making an inference, which, though subject to error or bias, may represent a most useful result regardless.

In supervised classification, the mapping from a set of input data vectors to a finite set of discrete class labels is modeled in terms of some mathematical function including a vector of adjustable parameters. The values of these adjustable parameters are determined (optimized) by an inductive learning algorithm (also termed inducer), whose aim is to minimize an empirical risk function on a finite data set of input. When the inducer reaches convergence or terminates, an induced classifier is generated. In unsupervised classification, called clustering or exploratory data analysis, no labeled data are available. The goal of clustering is to separate a finite unlabeled data set into a finite and discrete set of "natural," hidden data structures, rather than provide an accurate characterization of unobserved samples generated from the same probability distribution. In semi-supervised classification, a portion of the data are labeled, or sparse label feedback is used during the process.

Non-predictive clustering is a subjective process in nature, seeking to ensure that the similarity between objects within a cluster is larger than the similarity between objects belonging to different clusters. Cluster analysis divides data into groups (clusters) that are meaningful, useful, or both. If meaningful groups are the goal, then the clusters should capture the "natural" structure of the data. In some cases, however, cluster analysis is only a useful starting point for other purposes, such as data summarization. However, this often begs the question, especially in marginal cases; what is the natural structure of the data, and how do we know when the clustering deviates from "truth"? As discussed above, where labels may be biased, there may be different truths or a spectrum of different truths.

Many data analysis techniques, such as regression or principal component analysis (PCA), have a time or space complexity of $O(m^2)$ or higher (where m is the number of objects), and thus, are not practical for large data sets. However, instead of applying the algorithm to the entire data set, it can be applied to a reduced data set consisting only of cluster prototypes. Depending on the type of analysis, the number of prototypes, and the accuracy with which the prototypes represent the data, the results can be comparable to those that would have been obtained if all the data could have been used. The entire data set may then be assigned to the clusters based on a distance function.

Clustering algorithms partition data into a certain number of clusters (groups, subsets, or categories). Important considerations include feature selection or extraction (choosing distinguishing or important features, and only such features); Clustering algorithm design or selection (accuracy and precision with respect to the intended use of the classification result; feasibility and computational cost; etc.); and to the extent different from the clustering criterion, optimization algorithm design or selection.

Finding nearest neighbors can require computing the pairwise distance between all points. However, clusters and their cluster prototypes might be found more efficiently. Assuming that the clustering distance metric reasonably includes close points, and excludes far points, then the neighbor analysis may be limited to members of nearby clusters, thus reducing the complexity of the computation.

There are generally three types of clustering structures, known as partitional clustering, hierarchical clustering, and individual clusters. The most commonly discussed distinction among different types of clusterings is whether the set of clusters is nested or unnested, or in more traditional terminology, hierarchical or partitional. A partitional clustering is simply a division of the set of data objects into non-overlapping subsets (clusters) such that each data object is in exactly one subset. If the cluster shave sub-clusters, then we obtain a hierarchical clustering, which is a set of nested clusters that are organized as a tree. Each node (cluster) in the tree (except for the leaf nodes) is the union of its children (sub-clusters), and the root of the tree is the cluster containing all the objects. Often, but not always, the leaves of the tree are singleton clusters of individual data objects. A hierarchical clustering can be viewed as a sequence of partitional clusterings and a partitional clustering can be obtained by taking any member of that sequence; i.e., by cutting the hierarchical tree at a particular level.

There are many situations in which a point could reasonably be placed in more than one cluster, and these situations are better addressed by non-exclusive clustering. In the most general sense, an overlapping or non-exclusive clustering is used to reflect the fact that an object can simultaneously belong to more than one group (class). A non-exclusive clustering is also often used when, for example, an object is "between" two or more clusters and could reasonably be assigned to any of these clusters. In a fuzzy clustering, every object belongs to every cluster with a membership weight. In other words, clusters are treated as fuzzy sets. Similarly, probabilistic clustering techniques compute the probability with which each point belongs to each cluster.

In many cases, a fuzzy or probabilistic clustering is converted to an exclusive clustering by assigning each object to the cluster in which its membership weight or probability is highest. Thus, the inter-cluster and intra-cluster distance function is symmetric. However, it is also possible to apply a different function to uniquely assign objects to a particular cluster.

A well-separated cluster is a set of objects in which each object is closer (or more similar) to every other object in the cluster than to any object not in the cluster. Sometimes a threshold is used to specify that all the objects in a cluster must be sufficiently close (or similar) to one another. The distance between any two points in different groups is larger than the distance between any two points within a group. Well-separated clusters do not need to be spheric, but can have any shape.

If the data is represented as a graph, where the nodes are objects and the links represent connections among objects, then a cluster can be defined as a connected component; i.e., a group of objects that are significantly connected to one another, but that have less connected to objects outside the group. This implies that each object in a contiguity-based cluster is closer to some other object in the cluster than to any point in a different cluster.

A density-based cluster is a dense region of objects that is surrounded by a region of low density. A density-based definition of a cluster is often employed when the clusters are irregular or intertwined, and when noise and outliers are present. DBSCAN is a density-based clustering algorithm that produces a partitional clustering, in which the number of clusters is automatically determined by the algorithm. Points in low-density regions are classified as noise and omitted; thus, DBSCAN does not produce a complete clustering.

A prototype-based cluster is a set of objects in which each object is closer (more similar) to the prototype that defines the cluster than to the prototype of any other cluster. For data with continuous attributes, the prototype of a cluster is often a centroid, i.e., the average (mean) of all the points in the cluster. When a centroid is not meaningful, such as when the data has categorical attributes, the prototype is often a medoid, i.e., the most representative point of a cluster. For many types of data, the prototype can be regarded as the most central point. These clusters tend to be globular. K-means is a prototype-based, partitional clustering technique that attempts to find a user-specified number of clusters (K), which are represented by their centroids. Prototype-based clustering techniques create a one-level partitioning of the data objects. There are a number of such techniques, but two of the most prominent are K-means and K-medoid. K-means defines a prototype in terms of a centroid, which is usually the mean of a group of points, and is typically applied to objects in a continuous n-dimensional space. K-medoid defines a prototype in terms of a medoid, which is the most representative point for a group of points, and can be applied to a wide range of data since it requires only a proximity measure for a pair of objects. While a centroid almost never corresponds to an actual data point, a medoid, by its definition, must be an actual data point.

In the K-means clustering technique, we first choose K initial centroids, the number of clusters desired. Each point in the data set is then assigned to the closest centroid, and each collection of points assigned to a centroid is a cluster. The centroid of each cluster is then updated based on the points assigned to the cluster. Points may be iteratively assigned, and updated until convergence (no point changes clusters), or equivalently, until the centroids remain the same. For some combinations of proximity functions and types of centroids, K-means always converges to a solution; i.e., K-means reaches a state in which no points are shifting from one cluster to another, and hence, the centroids don't change. Because convergence tends to be asymptotic, the end condition may be set as a maximum change between iterations. Because of the possibility that the optimization results in a local minimum instead of a global minimum, errors may be maintained unless and until corrected. Therefore, a human assignment or reassignment of data points into classes, either as a constraint on the optimization, or as an initial condition, is possible.

To assign a point to the closest centroid, a proximity measure is required. Euclidean (L2) distance is often used for data points in Euclidean space, while cosine similarity may be more appropriate for documents. However, there may be several types of proximity measures that are appropriate for a given type of data. For example, Manhattan (L1) distance can be used for Euclidean data, while the Jaccard measure is often employed for documents. Usually, the similarity measures used for K-means are relatively simple since the algorithm repeatedly calculates the similarity of each point to each centroid, and thus complex distance functions incur computational complexity. The clustering may be computed as a statistical function, e.g., mean square error of the distance of each data point according to the distance function from the centroid. Note that the K-means may only find a local minimum, since the algorithm does not test each point for each possible centroid, and the starting presumptions may influence the outcome. The typical distance functions for documents include the Manhattan (L1) distance, Bregman divergence, Mahalanobis distance, squared Euclidean distance and cosine similarity.

An optimal clustering will be obtained as long as two initial centroids fall anywhere in a pair of clusters, since the centroids will redistribute themselves, one to each cluster. As the number of clusters increases, it is increasingly likely that at least one pair of clusters will have only one initial centroid, and because the pairs of clusters are further apart than clusters within a pair, the K-means algorithm will not redistribute the centroids between pairs of clusters, leading to a suboptimal local minimum. One effective approach is to take a sample of points and cluster them using a hierarchical clustering technique. K clusters are extracted from the hierarchical clustering, and the centroids of those clusters are used as the initial centroids. This approach often works well, but is practical only if the sample is relatively small, e.g., a few hundred to a few thousand (hierarchical cluster-ing is expensive), and K is relatively small compared to the sample size. Other selection schemes are also available.

The space requirements for K-means are modest because only the data points and centroids are stored. Specifically, the storage required is $O(m+K)^n$, where m is the number of points and n is the number of attributes. The time requirements for K-means are also modest—basically linear in the number of data points. In particular, the time required is $O(I \times K \times m \times n)$, where I is the number of iterations required for convergence. I is often small and can usually be safely bounded, as most changes typically occur in the first few iterations. Therefore, K-means is linear in m, the number of points, and is efficient as well as simple provided that K, the number of clusters, is significantly less than m.

Outliers can unduly influence the clusters, especially when a squared error criterion is used. However, in some clustering applications, the outliers should not be eliminated or discounted, as their appropriate inclusion may lead to important insights. In some cases, such as financial analysis, apparent outliers, e.g., unusually profitable investments, can be the most interesting points.

Hierarchical clustering techniques are a second important category of clustering methods. There are two basic approaches for generating a hierarchical clustering: Agglomerative and divisive. Agglomerative clustering merges close clusters in an initially high dimensionality space, while divisive splits large clusters. Agglomerative clustering relies upon a cluster distance, as opposed to an object distance. For example, the distance between centroids or medoids of the clusters, the closest points in two clusters, the further points in two clusters, or some average distance metric. Ward's method measures the proximity between two clusters in terms of the increase in the sum of the squares of the errors that results from merging the two clusters.

Agglomerative Hierarchical Clustering refers to clustering techniques that produce a hierarchical clustering by starting with each point as a singleton cluster and then repeatedly merging the two closest clusters until a single, all-encompassing cluster remains. Agglomerative hierarchical clustering cannot be viewed as globally optimizing an objective function. Instead, agglomerative hierarchical clustering techniques use various criteria to decide locally, at each step, which clusters should be merged (or split for divisive approaches). This approach yields clustering algorithms that avoid the difficulty of attempting to solve a hard combinatorial optimization problem. Furthermore, such approaches do not have problems with local minima or difficulties in choosing initial points. Of course, the time complexity of $O(m^2 \log m)$ and the space complexity of $O(m^2)$ are prohibitive in many cases. Agglomerative hierarchical clustering algorithms tend to make good local decisions about combining two clusters since they can use information about the pair-wise similarity of all points. However, once a decision is made to merge two clusters, it cannot be undone at a later time. This approach prevents a local optimization criterion from becoming a global optimization criterion.

In supervised classification, the evaluation of the resulting classification model is an integral part of the process of developing a classification model. Being able to distinguish whether there is non-random structure in the data is an important aspect of cluster validation.

Each of the following is expressly incorporated herein by reference in its entirety, for example, for its disclosure of clustering technology, applications of that technology, and implementations: U.S. Pat. Nos. 4,081,607; 4,257,703; 4,773,093; 4,855,923; 4,965,580; 5,020,411; 5,253,307;

5,285,291; 5,327,521; 5,442,792; 5,448,684; 5,463,702;
5,477,451; 5,497,486; 5,506,801; 5,566,078; 5,574,837;
5,625,704; 5,627,040; 5,668,897; 5,699,507; 5,710,916;
5,717,915; 5,724,571; 5,731,989; 5,748,780; 5,764,283;
5,768,603; 5,795,727; 5,805,832; 5,809,490; 5,813,002;
5,872,850; 5,889,523; 5,920,852; 5,924,105; 5,926,820;
5,940,529; 5,940,825; 5,940,833; 5,949,367; 6,012,052;
6,029,195; 6,041,311; 6,049,777; 6,070,140; 6,085,151;
6,088,718; 6,092,049; 6,100,825; 6,112,186; 6,121,969;
6,122,628; 6,140,643; 6,154,767; 6,185,314; 6,192,364;
6,195,622; 6,203,987; 6,249,241; 6,263,088; 6,263,334;
6,278,446; 6,282,538; 6,295,367; 6,295,504; 6,295,514;
6,300,965; 6,331,859; 6,351,712; 6,373,485; 6,389,169;
6,400,831; 6,411,953; 6,415,046; 6,421,453; 6,421,612;
6,424,971; 6,424,973; 6,437,796; 6,445,391; 6,453,246;
6,460,036; 6,463,433; 6,466,695; 6,468,476; 6,470,094;
6,473,522; 6,487,554; 6,496,834; 6,505,191; 6,519,591;
6,526,389; 6,535,881; 6,539,352; 6,556,983; 6,560,597;
6,564,197; 6,584,433; 6,592,627; 6,594,658; 6,615,205;
6,627,464; 6,636,849; 6,643,629; 6,671,405; 6,674,905;
6,684,177; 6,684,205; 6,700,115; 6,701,026; 6,711,585;
6,728,695; 6,732,119; 6,735,336; 6,735,465; 6,738,494;
6,748,097; 6,750,859; 6,751,363; 6,751,614; 6,757,415;
6,760,701; 6,763,128; 6,778,699; 6,778,981; 6,785,409;
6,785,419; 6,797,526; 6,799,175; 6,801,645; 6,801,859;
6,804,670; 6,807,306; 6,816,848; 6,819,793; 6,826,316;
6,832,006; 6,832,162; 6,834,266; 6,834,278; 6,841,403;
6,845,377; 6,847,733; 6,854,096; 6,865,297; 6,876,930;
6,895,267; 6,904,420; 6,906,719; 6,907,380; 6,912,547;
6,915,241; 6,925,453; 6,950,752; 6,954,756; 6,961,721;
6,968,342; 6,970,796; 6,976,016; 6,980,674; 6,980,984;
6,993,186; 6,996,171; 6,999,886; 7,010,520; 7,016,531;
7,031,844; 7,031,909; 7,031,980; 7,035,431; 7,035,823;
7,039,446; 7,039,621; 7,043,094; 7,043,463; 7,047,252;
7,054,724; 7,058,638; 7,058,650; 7,062,083; 7,065,521;
7,065,587; 7,068,723; 7,085,401; 7,111,188; 7,133,544;
7,139,695; 7,139,739; 7,142,602; 7,152,065; 7,155,668;
7,158,970; 7,158,983; 7,167,578; 7,167,583; 7,174,048;
7,177,470; 7,188,055; 7,196,705; 7,202,791; 7,206,778;
7,215,786; 7,216,129; 7,221,794; 7,222,126; 7,225,397;
7,229,774; 7,231,074; 7,233,943; 7,246,012; 7,246,128;
7,251,648; 7,263,220; 7,272,262; 7,272,575; 7,275,018;
7,287,019; 7,289,985; 7,293,036; 7,296,011; 7,296,088;
7,325,201; 7,328,363; 7,332,290; 7,337,158; 7,346,601;
7,366,705; 7,369,680; 7,369,889; 7,369,961; 7,373,612;
7,376,752; 7,386,426; 7,389,281; 7,395,250; 7,397,946;
7,398,269; 7,401,087; 7,406,200; 7,418,136; 7,424,462;
7,426,301; 7,426,509; 7,428,528; 7,428,529; 7,428,541;
7,437,308; 7,450,122; 7,450,746; 7,458,050; 7,464,074;
7,468,730; 7,475,085; 7,480,640; 7,483,871; 7,487,056;
7,490,073; 7,492,943; 7,496,546; 7,499,916; 7,502,780;
7,512,524; 7,516,149; 7,519,200; 7,519,209; 7,519,227;
7,526,101; 7,529,732; 7,539,656; 7,545,978; 7,552,131;
7,552,474; 7,555,427; 7,555,441; 7,558,425; 7,562,015;
7,562,325; 7,565,213; 7,565,251; 7,565,346; 7,565,432;
7,567,961; 7,570,213; 7,574,069; 7,574,409; 7,580,556;
7,580,682; 7,584,168; 7,590,264; 7,599,799; 7,599,917;
7,603,326; 7,610,306; 7,613,572; 7,624,337; 7,639,714;
7,639,868; 7,643,597; 7,644,090; 7,650,320; 7,657,100;
7,657,126; 7,657,379; 7,660,468; 7,666,583; 7,668,853;
7,679,617; 7,684,963; 7,685,090; 7,688,495; 7,689,457;
7,689,585; 7,693,683; 7,697,785; 7,700,293; 7,702,155;
7,707,210; 7,711,846; 7,715,382; 7,716,148; 7,720,848;
7,736,905; 7,739,284; 7,743,059; 7,746,534; 7,747,054;
7,747,390; 7,747,547; 7,752,208; 7,761,448; 7,767,393;
7,767,395; 7,773,784; 7,783,135; 7,783,249; 7,788,263;
7,788,264; 7,788,536; 7,801,685; 7,801,893; 7,805,266;
7,805,443; 7,805,496; 7,809,192; 7,809,722; 7,810,029;
7,813,580; 7,822,426; 7,823,055; 7,826,635; 7,827,181;
7,827,183; 7,831,325; 7,831,531; 7,831,549; 7,835,542;
7,840,059; 7,842,874; 7,844,566; 7,848,567; 7,849,027;
7,856,434; 7,865,456; 7,865,888; 7,868,786; 7,870,550;
7,873,616; 7,876,947; 7,879,620; 7,882,119; 7,882,126;
7,885,966; 7,889,679; 7,889,914; 7,890,294; 7,890,510;
7,890,512; 7,890,549; 7,894,669; 7,894,995; 7,899,564;
7,900,201; 7,904,303; 7,912,284; 7,912,290; 7,912,726;
7,912,734; 7,917,306; 7,917,517; 7,926,026; 7,930,189;
7,933,454; 7,933,740; 7,933,915; 7,937,234; 7,937,349;
7,941,009; 7,945,627; 7,949,186; 7,953,679; 7,953,705;
7,954,090; 7,958,096; 7,962,651; 7,966,130; 7,966,225;
7,966,327; 7,970,627; 7,975,035; 7,975,039; 7,978,918;
7,979,362; 7,979,435; 7,991,224; 7,991,557; 7,996,369;
7,996,814; 8,000,527; 8,000,533; 8,001,527; 8,005,294;
8,010,466; 8,010,589; 8,014,591; 8,014,957; 8,015,124;
8,015,125; 8,015,183; 8,019,766; 8,027,977; 8,032,476;
8,041,090; 8,041,715; 8,046,362; 8,051,082; 8,051,139;
8,055,081; 8,055,677; 8,056,019; 8,065,248; 8,065,316;
8,065,379; 8,073,652; 8,077,984; 8,082,246; 8,090,729;
8,095,389; 8,095,521; 8,095,830; 8,097,469; 8,099,381;
8,103,671; 8,108,392; 8,108,405; 8,108,406; 8,108,931;
8,116,566; 8,117,139; 8,117,203; 8,117,204; 8,117,213;
8,122,045; 8,122,502; 8,131,718; 8,132,121; 8,132,122;
8,135,679; 8,135,680; 8,135,681; 8,135,719; 8,139,838;
8,139,900; 8,145,669; 8,145,677; 8,150,169; 8,155,453;
8,164,507; 8,165,397; 8,165,406; 8,165,407; 8,169,481;
8,169,681; 8,170,306; 8,170,961; 8,170,975; 8,171,032;
8,175,412; 8,175,730; 8,175,896; 8,180,147; 8,180,627;
8,180,724; 8,180,766; 8,183,050; 8,184,913; 8,190,082;
8,190,604; 8,190,663; 8,191,783; 8,194,986; 8,195,345;
8,195,582; 8,195,670; 8,195,734; 8,200,506; 8,200,648;
8,207,989; 8,229,900; 8,229,929; 8,233,676; 8,238,615;
8,238,650; 8,239,333; 8,254,699; 8,255,403; 8,275,608;
8,275,771; 8,280,164; 8,285,060; 8,300,935; 8,311,364;
8,311,394; 8,330,826; 8,332,334; 8,340,452; 8,344,233;
8,345,979; 8,359,190; 8,359,279; 8,363,939; 8,363,960;
8,369,627; 8,374,442; 8,380,714; 8,385,971; 8,386,519;
8,396,286; 8,401,282; 8,402,395; 8,407,263; 8,429,168;
8,438,168; 8,442,309; 8,447,110; 8,447,587; 8,452,096;
8,452,778; 8,457,406; 8,478,052; 8,488,863; 8,489,627;
8,503,767; 8,503,791; 8,515,171; 8,515,957; 8,515,958;
8,520,979; 8,526,735; 8,532,377; 8,533,134; 8,548,951;
8,548,969; 8,566,321; 8,566,360; 8,572,071; 8,572,088;
8,583,416; 8,589,396; 8,594,385; 8,606,021; 8,620,021;
8,630,513; 8,631,489; 8,635,223; 8,639,044; 8,639,696;
8,644,600; 8,649,572; 8,650,194; 8,655,915; 8,661,039;
8,666,992; 8,671,040; 8,676,729; 8,688,673; 8,694,630;
8,700,627; 8,700,629; 8,701,048; 8,706,674; 8,712,157;
8,713,017; 8,713,018; 8,719,192; 8,724,904; 8,724,909;
8,731,325; 8,737,961; 8,751,421; 8,755,837; 8,756,229;
8,761,373; 8,762,302; 8,768,313; 8,768,865; 8,775,341;
8,775,424; 8,781,175; 8,787,683; 8,788,270; 8,792,732;
8,792,733; 8,798,393; 8,798,965; 8,805,110; 8,805,812;
8,813,111; 8,819,024; 8,826,226; 8,826,438; 8,837,820;
8,838,436; 8,838,513; 8,843,497; 8,849,259; 8,855,372;
8,855,712; 8,856,050; 8,856,051; 8,856,052; 8,856,125;
8,863,619; 8,873,813; 8,873,853; 8,874,432; 8,879,103;
8,879,796; 8,880,444; 8,886,206; 8,886,581; 8,886,649;
8,892,419; 8,892,480; 8,892,484; 8,897,505; 8,898,091;
8,898,344; 8,903,711; 8,909,025; 8,909,569; 8,909,647;
8,913,847; 8,914,368; 8,917,910; 8,918,344; 8,923,609;
8,924,497; 8,929,877; 8,930,288; 8,935,291; 8,938,119;
8,938,403; 8,942,488; 8,965,822; 8,972,312; 8,975,379;
8,977,041; 8,977,953; 8,983,192; 8,989,514; 8,990,134;
8,995,725; 8,996,527; 9,008,429; 9,008,724; 9,015,084;

9,015,093; 9,020,864; 9,026,518; 9,031,243; 9,031,870; 9,032,110; 9,037,589; 9,038,172; 9,043,197; 9,053,431; 9,053,433; 9,058,200; 9,064,008; 9,064,040; 9,064,145; 9,064,491; 9,075,824; 9,076,108; 9,082,047; 9,082,232; 9,082,403; 9,086,884; 9,087,236; 9,087,242; 9,087,271; 9,087,297; 9,104,467; 9,104,915; 9,104,969; 9,111,547; 9,117,444; 9,122,747; 9,123,259; 9,129,227; 9,134,961; 9,147,129; 9,147,132; 9,153,031; 9,159,362; 9,165,062; 9,165,255; 9,166,994; 9,170,809; 9,170,926; 9,171,013; 9,176,642; 9,177,208; 9,179,250; 9,183,226; 9,183,509; 9,190,026; 9,195,646; 9,201,773; 9,201,774; 9,201,775; 9,201,776; 9,204,038; 9,208,384; 9,208,592; 9,213,919; 9,218,339; 9,218,439; 9,224,175; 9,230,220; 9,235,412; 9,235,812; 9,239,615; 9,239,848; 9,244,924; 9,245,299; 9,245,367; 9,251,598; 9,262,935; 9,264,387; 9,271,133; 9,275,306; 9,292,493; 9,292,887; 9,305,083; 9,311,224; 9,313,322; 9,317,404; 9,317,412; 9,317,498; 9,317,533; 9,317,534; 9,336,296; 9,336,302; 9,342,991; 9,355,635; 9,361,355; 9,361,523; 9,367,763; 9,378,250; 9,384,573; 9,390,165; 9,396,409; 9,411,830; 9,430,719; 9,436,759; 9,443,164; 9,460,557; 9,465,994; 9,470,688; 9,473,637; 9,477,290; 9,477,751; 9,477,993; 9,483,768; 9,488,487; 9,489,402; 9,495,779; 20010000356; 20010014868; 20010034023; 20010048753; 20010055019; 20020000986; 20020002550; 20020002555; 20020023061; 20020026456; 20020028005; 20020033835; 20020049740; 20020050990; 20020069079; 20020069218; 20020087273; 20020091655; 20020099675; 20020099721; 20020111966; 20020115070; 20020116196; 20020122587; 20020123865; 20020128781; 20020129038; 20020131641; 20020132479; 20020143989; 20020146175; 20020147703; 20020168664; 20020181711; 20020181786; 20020183966; 20020184080; 20020190198; 20020191034; 20030004942; 20030009293; 20030009333; 20030009469; 20030014191; 20030016250; 20030028564; 20030033126; 20030033138; 20030036093; 20030037041; 20030044053; 20030044062; 20030046018; 20030046253; 20030048950; 20030050908; 20030050923; 20030054573; 20030058268; 20030058339; 20030059081; 20030059121; 20030061249; 20030065635; 20030065661; 20030074251; 20030074368; 20030074369; 20030078494; 20030078509; 20030081836; 20030088563; 20030093227; 20030097356; 20030097357; 20030100996; 20030101003; 20030107768; 20030110181; 20030113017; 20030120630; 20030129660; 20030138978; 20030139851; 20030145014; 20030158842; 20030161396; 20030161500; 20030174179; 20030175720; 20030175736; 20030177000; 20030205124; 20030208488; 20030229635; 20030236392; 20030236659; 20040002954; 20040002973; 20040003005; 20040013292; 20040019574; 20040024598; 20040024739; 20040024758; 20040024773; 20040036716; 20040048264; 20040049503; 20040049517; 20040056778; 20040068332; 20040071368; 20040075656; 20040088308; 20040090472; 20040091933; 20040101198; 20040103377; 20040107194; 20040107205; 20040107221; 20040111253; 20040122797; 20040125877; 20040127777; 20040129199; 20040130546; 20040139067; 20040139105; 20040158569; 20040162647; 20040162834; 20040170318; 20040171063; 20040172225; 20040172378; 20040175700; 20040177069; 20040181527; 20040191804; 20040193559; 20040213461; 20040215551; 20040220944; 20040230586; 20040233987; 20040243362; 20040249789; 20040249939; 20040254901; 20040260694; 20040267774; 20050010571; 20050015376; 20050025387; 20050027829; 20050044487; 20050058336; 20050071152; 20050071266; 20050075995; 20050085436; 20050102272; 20050102305; 20050114331; 20050120105; 20050130215; 20050130230; 20050132069; 20050136493; 20050137806; 20050138056; 20050147303; 20050149269; 20050163373; 20050163384; 20050164273; 20050170432; 20050175244; 20050176057; 20050180638; 20050182570; 20050185848; 20050192768; 20050193216; 20050197590; 20050198575; 20050207491; 20050210008; 20050210009; 20050214826; 20050225678; 20050228645; 20050234972; 20050234973; 20050238238; 20050251882; 20050255458; 20050256413; 20050262044; 20050265331; 20050267991; 20050267992; 20050267993; 20050273319; 20050278324; 20050281291; 20050283328; 20050285937; 20050286767; 20050286774; 20060013482; 20060015341; 20060015630; 20060020662; 20060029945; 20060031219; 20060034545; 20060041414; 20060052943; 20060053129; 20060053142; 20060058592; 20060064177; 20060074621; 20060074771; 20060074924; 20060092974; 20060093188; 20060093208; 20060095521; 20060095852; 20060101060; 20060101377; 20060106816; 20060112128; 20060112146; 20060117052; 20060136589; 20060177837; 20060190191; 20060190465; 20060195204; 20060195269; 20060195415; 20060208185; 20060211017; 20060212337; 20060224356; 20060239338; 20060246495; 20060248141; 20060251292; 20060251338; 20060251339; 20060253258; 20060253491; 20060281473; 20060282298; 20060282425; 20070003138; 20070005556; 20070006177; 20070008905; 20070011155; 20070016399; 20070022279; 20070025637; 20070033170; 20070033214; 20070033221; 20070033292; 20070033515; 20070033521; 20070033533; 20070038612; 20070044010; 20070050708; 20070054262; 20070054266; 20070059770; 20070064627; 20070067212; 20070078846; 20070091203; 20070092888; 20070092905; 20070093966; 20070106405; 20070111316; 20070112585; 20070128573; 20070129011; 20070129991; 20070141527; 20070147678; 20070150443; 20070154066; 20070154931; 20070156516; 20070156732; 20070172803; 20070174335; 20070179784; 20070180980; 20070185946; 20070192034; 20070192063; 20070198553; 20070208719; 20070214124; 20070217676; 20070231816; 20070231921; 20070233711; 20070239694; 20070239741; 20070239745; 20070239982; 20070242138; 20070244768; 20070250522; 20070255707; 20070263092; 20070263900; 20070269410; 20070269804; 20070275108; 20070276723; 20070285575; 20070286489; 20070288465; 20070291958; 20080005137; 20080010045; 20080010262; 20080010272; 20080010273; 20080010605; 20080015871; 20080019574; 20080019575; 20080021794; 20080027841; 20080030836; 20080033658; 20080037536; 20080037872; 20080057590; 20080059885; 20080069437; 20080069456; 20080075361; 20080077570; 20080082426; 20080082506; 20080085032; 20080091423; 20080097820; 20080101705; 20080103760; 20080103762; 20080103773; 20080109288; 20080112684; 20080114564; 20080114710; 20080114756; 20080114800; 20080123940; 20080123945; 20080126464; 20080144943; 20080146334; 20080147438; 20080147440; 20080147441; 20080147591; 20080147655; 20080152231; 20080155335; 20080162541; 20080177538; 20080177640; 20080181479; 20080182282; 20080183546; 20080188964; 20080189306; 20080191035; 20080198160; 20080198231; 20080201397; 20080208828; 20080208855; 20080212899; 20080215510; 20080219529; 20080221876; 20080222075; 20080222225; 20080222741; 20080226151; 20080232687; 20080234977; 20080243637; 20080243638; 20080243815; 20080243816; 20080243817; 20080243839; 20080249414; 20080256093; 20080260247; 20080261516; 20080261820; 20080263088; 20080267471; 20080270946; 20080275671; 20080276201; 20080281915; 20080294584; 20080300797; 20080300875; 20080302657; 20080304735; 20080304743; 20080310005; 20080313179; 20080317358; 20080319973; 20090006378; 20090010495; 20090012766; 20090012841; 20090018891; 20090022374; 20090022472; 20090024554; 20090024555; 20090028441; 20090034791; 20090043637; 20090043714;

20090048841; 20090055147; 20090055257; 20090060042; 20090063537; 20090070346; 20090077093; 20090080777; 20090080853; 20090081645; 20090083211; 20090083390; 20090087122; 20090093717; 20090094020; 20090094021; 20090094207; 20090094208; 20090094209; 20090094231; 20090094232; 20090094233; 20090094265; 20090097728; 20090104605; 20090124512; 20090125482; 20090125916; 20090132347; 20090132662; 20090132901; 20090138415; 20090150340; 20090154795; 20090164192; 20090169065; 20090171662; 20090171956; 20090175544; 20090175545; 20090190798; 20090190839; 20090196510; 20090198593; 20090199099; 20090204333; 20090204574; 20090204609; 20090204637; 20090205063; 20090220488; 20090222430; 20090226044; 20090226081; 20090232409; 20090234876; 20090248399; 20090252046; 20090254971; 20090257663; 20090263038; 20090265024; 20090271246; 20090271359; 20090271363; 20090271397; 20090271404; 20090271405; 20090271424; 20090271433; 20090271694; 20090276705; 20090277322; 20090287689; 20090290766; 20090290778; 20090292482; 20090292694; 20090292695; 20090292802; 20090297032; 20090297048; 20090299705; 20090299822; 20090299990; 20090299999; 20090311786; 20090313239; 20090313294; 20090318815; 20090319454; 20090319526; 20090326383; 20090327185; 20100004898; 20100004923; 20100005105; 20100017487; 20100033182; 20100034422; 20100036647; 20100042563; 20100046842; 20100048242; 20100049431; 20100049770; 20100050260; 20100054278; 20100055678; 20100057391; 20100057399; 20100057534; 20100067745; 20100076691; 20100076981; 20100080439; 20100081661; 20100082333; 20100082367; 20100082614; 20100085358; 20100100515; 20100106713; 20100111370; 20100111396; 20100112234; 20100114793; 20100114928; 20100114929; 20100117978; 20100121638; 20100124377; 20100125594; 20100135582; 20100135597; 20100136553; 20100138894; 20100149917; 20100150453; 20100157089; 20100157340; 20100161232; 20100161590; 20100166339; 20100169025; 20100169262; 20100169313; 20100169338; 20100169340; 20100169342; 20100169343; 20100174492; 20100174732; 20100174975; 20100174976; 20100174977; 20100174978; 20100174979; 20100174980; 20100174982; 20100174983; 20100174985; 20100183225; 20100183555; 20100189333; 20100191532; 20100191722; 20100198098; 20100198864; 20100199186; 20100204061; 20100205123; 20100205176; 20100205213; 20100215259; 20100215903; 20100216660; 20100217763; 20100220916; 20100221722; 20100223261; 20100223276; 20100226566; 20100228625; 20100228731; 20100232718; 20100235313; 20100239147; 20100250477; 20100250527; 20100254614; 20100257092; 20100268476; 20100268512; 20100274787; 20100278425; 20100280987; 20100284915; 20100296748; 20100297657; 20100299128; 20100305868; 20100305930; 20100310159; 20100311047; 20100313157; 20100318492; 20100322525; 20100324985; 20100332210; 20100332242; 20100332425; 20100332474; 20100332475; 20100332511; 20110002028; 20110002194; 20110004115; 20110004415; 20110004578; 20110008805; 20110009323; 20110010792; 20110013840; 20110015869; 20110020779; 20110022354; 20110022599; 20110026853; 20110028827; 20110029657; 20110034176; 20110040192; 20110047172; 20110048731; 20110052000; 20110052076; 20110055192; 20110060716; 20110060717; 20110064301; 20110064303; 20110070863; 20110074966; 20110075851; 20110075917; 20110075930; 20110078143; 20110078144; 20110080490; 20110081056; 20110081066; 20110081375; 20110086349; 20110091073; 20110091074; 20110091083; 20110091105; 20110093482; 20110093492; 20110097001; 20110103613; 20110105340; 20110105350; 20110106743; 20110106801; 20110115787; 20110116690; 20110119108; 20110123120; 20110124525; 20110137898; 20110137921; 20110142287; 20110142318; 20110143650; 20110143811; 20110144480; 20110144914; 20110161205; 20110166949; 20110167014; 20110170777; 20110172501; 20110173173; 20110173189; 20110175905; 20110178965; 20110179019; 20110184950; 20110184953; 20110185234; 20110188742; 20110191076; 20110191283; 20110191353; 20110202540; 20110205399; 20110206246; 20110208511; 20110212717; 20110213655; 20110218990; 20110221767; 20110225158; 20110231350; 20110231414; 20110235900; 20110246076; 20110246200; 20110246409; 20110246482; 20110246483; 20110251081; 20110255747; 20110255748; 20110261049; 20110264432; 20110264443; 20110267544; 20110269479; 20110270604; 20110272161; 20110280447; 20110282828; 20110282877; 20110288890; 20110295773; 20110295857; 20110295903; 20110296374; 20110297369; 20110299764; 20110299765; 20110301860; 20110302163; 20110304619; 20110306354; 20110311129; 20110320396; 20120005238; 20120011135; 20120011170; 20120014560; 20120015841; 20120021710; 20120023006; 20120029908; 20120030157; 20120030165; 20120030185; 20120036096; 20120039527; 20120039541; 20120041722; 20120041955; 20120045119; 20120045134; 20120047098; 20120054133; 20120054135; 20120062574; 20120070452; 20120072124; 20120075433; 20120076372; 20120076401; 20120078858; 20120078906; 20120078927; 20120084251; 20120088219; 20120088981; 20120089341; 20120089396; 20120093411; 20120099784; 20120106854; 20120109715; 20120109758; 20120109778; 20120114249; 20120123279; 20120123780; 20120123978; 20120125178; 20120131034; 20120131701; 20120136860; 20120137182; 20120150859; 20120163710; 20120166439; 20120183212; 20120185415; 20120189207; 20120190404; 20120201436; 20120209852; 20120209879; 20120213359; 20120215523; 20120221485; 20120221486; 20120233127; 20120233188; 20120239769; 20120242900; 20120246102; 20120254333; 20120258776; 20120259801; 20120265717; 20120268612; 20120269425; 20120269441; 20120283574; 20120284207; 20120284791; 20120290505; 20120290511; 20120290512; 20120290513; 20120290514; 20120290515; 20120290516; 20120290517; 20120290520; 20120290521; 20120294875; 20120296845; 20120296891; 20120301105; 20120303504; 20120303610; 20120304125; 20120311623; 20120316421; 20120316916; 20120320827; 20120330977; 20130002903; 20130011062; 20130013536; 20130013539; 20130018832; 20130042172; 20130053141; 20130054486; 20130060769; 20130063613; 20130080359; 20130089303; 20130089304; 20130094780; 20130097246; 20130097664; 20130101221; 20130103624; 20130107872; 20130108179; 20130110838; 20130111095; 20130113877; 20130114902; 20130117426; 20130117766; 20130117780; 20130121589; 20130132311; 20130132392; 20130136298; 20130138428; 20130139247; 20130149682; 20130151520; 20130151525; 20130151646; 20130155088; 20130156341; 20130164326; 20130182909; 20130185314; 20130185631; 20130191390; 20130202205; 20130212110; 20130217440; 20130232094; 20130238356; 20130251340; 20130253910; 20130260727; 20130268260; 20130273968; 20130282712; 20130290222; 20130295894; 20130311329; 20130311485; 20130311490; 20130315477; 20130318014; 20130325471; 20130325472; 20130325759; 20130326417; 20130339386; 20140006318; 20140019116; 20140031060; 20140032208; 20140032358; 20140032452; 20140032453; 20140032572; 20140032580; 20140032580; 20140033091; 20140037152; 20140046696; 20140046879; 20140056432; 20140056511; 20140056520; 20140058723; 20140058982; 20140067370; 20140067740; 20140079297; 20140080428; 20140095418; 20140095425; 20140108309; 20140108842; 20140121985; 20140122039;

20140127711; 20140129299; 20140143251; 20140149177; 20140149376; 20140156567; 20140169686; 20140172764; 20140179807; 20140185742; 20140193087; 20140195221; 20140195539; 20140199964; 20140201126; 20140207781; 20140214842; 20140219563; 20140219566; 20140222612; 20140222928; 20140236571; 20140242676; 20140247461; 20140250127; 20140250130; 20140254923; 20140258198; 20140267301; 20140270494; 20140270707; 20140272822; 20140289675; 20140293091; 20140295384; 20140297252; 20140297266; 20140307958; 20140309989; 20140310243; 20140316230; 20140328570; 20140337257; 20140337320; 20140342320; 20140342323; 20140358581; 20140363085; 20140369626; 20140370844; 20140372346; 20140372439; 20140376819; 20150011194; 20150022675; 20150033056; 20150039405; 20150039548; 20150040139; 20150040149; 20150044659; 20150052084; 20150055854; 20150058019; 20150058081; 20150058327; 20150071528; 20150078655; 20150081725; 20150086118; 20150088492; 20150104102; 20150118667; 20150120346; 20150120379; 20150125052; 20150127567; 20150127650; 20150131899; 20150132836; 20150134306; 20150134307; 20150134336; 20150149879; 20150154229; 20150154269; 20150170042; 20150170175; 20150170339; 20150178371; 20150178786; 20150186714; 20150186785; 20150193583; 20150193688; 20150195145; 20150195146; 20150195149; 20150206169; 20150206319; 20150216414; 20150220951; 20150220958; 20150220999; 20150222495; 20150227193; 20150227590; 20150227817; 20150227844; 20150233929; 20150235160; 20150248473; 20150248533; 20150254331; 20150254566; 20150256675; 20150269157; 20150269308; 20150269427; 20150281910; 20150288805; 20150294143; 20150294191; 20150294483; 20150294496; 20150299795; 20150304797; 20150317389; 20150317610; 20150319077; 20150323986; 20150324338; 20150324448; 20150324919; 20150332448; 20150348083; 20150356376; 20150358525; 20150363196; 20150363197; 20150363294; 20150363660; 20150371115; 20160003637; 20160004911; 20160004936; 20160005395; 20160012594; 20160012595; 20160018402; 20160021126; 20160026848; 20160026932; 20160034839; 20160042252; 20160042253; 20160042359; 20160055164; 20160055236; 20160063692; 20160063734; 20160070334; 20160078369; 20160078567; 20160086212; 20160086222; 20160092557; 20160092751; 20160098445; 20160098589; 20160098619; 20160104187; 20160110428; 20160117589; 20160125270; 20160140211; 20160140386; 20160147763; 20160147871; 20160155010; 20160155011; 20160163228; 20160170814; 20160170996; 20160170998; 20160171369; 20160171398; 20160171514; 20160171902; 20160180245; 20160187199; 20160203209; 20160203497; 20160210224; 20160210532; 20160210602; 20160216923; 20160232221; 20160232222; 20160239746; 20160239919; 20160247501; 20160253801; 20160267359; 20160283569; 20160284004; 20160292265; 20160292275; 20160292843; 20160299891; 20160300049; 20160307566; 20160328253; 20160328384; 20160335524; 20160350336; 20160350930; and 20160352772.

When humans having preferences or profiles are involved as the source of data labels, various technologies have developed to facilitate the process. For example, a user may be classified with other users having similar tastes or classification criteria using collaborative filters.

See, U.S. Pat. Nos. 6,850,252; 7,062,475; 7,165,119; 7,330,826; 7,467,232; 7,483,871; 7,584,124; 7,590,589; 7,596,533; 7,640,232; 7,739,408; 7,813,822; 7,958,013; 7,974,714; 7,996,456; 8,027,879; 8,131,271; 8,195,133; 8,209,344; 8,238,888; 8,290,810; 8,301,125; 8,301,704; 8,302,030; 8,311,888; 8,321,519; 8,341,033; 8,364,540; 8,458,276; 8,484,234; 8,503,995; 8,566,115; 8,566,880; 8,600,830; 8,620,285; 8,660,891; 8,666,376; 8,738,463; 8,768,731; 8,805,339; 8,874,477; 8,880,623; 8,958,779; 8,959,167; 8,989,718; 9,021,554; 9,058,406; 9,171,068; 9,201,979; 9,202,084; 9,275,170; 9,275,171; 9,298,711; 9,311,670; 9,336,302; 9,390,182; 9,471,686; 9,507,878; 20050080771; 20050097188; 20060015925; 20060167784; 20060253594; 20070005686; 20070053513; 20070061393; 20070087756; 20070106536; 20070106537; 20070106750; 20070106751; 20070106752; 20070106753; 20070106754; 20070116036; 20070116037; 20070143439; 20070168461; 20070244769; 20080040151; 20080071774; 20080071872; 20080071873; 20080077574; 20080109306; 20080115050; 20080133426; 20080189330; 20080214148; 20080214149; 20080214150; 20080214151; 20080214152; 20080214153; 20080214154; 20080214155; 20080214156; 20080214157; 20080214162; 20080214166; 20080214204; 20080215428; 20080215429; 20080215475; 20080215557; 20080215623; 20080270220; 20090029687; 20090144275; 20090172773; 20090222329; 20090234711; 20090234745; 20090234861; 20090240568; 20090240569; 20090240586; 20090292647; 20100063877; 20100076994; 20100094878; 20100235285; 20100287048; 20100287246; 20100312572; 20100317420; 20110004513; 20110143731; 20110143733; 20110153428; 20110177799; 20110179452; 20110225608; 20110238521; 20110258049; 20110289139; 20110289171; 20110313853; 20120010980; 20120010981; 20120010982; 20120010983; 20120010984; 20120010985; 20120010986; 20120010987; 20120010988; 20120010989; 20120010990; 20120010991; 20120016739; 20120016740; 20120016750; 20120016751; 20120089996; 20120117026; 20120173358; 20120173359; 20120173360; 20120173361; 20120173362; 20120173363; 20120173364; 20120173365; 20120173366; 20120173367; 20120173368; 20120173369; 20120173370; 20120173371; 20120173372; 20120173373; 20120173374; 20120173375; 20120173376; 20120173377; 20120173378; 20120173379; 20120179562; 20120179563; 20120179564; 20120179565; 20120179566; 20120179567; 20120179568; 20120185349; 20120209705; 20120209706; 20120209707; 20120209708; 20120209709; 20120209710; 20120215602; 20120215612; 20120215622; 20120215623; 20120215624; 20120215625; 20120215626; 20120215635; 20120215639; 20120215640; 20120239498; 20120265613; 20120330750; 20130041876; 20130046582; 20130053005; 20130055097; 20130080556; 20130110665; 20130185165; 20130254035; 20130268609; 20130291060; 20130304581; 20130311297; 20130325610; 20140052720; 20140052721; 20140081754; 20140081755; 20140081756; 20140081757; 20140081793; 20140081943; 20140081960; 20140081965; 20140089103; 20140114772; 20140114985; 20140180825; 20140181100; 20140244421; 20140359446; 20150111591; 20150161118; 20150178304; 20160004820; 20160205059; 20160210293; 20160224951; and 20160284004; each of which is expressly incorporated herein by reference in its entirety.

Cohen et al, Cohn, David A., Ghahramani, Zoubin, and Jordan, Michael I., "Active Learning with Statistical Models", Center for Biological and Computational Learning, Dept. of Brain and Cognitive Sciences, MIT, Cambridge, MA, (1996) www.cs.cmu.edu/afs/cs/project/jair/pub/volume4/cohn96a-html/statmodels.html, provides a review of active learning. A goal of machine learning is to create systems that can improve their performance at some task as they acquire experience or data. In many natural learning tasks, this experience or data is gained interactively, by taking actions, making queries, or doing experiments. Most machine learning research, however, treats the learner as a passive recipient of data to be processed. This "passive" approach ignores the fact that, in many situations, the learner's most powerful tool is its ability to act, to gather data, and to influence the world it is trying to understand. Active learning is the study of how to use this ability effectively. Formally, active learning studies the closed-loop phenomenon of a learner selecting actions or making queries that influence what data are added to its training set. Examples include selecting joint angles or torques to learn the kinematics or dynamics of a robot arm, selecting locations for sensor measurements to identify and locate buried hazardous wastes, or querying a human expert to classify an unknown word in a natural language understanding problem.

When actions/queries are selected properly, the data requirements for some problems decrease drastically, and some NP-complete learning problems become polynomial in computation time [Angluin 1988, Baum & Lang 1991]. In practice, active learning offers its greatest rewards in situations where data are expensive or difficult to obtain, or when the environment is complex or dangerous. In industrial settings each training point may take days to gather and cost thousands of dollars; a method for optimally selecting these points could offer enormous savings in time and money. There are a number of different goals which one may wish to achieve using active learning. One is optimization, where the learner performs experiments to find a set of inputs that maximize some response variable. An example of the optimization problem would be finding the operating parameters that maximize the output of a steel mill or candy factory. The favored technique for this kind of optimization is usually a form of response surface methodology [Box & Draper 1987], which performs experiments that guide hill-climbing through the input space.

A related problem exists in the field of adaptive control, where one must learn a control policy by taking actions. In control problems, one faces the complication that the value of a specific action may not be known until many time steps after it is taken. Also, in control (as in optimization), one is usually concerned with the performing well during the learning task and must trade of exploitation of the current policy for exploration which may improve it. The subfield of dual control [Fe'ldbaum 1965] is specifically concerned with finding an optimal balance of exploration and control while learning. Mixtures of Gaussians and locally weighted regression are two statistical models that offer elegant representations and efficient learning algorithms.

Therefore, it is understood that the sentiment analysis problem in particular, or the classification problem in general, may employ objectively or subjectively labelled data, and in the latter case, a subjective analysis performed. The subjective bias may be as an initial filtering or selection, or may be statistical as a predicate or integrated process.

SUMMARY OF THE INVENTION

The usage of autoencoders is provided for modeling textual data. Traditional autoencoders suffer from at least two aspects: scalability with the high dimensionality of vocabulary size and dealing with task-irrelevant words. This problem is addressed by introducing supervision via the loss function of autoencoders. In particular, a linear classifier is first trained on the labeled data, then a loss for the autoencoder defined with the weights learned from the linear classifier. To reduce the bias brought by one single classifier, a posterior probability distribution is defined on the weights of the classifier, and the marginalized loss of the autoencoder derived with a Laplace approximation. The choice of loss function can be rationalized from the perspective of Bregman Divergence, which justifies the soundness of the model. The effectiveness of the model was evaluated on six sentiment analysis datasets, and was shown to significantly outperform all the competing methods with respect to classification accuracy. The model is able to take advantage of unlabeled datasets and get improved performance. The model successfully learns highly discriminative feature maps, which explains its superior performance.

According to the present technology, the semisupervised approach is adopted, where label information is introduced to guide the feature learning procedure. In particular, a novel loss function is provided for training autoencoders that are directly coupled with the classification task. A linear classifier is first trained on BoW, then a Bregman Divergence [Banerjee et al. 2004] is derived as the loss function of a subsequent autoencoder. The new loss function gives the autoencoder the information about directions along which the reconstruction should be accurate, and where larger reconstruction errors are tolerated. Informally, this can be considered as a weighting of words based on their correlations with the class label: predictive words should be given large weights in the reconstruction even they are not frequent words, and vice versa. Furthermore, to reduce the bias introduced by the linear classifier, a Bayesian view is adopted by defining a posterior distribution on the weights of the classifier. The posterior is then approximated with a Laplace approximation and the marginalized loss function derived for the autoencoder. The present model successfully learns features that are highly discriminative with respect to class labels, and also outperform all the competing methods evaluated by classification accuracy. Moreover, the derived loss can also be applied to unlabeled data, which allows the model to learn further better representations.

It is therefore an object to provide a method of modelling data, comprising: training an objective function of a linear classifier, based on a set of labeled data, to derive a set of classifier weights; defining a posterior probability distribution on the set of classifier weights of the linear classifier; approximating a marginalized loss function for an autoencoder as a Bregman divergence, based on the posterior probability distribution on the set of classifier weights learned from the linear classifier; and classifying unlabeled data using a compact classifier according to the marginalized loss function.

It is also an object to provide a system for modelling data, comprising: an input port, configured to receive a set of labelled data; a linear classifier; an autoencoder; a compact classifier, and an output port, configured to communicate a classification of at least one unlabeled datum, wherein: an objective function of a linear classifier is automatically trained, based on the set of labeled data, to derive a set of classifier weights; a marginalized loss function for the compact classifier approximated as a Bregman divergence, based on a posterior probability distribution on the set of classifier weights learned from the linear classifier; and the at least one unlabeled datum classified using a compact classifier according to the marginalized loss function.

It is another object to provide a computer readable medium containing non-transitory instructions for controlling at least one programmable automated processor to perform a method of modelling data, comprising: training an objective function of a linear classifier, based on a set of labeled data, to derive a set of classifier weights; defining a posterior probability distribution on the set of classifier weights of the linear classifier; approximating a marginalized loss function for an autoencoder as a Bregman divergence, based on the posterior probability distribution on the set of classifier weights learned from the linear classifier; and classifying unlabeled data using a compact classifier according to the marginalized loss function. The data may comprise semantic data, textual data, and may consist essentially of text documents.

The autoencoder may comprise a neural network, wherein said training comprises training the neural network. The autoencoder may be a denoising autoencoder. The denoising autoencoder may be denoised stochastically. The denoising autoencoder may comprise a neural network trained according to stochastic gradient descent training using randomly selected data samples, wherein a gradient is calculated using back propagation of errors. The training may comprise training the objective function of the linear classifier with a bag of words, wherein the linear classifier comprises a support vector machine classifier with squared hinge loss and $l_2$ regularization. The training may comprise training the objective function of the linear classifier with a bag of words, wherein the linear classifier comprises a Logistic Regression classifier.

The Bregman divergence may be determined assuming that all data samples induce a loss. The posterior probability distribution on the set of classifier weights may be estimated using with a Laplace approximation. The Laplace approximation may stochastically estimate the set of classifier weights using a covariance matrix constrained to be diagonal. The posterior probability distribution on the set of classifier weights may be estimated using with a Markov chain Monte Carlo method.

The labelled data may be sentiment data, user preferences, social network data/documents, newsfeed, email, or other types of documents or semantic information, and in some cases multimodal data or non-semantic data, though preferably the data has semantic content amenable to analysis. Because the method is statistical and not cognitive, the basis for the labelling may be arbitrary, and sentiment analysis is but one example. The labelling may be objective, in which case the system provides an objective classification or output. On the other hand, the labelling may be subjective or biased, and the particular subject group or bias may provide an additional input to the system where the set of labeled data is polydiverse. When subjective or biased data is provided, the system may be trained initially with a filter applied to the received data, so that the first classifier is trained only with labelled data with the correct bias. A plurality of first classifiers, autoencoders, and second classifiers may therefore be provided for the range of labelled data biases.

On the other hand, the data which defines or distinguishes the bias or potential bias may be carrier through to the first classifier, without filtering or blocking data which does not meet a specific subjective classification requirement. The first classifier may then operate with the subject user/source/bias information as additional dimensions or degrees of freedom, and produce an analysis that maintains the range of bias. The learning transfer process may then resolve the bias, and thus transfer the learning to the autoencoder in a manner to eliminate these additional degrees of freedom, or pass through the range of subjective bias to the autoencoder and second classifier (compact classifier). In the latter case, the system may then learn the desired bias of the system through an explicit, implicit, feedback, or adaptive algorithm, to provide a suitable output.

DETAILED DESCRIPTION OF THE PREFERRED EMBODIMENTS

Figure 1:
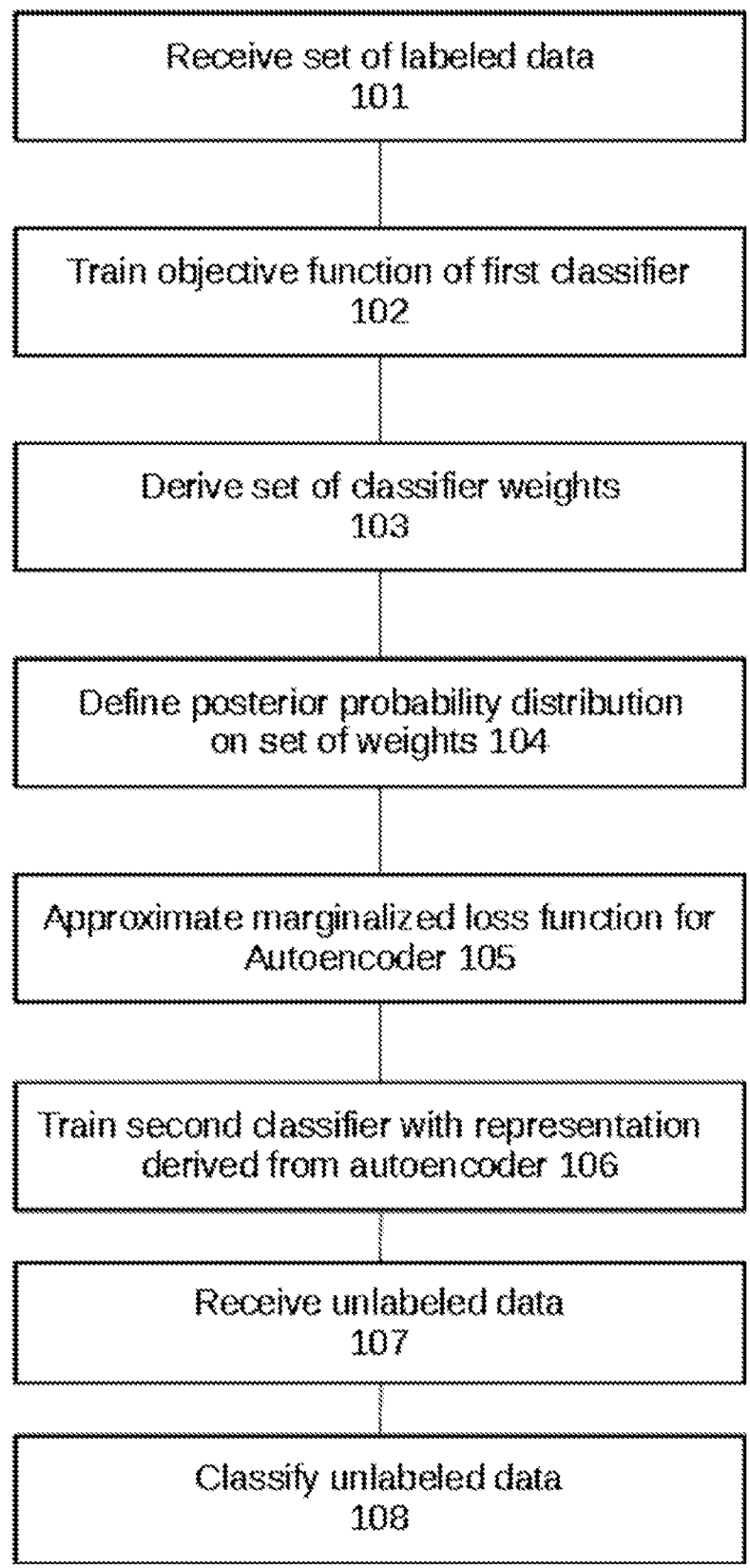
FIG. 1 shows a process flow of an embodiment of the invention.

Model
Denoising Autoencoders

Autoencoders learn functions that can reconstruct the inputs. They are typically implemented as a neural network with one hidden layer, and one can extract the activation of the hidden layer as the new representation. Mathematically, a collection of data points $X=\{xi\}$, $xi \in Rd$, $i \in [1, m]$ is provided, and the objective function of an autoencoder is thus:

$$\min \sum_i D_{(\tilde{x}_i, x_i)} \quad (1)$$

$$\text{s.t.} \quad h_i = g(Wx_i + b), \tilde{x}_i = f(W'h_i + b')$$

where
$W \in R^{k \times d}$, $b \in R^k$, $W' \in R^{d \times k}$, and $bl \in Rd$ are the parameters to be learned;
D is a loss function, such as the squared Euclidean Distance $\|\tilde{x}-x\|_2^2$;
g and $f$ are predefined nonlinear functions, which is set as $g(x)=ax(0,x)$, $f(x)=(1\exp(-x))^{-1}$;
$h_i$ is the learned representation; and
$\tilde{x}_i$ is the reconstruction.

A common approach is to use tied weights by setting W=Wl; this usually works better as it speeds up learning and prevents overfitting at the same time. For this reason, tied weights are employed herein.

Autoencoders transform an unsupervised learning problem to a supervised one by the self-reconstruction criteria. This enables one to use all the tools developed for supervised learning such as back propagation to efficiently train the autoencoders. Moreover, thanks to the nonlinear functions $f$ and g, autoencoders are able to learn non-linear and possibly overcomplete representations, which give the model much more expressive power than their linear counter parts such as PCA (LSA) [Deerwester et al. 1990].

One of the most popular variants of autoencoders is adopted, namely the Denoising Autoencoder. A Denoising Autoencoder works by reconstructing the input from a noised version of itself. The intuition is that a robust model should be able to reconstruct the input well even in the presence of noises, due to the high correlation among features. For example, imagine deleting or adding a few words from/to a document, the semantics should still remain unchanged, thus the autoencoder should learn a consistent representation from all the noisy inputs. In the high level, Denoising Autoencoders are equivalent to ordinary autoencoders trained with dropout [Srivastava et al. 2014], which has been shown as an effective regularizer for (deep) neural networks. Formally, let $q(\bar{x}|x)$ be a predefined noising distribution, and $\bar{x}$ be a noised sample of $x: \bar{x} \sim q(\bar{x}|x)$. The objective function takes the form of sum of expectations over all the noisy samples:

$$\min \sum_i E_{q(\bar{x}_i|x_i)} D_{(\tilde{x}_i, x_i)} \quad (2)$$

$$\text{s.t.} \quad h_i = g(W\bar{x}_i + b), \tilde{x}_i = f(W'h_i + b')$$

The notation is slightly overloaded, to let $\tilde{x}_i$ denote the reconstruction calculated from the noised input $\bar{x}_i$. While the marginal objective function requires infinite many noised samples per data point, in practice it is sufficient to simulate it stochastically. That is, for each example seen in the stochastic gradient descent training, a $\bar{x}_i$ is randomly sampled from $q(\bar{x}|x)$ and calculate the gradient with ordinary back propagation.

Loss Function as Bregman Divergence

The proper choice of the loss function D in (2) is a specific form of Bregman Divergence. Bregman Divergence [Banerjee et al. 2004] generalizes the notion of distance in a d dimensional space. To be concrete, given two data points $\tilde{x}$, $x \in R^d$ and a convex function $f(x)$ defined on $R^d$, the Bregman Divergence of $\tilde{x}$ from x with respect to $f$ is:

$$D_f(\tilde{x},x)=f(\tilde{x})-f(x)+\nabla f(x)^T(\tilde{x}-x)) \quad (3)$$

Namely, Bregman Divergence measures the distance between two points $\tilde{x}$, x as the deviation between the function value of $f$ and the linear approximation of $f$ around x at $\tilde{x}$.

Two of the most commonly used loss functions for autoencoders are the squared Euclidean distance and elementwise KL divergence. It is not difficult to verify that they both fall into this family by choosing $f$ as the squared $l_2$ norm and the sum of element-wise entropy respectively. What the two loss functions have in common is that they make no distinction among dimensions of the input. In other words, each dimension of the input is pushed to be reconstructed equally well. While autoencoders trained in this way have been shown to work very well on image data, learning much more interesting and useful features than the original pixel intensity features, they are less appropriate for modeling textual data. The reason is two fold. First, textual data are extremely sparse and high dimensional, where the dimensionality is equal to the vocabulary size. To maintain all the information of the input in the hidden layer, a very large layer size must be adopted, which makes the training cost extremely large. Second, ordinary autoencoders are not able to deal with the power law of word distributions, where a few of the most frequent words account for most of the word occurrences. As a result, frequent words naturally gain favor to being reconstructed accurately, and rare words tend to be reconstructed with less precision. This problem is also analogous to the imbalanced classification setting. This is especially problematic when frequent words carry little information about the task of interest, which is not uncommon. Examples include stop words (the, a, this, from) and topic related terms (movie, watch, actress) in a movie review sentiment analysis task.

Semisupervised Autoencoder with Bregman Divergence

To address the problems mentioned above, introduction of supervision to the training of autoencoders is proposed. To achieve this, a linear classifier is first trained on Bag of Words, and then the weight of the learned classifier used to define a new loss function for the autoencoder. Now let us first describe our choice of loss function, and then elaborate the motivation later:

$$D(\tilde{x},x)=(\theta^T(\tilde{x}-x))^2 \quad (4)$$

where $\theta \in R^d$ are the weights of the linear classifier, with the bias omitted for simplicity. Note that Equation (4) is a valid distance, as it is non-negative and reaches zeros if and only if $\tilde{x}=x$. Moreover, the reconstruction error is only measured after projecting on $\theta$; this guides the reconstruction to be accurate only along directions where the linear classifier is sensitive to. Note also that Equation (4) on the one hand uses label information ($\theta$ has been trained with labeled data), on the other hand no explicit labels are directly referred to (only requires $x_i$). Thus, one is able to train an autoencoder on both labeled and unlabeled data with the loss function in Equation (4). This subtlety distinguishes our method from pure supervised or unsupervised learning, and allows us to enjoy the benefit from both worlds.

As a design choice, SVM is considered with squared hinge loss (SVM2) and $l_2$ regularization as the linear classifier, but other classifiers such as Logistic Regression can be used and analyzed similarly. See, en.wikipedia.org/wiki/Support_vector_machine; www.robots.ox.ac.uk/~az/lectures/ml/lect2.pdf; www.cs.columbia.edu/~kathy/cs4701/documents/jason_svm_tutorial.pdf; en.wikipedia.org/wiki/Hinge_loss; www.csie.ntu.edu.tw/~cjlin/papers/l2mcsvm/l2mcsvm.pdf; www.vlfeat.org/api/svm-advanced.html; www.jmlr.org/papers/volume4/steinwart03a/steinwart03a.pdf; arxiv.org/pdf/1306.0239.pdf.

Denote $\{x_i\}$, $x_i \in R^d$ as the collection of samples, and $\{y_i\}$, $y_i \in \{1, -1\}$ as the class labels; with the objective function SVM2 being:

$$L(\theta) = \sum_i (\max(0, 1 - y_i\theta^T x_i))^2 + \lambda\|\theta\|^2 \quad (5)$$

Here $\theta \in R^d$ is the weight, $\lambda$ is the weight decay parameter.

Equation (5) is continuous and differentiable everywhere with respect to $\theta$, so the model can be easily trained with stochastic gradient descent.

The next (and perhaps critical) step of the present approach is to transfer label information from the linear classifier to the autoencoder. See, Weiss, K., Khoshgoftaar, T. M. & Wang, D. J Big Data (2016) 3: 9. doi:10.1186/s40537-016-0043-6, which provide a survey of transfer learning.

With this in mind, the loss induced by each sample as a function of the input is examined, while with $\theta$ fixed:

$$f(x_i)=(\max(0,1-y_i\theta^T x_i))^2 \quad (6)$$

Note that $f(x_i)$ is defined on the input space $R^d$, which should be contrasted with $L(\theta)$ in Equation (5) which is a function of $\theta$. $f(x_i)$ is of interest, because considering moving each input $x_i$ to $\tilde{x}_i$, $f(x_i)$ indicates the direction along which the loss is sensitive to. $\tilde{x}$ can be thought of as the reconstruction of $x_i$ obtained from an autoencoder, so a good $\tilde{x}$ should be in a way such that the deviation of $\tilde{x}$ from $x_i$ is small evaluated by $f(x_i)$. In other words, $\tilde{x}$ is sought to still be correctly classified by the pretrained linear classifier. Therefore, $f(x_i)$ should be a much better function to evaluate the deviation of two samples. A Bregman Divergence is derived from $f(x_i)$ and used as the loss function of the subsequent autoencoder training, so that the autoencoder is guided to give reconstruction errors that do not confuse the classifier. Note that $f(x_i)$ is a quadratic function of $x_i$ whenever $f(x_i)>0$, the Hessian matrix is derived in order to achieve the Bregman Divergence.

The Hessian follows as:

$$H(x_i) = \begin{cases} \theta\theta^T, & \text{if } 1 - y_i\theta^T x_i > 0 \\ 0, & \text{otherwise.} \end{cases} \quad (7)$$

For a quadratic function with Hessian matrix H, the Bregman Divergence is simply $(\tilde{x}-x)^T H(\tilde{x}-x)$; leading to:

$$D(\tilde{x}, x_i) = \begin{cases} (\theta^T(\tilde{x}_i - x_i))^2, & \text{if } 1 - y_i\theta^T x_i > 0 \\ 0, & \text{otherwise.} \end{cases} \quad (8)$$

In words, Equation (8) says that the reconstruction loss for difficult examples (those that satisfy $1-y_i\theta^T x_i > 0$) is measured with Equation (4); and there is no reconstruction loss at all for easy examples. This discrimination is undesirable, because in this case the Autoencoder would completely ignore easy examples, and there is no way to guarantee that the $\tilde{x}_i$ can be correctly classified. Actually, this split is just an artifact of the hinge loss and the asymmetrical property of Bregman Divergence. Hence, a simple correction is performed by ignoring the condition in Equation (8), which basically pretends that all the examples induce a loss. This directly yields the loss function as in Equation (4).

The Bayesian Marginalization

In principle, one may directly apply Equation (4) as the loss function in place of the squared Euclidean distance and train an autoencoder. However, doing so might introduce a bias brought by one single classifier. As a remedy, the Bayesian approach is resorted to, which defines a probability distribution over $\theta$.

Although SVM2 is not a probabilistic classifier like Logistic Regression, the idea of Energy Based Model (Bengio 2009) can be borrowed, and $L(\theta)$ used as the negative log likelihood of the following distribution:

$$p(\theta) = \frac{\exp(-\beta L(\theta))}{\int \exp(-\beta L(\theta)) d\theta} \quad (9)$$

where $\beta > 0$ is the temperature parameter which controls the shape of the distribution p. Note that the larger $\beta$ is, the sharper p will be. In the extreme case, $p(\theta)$ is reduced to a uniform distribution as $\beta$ approaches 0, and collapses into a single $\delta$ function as $\beta$ goes to positive infinity.

Given $p(\theta)$, Equation (4) is rewritten as an expectation over $\theta$:

$$D(\tilde{x},x) = E_{\theta \sim p(\theta)}(\theta^T(\tilde{x}-x))^2 = \int (\theta^T(\tilde{x}-x))^2 p(\theta) d\theta \quad (10)$$

Obviously there is now no closed form expression for $D(\tilde{x}, x)$. To solve it one could use sampling methods such as MCMC, which provides unbiased estimates of the expectation but could be slow in practice. See, en.wikipedia.org/wiki/Markov_chain_Monte_Carlo; www.mcmchandbook.net/HandbookChapter1.pdf; twiecki.github.io/blog/2015/11/10/mcmc-sampling/; www.cs.cornell.edu/selman/cs475/lectures/intro-mcmc-lukas.pdf; www.cs.princeton.edu/courses/archive/spr06/cos598C/papers/AndrieuFreitasDoucetJordan2003.pdf.

Instead, the Laplace approximation is used, which approximates $p(\theta)$ by a Gaussian distribution $\tilde{p}(\theta) = \mathcal{N}(\hat{\theta}, \Sigma)$.

To see this, by simply replacing $p(\theta)$ with $\tilde{p}(\theta)$ in Equation (11):

$$\begin{aligned} D(\tilde{x}, x) &= E_{\theta \sim \tilde{p}(\theta)}(\theta^T(\tilde{x}-x))^2 \quad (11) \\ &= (\tilde{x}-x)^T E_{\theta \sim \tilde{p}(\theta)}(\theta\theta^T)(\tilde{x}-x) \\ &= (\tilde{x}-x)^T(\hat{\theta}\hat{\theta}^T + \Sigma)(\tilde{x}-x) \\ &= (\hat{\theta}^T(\tilde{x}-x))^2 + (\Sigma^{1/2}(\tilde{x}-x))^T(\Sigma^{1/2}(\tilde{x}-x)) \end{aligned}$$

where D now involves two parts, corresponding to the mean and variance term of the Gaussian distribution respectively. Now let us derive $\tilde{p}(\theta)$ for $p(\theta)$. In Laplace approximation, $\hat{\theta}$ is chosen as the mode of $p(\theta)$, which is exactly the solution to the SVM2 optimization problem. For $\Sigma$:

$$\Sigma = diag\left(\frac{\partial^2 L(\theta)}{\partial \theta^2}\right)^{-1} \quad (12)$$

$$\frac{1}{\beta}\left(diag\left(\sum_i \mathbb{1}(1-y_i\theta^T x_i > 0)x_i^2\right)\right)^{-1}$$

Here diag is overridden, letting it denote a diagonal matrix induced either by a square matrix or a vector; $\mathbb{1}$ is the indicator function; $(\cdot)^{-1}$ denotes matrix inverse. Interestingly, the second term in Equation (11) is now equivalent to the squared Euclidean distance after performing element-wise normalizing the input using all difficult examples. The effect of this normalization is that the reconstruction errors of frequent words are down weighted; on the other hand, discriminative words are given higher weights as they would occur less frequently in difficult examples. Note that it is important to use a relatively large $\beta$ in order to avoid the variance term dominating the mean term. In other words, $p(\theta)$ is assured to be reasonably peaked around $\hat{\theta}$ to effectively take advantage of label information.

TABLE 1

Statistics of the datasets.

|  | IMDB | books | DVD | music | electronics | kitchenware |
|---|---|---|---|---|---|---|
| # train | 25,000 | 10,000 | 10,000 | 18,000 | 6,000 | 6,000 |
| # test | 25,000 | 3,105 | 2,960 | 2,661 | 2,862 | 1,691 |
| # unlabeled | 50,000 | N/A | N/A | N/A | N/A | N/A |
| # features | 8,876 | 9,849 | 10,537 | 13,099 | 5,091 | 3,907 |
| % positive | 50 | 49.81 | 49.85 | 50.16 | 49.78 | 50.08 | ai.stanford.edu/amaas/data/sentiment/
www.cs.jhu.edu/mdredze/datasets/sentiment/

Experiments

Datasets

The model is evaluated on six Sentiment Analysis benchmarks. The first one is the IMDB dataset (ai.stanford.edu/amaas/data/sentiment/) (Maas et al. 2011), which consists of movie reviews collected from IMDB. The IMDB dataset is one of the largest sentiment analysis dataset that is publicly available; it also comes with an unlabeled set which allows us to evaluate semisupervised learning methods. The rest five datasets are all collected from Amazon (www.cs.jhu.edu/mdredze/datasets/sentiment/) (Blitzer, Dredze, and Pereira 2007), which corresponds to the reviews of five different products: books, DVDs, music, electronics, kitchenware. All the six datasets are already tokenized as either uni-gram or bi-gram features. For computational reasons, only the words that occur in at least 30 training examples are selected. The statistics of datasets are summarized in Table 1.

Methods

Bag of Words (BoW). Instead of using the raw word counts directly, a simple step of data normalization is performed:

$$x_{i,j} = \frac{\log(1 + c_{i,j})}{\max_j \ \log(1 + c_{i,j})} \qquad (13)$$

where $c_{i,j}$ denotes the number of occurrences of the $j^{th}$ word in the $i^{th}$ document, $x_{i,j}$ denotes the normalized count. This normalization was chosen because it preserves the sparsity of the Bag of Words features; also each feature element is normalized to the range [0, 1]. Note that the very same normalized Bag of Words features are fed into the autoencoders.

Denoising Autoencoder (DAE) [Vincent et al. 2008]. This refers to the regular Denoising Autoencoder defined in Equation (1) with squared Euclidean distance loss: $D(\tilde{x}, x) = \|\tilde{x} - x\|_2^2$. This is also used in [Glorot, Bordes, and Bengio 2011] on the Amazon datasets for domain adaptation. ReLu max(0, x) is used as the activation function, and Sigmoid as the decoding function.

Denoising Autoencoder with Finetuning (DAE+) [Vincent et al. 2008]. This denotes the common approach to continue training an DAE on labeled data by replacing the decoding part of DAE with a Softmax layer.

Feedforward Neural Network (NN). This is the standard fully connected neural network with one hidden layer and random initialization. The same activation function is used as that in Autoencoders, i.e., Rectified Linear Activation Unit (ReLU).

Logistic Regression with Dropout (LrDrop) (Wager, Wang, and Liang 2013). This is a model where logistic regression is regularized with the marginalized dropout noise. LrDrop differs from the present approach as it uses feature noising as an explicit regularization. Another difference is that the present technology is able to learn nonlinear representations, not merely a classifier, and thus is potentially able to model more complicated patterns in data.

Semisupervised Bregman Divergence Autoencoder (SBDAE). This corresponds to the present model with Denoising Autoencoder as the feature learner. The training process is roughly equivalent to training on BoW followed by the training of DAE, except that the loss function of DAE is replaced with the loss function defined in Equation (11). $\beta$ is cross-validated from the set $\{10^4, 10^5, 10^6, 10^7, 10^8\}$ (note that larger $\beta$ corresponds to weaker Bayesian regularization).

Semisupervised Bregman Divergence Autoencoder with Finetuning (SBDAE+). Note that except for BoW and LrDrop, all the other methods require a predefined dimensionality of representation. Fixed sizes were used on all the datasets. For SBDAE and NN, a small hidden size is sufficient, so 200 was used. For DAE, it is observed that it benefits from very large hidden sizes; however, due to computational constraints, 2000 were taken. For BoW, DAE, SBDAE, SVM2 is used as the classifier. All the models are trained with mini-batch Stochastic Gradient Descent with momentum of 0.9.

As shown in FIG. 1, a set of labeled data is received 101. A first classifier is trained on the labeled data 102, and a set of classifier weights derived 103. The weights are then transferred for use by an autoencoder, by defining a stochastic posterior probability distribution on the set of weights 104, with an approximated marginalized loss function 105. A second classifier is trained based on the representation of the autoencoder 106. In use, a system employing the autoencoder receives unlabeled data 107, and generates classifications of the received data 108. After the learning transfer, the linear classifier is not required for use by the system, though for adaptive learning, the training and learning transfer may be periodic or continuous.

Figure 2:
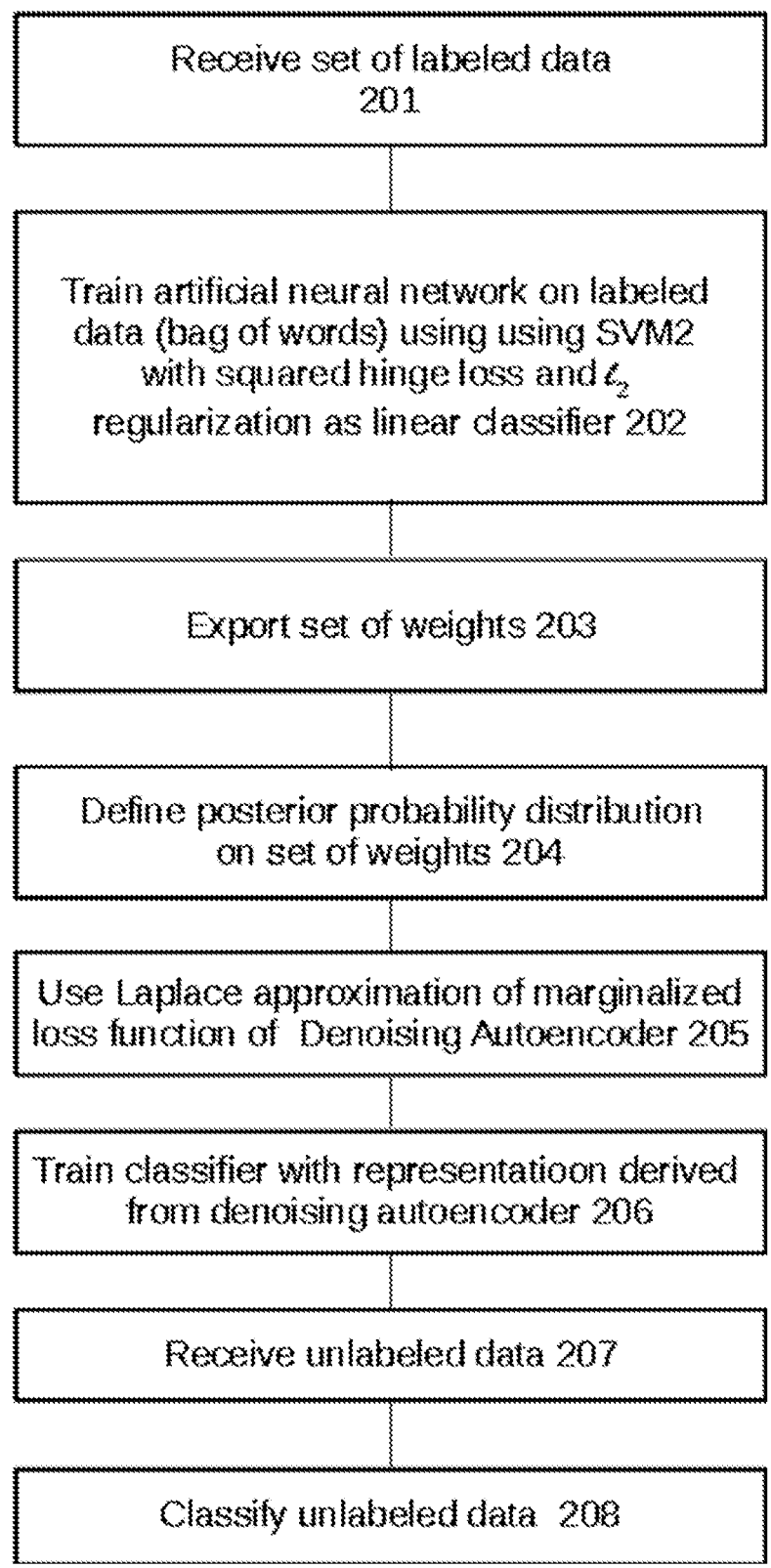
FIG. 2 shows a preferred embodiment of a process flow of the invention.

FIG. 2 shows a preferred embodiment of the method. The labelled set of data is received 201, and used to train a classifier, which in this case is an artificial neural network trained on a "bag of words" representation of the labeled data, using SVM2 with squared hinge loss and $l_2$ regularization as the linear classifier 202. The trained set of weights is then exported in a learning transfer process, to a denoising autoencoder 203. Using a statistical method, a posterior probability distribution on the set of weights is defined 204, for example using a Laplace approximation, to define the approximate marginalized loss function of the denoising autoencoder 205. A representation of the denoising autoencoder is then used to train a classifier 206. In use, a system employing the classifier receives unlabeled data 207, and generates classifications of the received data 208.

Results

The results are summarized as classification error rate in Table 2. First of all, the present technology consistently beats BoW with a margin, and it achieves the best results on four (larger) datasets out of six. On the other hand, DAE, DAE+ and NN all fail to outperform BoW, although they share the same architecture as nonlinear classifiers. This suggests that SBDAE is able to learn a much better nonlinear feature transformation function by training with a more informed objective (than that of DAE). Moreover, note also that finetuning on labeled set (DAE+) significantly improves the performance of DAE, which is ultimately on a par with training a neural net with random initialization (NN). However, finetuning offers little help to SBDAE, as it is already implicitly guided by labels during the training.

LrDrop is the second best method tested. Thanks to the usage of dropout regularization, it consistently outperforms BoW, and achieves the best results on two (smaller) datasets. Compared with LrDrop, it appears that the present technology works better on large datasets ($\approx$10K words, more than 10K training examples) than smaller ones. This indicates that in high dimensional spaces with sufficient samples, SBDAE benefits from learning a nonlinear feature transformation that disentangles the underlying factors of variation, while LrDrop is incapable of doing so due to its nature as a linear classifier.

As the training of the autoencoder part of SBDAE does not require the availability of labels, incorporating unlabeled data after learning the linear classifier in SBDAE was assessed. As shown in Table 2, doing so further improves the performance over using labeled data only. This justifies that it is possible to bootstrap from a relatively small amount of labeled data and learn better representations with more unlabeled data with SBDAE.

To gain more insights of the results, the filters learned by SBDAE and DAE are further visualized on the IMDB dataset in Table 3. In particular, the top 5 most activated and deactivated words of the first 8 filters (corresponding to the first 8 rows of W) of SBDAE and DAE, respectively, are shown. First of all, it seems very difficult to make sense of the filters of DAE as they are mostly common words with no clear co-occurrence pattern. By comparison, the filters from SBDAE are mostly sensitive to words that demonstrate clear polarity. In particular, all the 8 filters seem to be most activated by certain negative words, and are most deactivated by certain positive words. In this way, the activation of each filter of SBDAE is much more indicative of the polarity than that of DAE, which explains the better performance of SBDAE over DAE. Note that this difference only comes from reweighting the reconstruction errors in a certain way, with no explicit usage of labels.

The present technology falls into the general category of learning representations for text data. In particular, there have been a lot of efforts that try to learn compact representations for either words or documents [Turney and Pantel 2010; Blei, Ng, and Jordan 2003; Deerwester et al. 1990; Mikolov et al. 2013; Le and Mikolov 2014; Maas et al. 2011]. LDA [Blei, Ng, and Jordan 2003] explicitly learns a set of topics, each of which is defined as a distribution on words; a document is thus represented as the posterior distribution on topics, which is a fixed-length, non-negative vector. Closely related are matrix factorization models such as LSA [Deerwester et al. 1990] and Non-negative Matrix Factorization (NMF) [Xu, Liu, and Gong 2003]. While LSA factorizes the docterm matrix via Singular Value Decomposition, NMF learns non-negative basis and coefficient vectors. Similar to these efforts, the present technology also works directly on the doc-term matrix. However, thanks to the usage of autoencoder, the representation for documents are calculated instantly via direct matrix product, which eliminates the need of expensive inference. The present technology distinguishes itself as a semisupervised representation learning model, where label information can be effectively leveraged.

Recently, there has also been an active thread of research on learning word representations. Notably, [Mikolov et al. 2013] shows learning of interesting word embeddings via very simple architecture on a large amount of unlabeled dataset. Moreover, [Le and Mikolov 2014] proposed to jointly learn representations for sentences and paragraphs together with words in a similar unsupervised fashion. The present technology does not require explicit modelling of the representations for words, but it is straightforward to incorporate such modelling by adding an additional linear layer at the bottom of the autoencoder. Further, various other aspects of semantic data analysis and processing, as well as use in databases, social networks, newsfeeds, environmental monitoring (e.g., security cameras, telephones, call-centers, smartphone apps, etc.), may be implemented, improved, facilitated, or integrated, using the technology. The various references cited herein, each of which is expressly incorporated herein by reference it their entirety, detail various applications, preprocessing, postprocessing, and techniques that may be used in conjunction with the disclosed features. For example, in a human machine interface context, the sentiment analysis may be used to adapt the user interface, to the sentiments expressed, thus improving the human machine interface per se.

From the perspective of machine learning methodology, the present approach resembles the idea of layer-wise pre-training in deep Neural Networks [Bengio 2009]. The model differs from the traditional training procedure of autoencoders in that the label information is effectively utilized to guide the representation learning. A related idea was proposed in [Socher et al. 2011], where they train Recursive autoencoders on sentences jointly with prediction of sentiment. Due to the delicate recursive architecture, their model only works on sentences with given parsing trees, and could not generalize to documents. MTC [Rifai et al. 2011a] is another work that models the interaction of autoencoders and classifiers. However, their training of autoencoders is purely unsupervised, the interaction comes into play by requiring the classifier to be invariant along the tangents of the learned data manifold. It is not difficult to see that the assumption of MTC would not hold when the class labels did not align well with the data manifold, which is a situation the present model does not suffer from.

An extension to prior autoencoders is provided, for learning task-specific representations for textual data. The traditional autoencoders are generalized, by relaxing their loss function to the Bregman Divergence, and then a discriminative loss function derived from the label information.

Experiments on text classification benchmarks have shown that the technology significantly outperforms "Bag of Words", a traditional Denoising Autoencoder, and other competing methods. The model successfully learns discriminative features, which unsupervised methods typically fail to do.

It is noted that the application of sentiment analysis is but one application of the underlying technology. In fact, various dimensions may be analyzed using the autoencoder, such as feminine-masculine, anger, fear, courage, sadness, tender, joy, disgust, trust, acceptance, anticipation, expectation, surprise, friendship/enmity, shame, confidence, kindness, pity, indignation, envy, love, etc. (See, simple.wikipedia.org/wiki/List_of_emotions: Simple emotions: discovery—anger; envy—no surprise—expectation; wonder—surprise—commonplace; happiness—sadness; amusement—weariness; courage—timidity—cowardice; and pity—cruelty; Complex emotions: pride—modesty—shame; closeness—detachment—distance; complaint/pain—doing average—pleasure; caution—boldness—rashness; patience—mere tolerance—anger; relaxation—composure—stress; and envy—goodwill; Pure emotions: fear—nervousness—security; togetherness—privacy; respect—disrespect; appreciation—envy; love—no love lost—hatred; hope—despair; and confusion—being confused.) (See en.wikipedia.org/wiki/Emotion: Affection, Anger, Angst, Anguish, Annoyance, Anticipation, Anxiety, Apathy, Arousal, Awe, Boredom, Confidence, Contempt, Contentment, Courage, Curiosity, Depression, Desire, Despair, Disappointment, Disgust, Distrust, Ecstasy, Embarrassment, Empathy, Envy, Euphoria, Fear, Frustration, Gratitude, Grief, Guilt, Happiness, Hatred, Hope, Horror, Hostility, Humiliation, Interest, Jealousy, Joy, Loneliness, Love, Lust, Outrage, Panic, Passion, Pity, Pleasure, Pride, Rage, Regret, Remorse, Resentment, Sadness, Saudade, Schadenfreude, Self-confidence, Shame, Shock, Shyness, Sorrow, Suffering, Surprise, Trust, Wonder, Worry.)

Further, the system can learn the orthogonal concepts, using traditional machine learning technologies. For example, principal component analysis, and the related singular value decomposition, may be used to define and extract linearly uncorrelated (or weakly correlated) variables from a dataset. See, en.wikipedia.org/wiki/Principal_component_analysis; en.wikipedia.org/wiki/Singular_value_decomposition.

Rather than implementing an autoencoder that makes a binary determination along an orthogonal axis, the technology may also be used to classify data as belonging to different clusters. See, en.wikipedia.org/wiki/Cluster_analysis. That is, a decision may be made whether a document should be classified within either of two clusters within a data space. The technology may also be extended to higher dimensions, and therefore is not limited to a simple binary determination. When considering higher dimensions, one option is to classify the data pairwise along each possible axis. The result may be a simple binary classification, or a classification, along with some metadata, such as the strength of the association, and the statistical uncertainty. Another option is to extend the autoencoder itself to higher dimensionality. See, en.wikipedia.org/wiki/Autoencoder; en.wikipedia.org/wiki/Dimensionality_reduction.

Textual information may be received. The textual information may include any language information such as text documents, text corpora, data bases, images, social media, e-mails, subtitles, recognized speech, etc. The textual information may be received from another system or retrieved from storage or another system. The textual information may include multiple documents of the same or different type and/format. A universal representation corresponding to the textual information may be obtained. The universal representation may be generated based on the textual information. In some embodiments, the textual information may be subjected to specific processing based on exhaustive technologies using a large number of natural language and universal semantic descriptions. The information may be processed using analysis including lexical-morphological, syntactic, semantic and ontological stages of analysis with identification of the lexical and semantic meanings/values for each element of information, construction of the corresponding data structures at each stage, and extraction of the corresponding features and attributes at each stage. These data structures may be indexed and stored in memory.

As a result, any text information may be transformed into a universal representation and stored in a unified language-independent form, which is subjected to indexing with all the capabilities derived therefrom. The concepts and their attributes may be indexed, since any concept (i.e., an assertion expressed in universal terms) may be enumerated, recorded, and found (searchable). This universal representation of text information may be a unified platform for constructing practically any NLP application. In some embodiments, the universal representation may include semantic class information for each word in the textual information.

Thus, knowledge accumulated the system about the language(s) and the world (semantics) may utilized. The disclosed system provides integrity, comprehensiveness and universality. For example, it may be sufficient to construct linguistic descriptions of a new language according to the standards of the present approach (represented by this disclosure and a group of parent applications incorporated herein by reference), and not only one or more applications, but entire series of said applications become accessible.

Preliminary processing of a text corpus may include at least the following steps: identifying morphological values, identifying lexical meanings, identifying semantic meanings, identifying ontological objects, and indexing the values, parameters and attributes extracted. This may allow for use of a semantic index, rather than an ordinary one, in applications.

Exemplary hardware includes at least one processor coupled to a memory. The memory may include random access memory (RAM) devices, cache memories, non-volatile or back-up memories such as programmable or flash memories, read-only memories (ROM), etc. In addition, the memory may be considered to include memory storage physically located elsewhere in the hardware, e.g. any cache memory in the processor as well as any storage capacity used as a virtual memory, e.g., as stored on a mass storage device.

The hardware may receive a number of inputs and outputs for communicating information externally. For interface with a user or operator, the hardware may include one or more user input devices (e.g., a keyboard, a mouse, imaging device, scanner, microphone) and a one or more output devices (e.g., a Liquid Crystal Display (LCD) panel, a sound playback device (speaker)). To embody the present invention, the hardware may include at least one screen device.

For additional storage, as well as data input and output, and user and machine interfaces, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor and each of the components is known in the art.

The hardware operates under the control of an operating system, and executes various computer software applications, components, programs, objects, modules, etc. to implement the techniques described above. Moreover, various applications, components, programs, objects, etc., collectively indicated by application software, may also execute on one or more processors in another computer coupled to the hardware via a network, e.g. in a distributed computing environment, whereby the processing required to implement the functions of a computer program may be allocated to multiple computers over a network.

In general, the routines executed to implement the embodiments of the present disclosure may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the technology has been described in the context of fully functioning computers and computer systems, those skilled in the art will appreciate that the various embodiments of the invention are capable of being distributed as a program product in a variety of forms, and may be applied equally to actually effect the distribution regardless of the particular type of computer-readable media used. Examples of computer-readable media include but are not limited to recordable type media such as volatile and non-volatile memory devices, removable disks, hard disk drives, optical disks (e.g., Compact Disk Read-Only Memory (CD-ROMs), Digital Versatile Disks (DVDs)), flash memory, etc., among others. Another type of distribution may be implemented as Internet downloads. The technology may be provided as ROM, persistently stored firmware, or hard-coded instructions.

While certain exemplary embodiments have been described and shown in the accompanying drawings, it is understood that such embodiments are merely illustrative and not restrictive of the broad invention and that the present disclosure is not limited to the specific constructions and arrangements shown and described, since various other modifications may occur to those ordinarily skilled in the art upon studying this disclosure. The disclosed embodiments may be readily modified or re-arranged in one or more of its details without departing from the principals of the present disclosure.

Implementations of the subject matter and the operations described herein can be implemented in digital electronic circuitry, computer software, firmware or hardware, including the structures disclosed in this specification and their structural equivalents or in combinations of one or more of them. Implementations of the subject matter described in this specification can be implemented as one or more computer programs, i.e., one or more modules of computer program instructions, encoded on one or more computer storage medium for execution by, or to control the operation of data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a non-transitory computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices).

Accordingly, the computer storage medium may be tangible and non-transitory. All embodiments within the scope of the claims should be interpreted as being tangible and non-abstract in nature, and therefore this application expressly disclaims any interpretation that might encompass abstract subject matter.

The present technology provides analysis that improves the functioning of the machine in which it is installed, and provides distinct results from machines that employ different algorithms.

The operations described in this specification can be implemented as operations performed by a data processing apparatus on data stored on one or more computer-readable storage devices or received from other sources.

The term "client or "server" includes a variety of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, a code that creates an execution environment for the computer program in question, e.g., a code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The architecture may be CISC, RISC, SISD, SIMD, MIMD, loosely-coupled parallel processing, etc. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone (e.g., a smartphone), a personal digital assistant (PDA), a mobile audio or video player, a game console, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well. For example, feedback provided to the user can be any form of sensory feedback, e.g., visual feedback, auditory feedback, or tactile feedback and input from the user can be received in any form, including acoustic, speech, or tactile input. In addition, a computer can interact with a user by sending documents to and receiving documents from a device that is used by the user. For example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are considered in a particular order, this should not be understood as requiring that such operations be performed in the particular order shown, in sequential order or that all operations be performed to achieve desirable results. In certain circumstances, multitasking and parallel processing may be advantageous. Moreover, the separation of various system components in the implementations described above should not be understood as requiring such separation in all implementations and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

TABLE 2

Left: our model achieves the best results on four (large ones) out of six datasets. Right: our model is able to take advantage of unlabeled data and gain better performance.

|  | books | DVD | music | electronics | kitchenware | IMDB | IMDB + unlabeled |
|---|---|---|---|---|---|---|---|
| BoW | 10.76 | 11.82 | 11.80 | 10.41 | 9.34 | 11.48 | N/A |
| DAE | 15.10 | 15.64 | 15.44 | 14.74 | 12.48 | 14.60 | 13.28 |
| DAE+ | 11.40 | 12.09 | 11.80 | 11.53 | 9.23 | 11.48 | 11.47 |
| NN | 11.05 | 11.89 | 11.42 | 11.15 | 9.16 | 11.60 | N/A |
| LrDrop | 9.53 | 10.95 | 10.90 | 9.81 | 8.69 | 10.88 | 10.73 |
| SBDAE | 9.16 | 10.90 | 10.59 | 10.02 | 8.87 | 10.52 | 10.42 |
| SBDAE+ | 9.12 | 10.90 | 10.58 | 10.01 | 8.83 | 10.50 | 10.41 |

TABLE 3

Visualization of learned feature maps. From top to bottom: most activated and deactivated words for SBDAE; most activated and deactivated words for DAE.

| | | | | | | | |
|---|---|---|---|---|---|---|---|
| nothing | disappointing | badly | save | even | dull | excuse | ridiculously |
| cannon | worst | disappointing | redeeming | attempt | fails | had | dean |
| outrageously | unfortunately | annoying | awful | unfunny | stupid | failed | none |
| lends | terrible | worst | sucks | couldn't | worst | rest | ruined |
| teacher | predictable | poorly | convince | worst | avoid | he | attempt |
| first | tears | loved | amazing | excellent | perfect | years | with |
| classic | wonderfully | finest | incredible | surprisingly | ? | terrific | best |
| man | helps | noir | funniest | beauty | powerful | peter | recommended |
| hard | awesome | magnificent | unforgettable | unexpected | excellent | cool | perfect |
| still | terrific | scared | captures | appreciated | favorite | allows | heart |
| long | wasn't | probably | to | making | laugh | TV | Someone |
| worst | guy | fan | the | give | find | might | yet |
| kids | music | kind | and | performances | where | found | goes |
| anyone | work | years | this | least | before | kids | away |
| trying | now | place | shows | comes | ever | having | poor |
| done | least | go | kind | recommend | although | ending | worth |
| find | book | trying | takes | instead | everyone | once | interesting |
| before | day | looks | special | wife | anything | wasn't | isn't |
| work | actors | everyone | now | shows | comes | American | rather |
| watching | classic | performances | someone | night | away | sense | around |

REFERENCES

Each of which is Expressly Incorporated Herein by Reference in its Entirety

Abraham, Ittai, Shiri Chechik, David Kempe, and Aleksandrs Slivkins. "Low-distortion inference of latent similarities from a multiplex social network." SIAM Journal on Computing 44, no. 3 (2015): 617-668.

Acharya, Ayan. *Knowledge transfer using latent variable models*. Diss. 2015.

Adomavicius, Gediminas, and Alexander Tuzhilin. "Toward the next generation of recommender systems: A survey of the state-of-the-art and possible extensions." *IEEE transactions on knowledge and data engineering* 17.6 (2005): 734-749.

Agnihotri, Deepak, Kesari Verma, and Priyanka Tripathi. "Computing symmetrical strength of N-grams: a two pass filtering approach in automatic classification of text documents." *SpringerPlus* 5.1 (2016): 942.

Ahmed, Talal. "Sentiment Analysis of IMDb movie reviews." (2015)

Al Moubayed, Noura, et al. "SMS Spam Filtering using Probabilistic Topic Modelling and Stacked Denoising Autoencoder." *International Conference on Artificial Neural Networks*. Springer International Publishing, 2016.

Albertini, Simone, Alessandro Zamberletti, and Ignazio Gallo. "Unsupervised feature learning for sentiment classification of short documents." *JLCL* 29.1 (2014): 1-15.

Aldenderfer, M. S. and R. K. Blashfield. Cluster Analysis. Sage Publications, Los Angeles, 1985.

Ali, Kamal, and Wijnand Van Stam. "TiVo: making show recommendations using a distributed collaborative filtering architecture." *Proceedings of the tenth ACM SIGKDD international conference on Knowledge discovery and data mining*. ACM, 2004.

Altekar, Gautam, et al. "Parallel metropolis coupled Markov chain Monte Carlo for Bayesian phylogenetic inference." *Bioinformatics* 20.3 (2004): 407-415.

Anava, Oren, et al. "Budget-constrained item cold-start handling in collaborative filtering recommenders via optimal design." *Proceedings of the 24th International Conference on World Wide Web*. ACM, 2015.

Anderberg, M. R., Cluster Analysis for Applications. Academic Press, New York, 1973.

Anderson, E. (1957). A semi-graphical method for the analysis of complex problems. *Proc. Nat. Acad. Sci. USA* 43923-927.

Anderson, T. W. (1958). *An Introduction to Multivariate Statistical Analysis*. Wiley, New York.

Anderson, T. W., and Bahadur, R. R. (1962). classification into two multivariate normal distributions with different covariance matrices. *Ann. Math. Statist.* 33420-431.

Andrews, D. F. (1972). Plots of high-dimensional data. *Biometrics* 28 125-136.

Angluin, D. Queries and concept learning, Machine Learning, 2, 319-342.

Ankerst, M., M. M. Breunig, H.-P. Kriegel, and J. Sander. OPTICS: Ordering Points To Identify the Clustering Structure. In Proc. of 1999 ACM-SIGMOD Intl. Conf. on Management of Data, pages 49-60, Philadelphia, Pennsylvania, June 1999. ACM Press.

Anuse, Alwin, and Vibha Vyas. "A novel training algorithm for convolutional neural network." *Complex & Intelligent Systems* 2.3 (2016): 221-234.

Arabie, P. (1977). clustering representations of group overlap. *J. Math. Soc.* 5 112-128.

Arabie, P. and Carroll, J. D. (1980). MAPCLUS: A mathematical programming approach to fitting to ADCLUS model. *Psychometrika* 45211-235.

Arabie, P., L. Hubert, and G. D. Soete. An overview of combinatorial data analysis. In P. Arabie, L. Hubert, and G. D. Soete, editors, Clustering and Classification, pages 188-217. World Scientific, Singapore, January 1996.

Art, D., Gnanadesikan, R., and Kettenring, J. R. (1982). Data-based metrics for cluster analysis. *Utilitas Mathematica* 31A 75-99.

Arulkumaran, Kai, Antonia Creswell, and Anil Anthony Bharath. "Improving Sampling from Generative Autoencoders with Markov Chains." *arXiv preprint arXiv:1610.09296* (2016).

Asimov, D. (1985). The grand tour. *SLAM J. Sci. Statist. Corn-put.* 6 128-143.

Auffarth, B csc.kth.se; A Genetic Algorithm for Clustering with Biased Mutation Operator Babu, B. Hari, N. Subash Chandra, and T. Venu Gopal. "Clustering Algorithms For High Dimensional Data—A Survey Of Issues And Existing Approaches."

Bachman, Philip, Doina Precup, and Importance Weighted Autoencoders. "Training Deep Generative Models: Variations on a Theme." (2015)

Bachman, Philip, Ouais Alsharif, and Doina Precup. "Learning with pseudo-ensembles." *Advances in Neural Information Processing Systems*. 2014.

Badr, Badr Mohammed, and S. Sameen Fatima. "Using Skipgrams, Bigrams, and Part of Speech Features for Sentiment Classification of Twitter Messages." (2015)

Baecchi, Claudio, et al. "A multimodal feature learning approach for sentiment analysis of social network multimedia." *Multimedia Tools and Applications* 75.5 (2016): 2507-2525.

Baker, F. B. (1974). Stability of two hierarchical grouping techniques, Case I: Sensitivity to data errors. *J. Amer. Statist. Assoc.* 69440-445.

Bakliwal, Akshat, et al. "Towards enhanced opinion classification using NLP techniques." *Proceedings of the 5th international joint conference on natural language processing (IJCNLP)*. Chiang Mai, Thailand. 2011.

Baldi, Pierre. "Autoencoders, unsupervised learning, and deep architectures." *ICML unsupervised and transfer learning* 27.37-50 (2012): 1.

Ball, G., and D. Hall. A Clustering Technique for Summarizing Multivariate Data. Behavior Science, 12:153-155, March 1967.

Banerjee, A., S. Merugu, I. S. Dhillon, and J. Ghosh. Clustering with Bregman Divergences. In Proc. of the 2004 SIAM Intl. Conf. on Data Mining, pages 234-245, Lake Buena Vista, FL, April 2004.

Banerjee, A.; Merugu, S.; Dhillon, I. S.; and Ghosh, J. 2004. Clustering with bregman divergences. In *Proceedings of the Fourth SIAM International Conference on Data Mining*, Lake Buena Vista, Florida, USA, Apr. 22-24, 2004, 234-245.

Baraglia, Ranieri, Patrizio Dazzi, Matteo Mordacchini, and Laura Ricci. "A peer-to-peer recommender system for self-emerging user communities based on gossip overlays." Journal of Computer and System Sciences 79, no. 2 (2013): 291-308.

Baum, E. Lang, K. Neural network algorithms that learn in polynomial time from examples and queries, IEEE Trans. Neural Networks, 2.

Bauschke, Heinz H., and Jonathan M. Borwein. "Joint and separate convexity of the Bregman distance." *Studies in Computational Mathematics* 8 (2001): 23-36.

Bayer, Justin, and Christian Osendorfer. "Variational inference of latent state sequences using recurrent networks." *stat* 1050 (2014): 6.

Beck, Carolyn, Srinivasa Salapaka, Puneet Sharma, and Yunwen Xu. "Dynamic Coverage and Clustering: A Maximum Entropy Approach." Distributed Decision Making and Control (2012): 215-243.

Becker, P. (1968). *Recognitions of Patterns*. Polyteknisk, Copenhagen.

Bell, P. A. and Korey, J. L. (1975). QUICLSTR: A FOR'TRAN program for hierarchical cluster analysis with a large number of subjects. *Behavioral Research Methods and Instrumentation* 7575.

Bellet, Aurélien, Amaury Habrard, and Marc Sebban. "A survey on metric learning for feature vectors and structured data." *arXiv preprint arXiv:*1306.6709 (2013).

Bengio, Y. 2009. Learning deep architectures for AI. *Foundations and Trends in Machine Learning* 2(1):1-127.

Bengio, Yoshua, Aaron Courville, and Pascal Vincent. "Representation learning: A review and new perspectives." *IEEE transactions on pattern analysis and machine intelligence* 35.8 (2013): 1798-1828.

Bengio, Yoshua, and Honglak Lee. "Editorial introduction to the Neural Networks special issue on Deep Learning of Representations." *Neural Networks* 64 (2015): 1-3.

Bengio, Yoshua, and Olivier Delalleau. "Justifying and generalizing contrastive divergence." *Neural computation* 21.6 (2009): 1601-1621.

Bengio, Yoshua, and Olivier Delalleau. "On the expressive power of deep architectures." *International Conference on Algorithmic Learning Theory*. Springer Berlin Heidelberg, 2011.

Bengio, Yoshua, et al. "Detonation classification from acoustic signature with the restricted Boltzmann machine." *Computational Intelligence* 28.2 (2012): 261-288.

Bengio, Yoshua, et al. "Towards biologically plausible deep learning." *arXiv preprint arXiv:*1502.04156 (2015).

Bengio, Yoshua, Ian J. Goodfellow, and Aaron Courville. "Deep learning." *An MIT Press book in preparation*. Draft chapters available at http://www.iro.umontreal.ca/~bengioy/dlbook (2015).

Bengio, Yoshua. "Deep Learning of Representations for Unsupervised and Transfer Learning." *ICML Unsupervised and Transfer Learning* 27 (2012): 17-36.

Bengio, Yoshua. "Learning deep architectures for AI." *Foundations and Trends® in Machine Learning* 2.1 (2009): 1-127.

Bengio, Yoshua. "Practical recommendations for gradient-based training of deep architectures." *Neural Networks: Tricks of the Trade*. Springer Berlin Heidelberg, 2012. 437-478.

Berg, Bernd A., and Alain Billoire. *Markov chain monte carlo simulations*. John Wiley & Sons, Inc., 2008.

Berg, M lib.tkk.fi; Human Abilities to Perceive, Understand, and Manage Multi-Dimensional Information with Visualizations Berkhin. P., Survey Of Clustering Data Mining Techniques. Technical report, Accrue Software, San Jose, CA, 2002.

Berzuini, Carlo, et al. "Dynamic conditional independence models and Markov chain Monte Carlo methods." *Journal of the American Statistical Association* 92.440 (1997): 1403-1412.

Bespalov, Dmitriy, et al. "Sentiment classification based on supervised latent n-gram analysis." *Proceedings of the 20th ACM international conference on Information and knowledge management*. ACM, 2011.

Bespalov, Dmitriy, et al. "Sentiment classification with supervised sequence embedding." *Joint European Conference on Machine Learning and Knowledge Discovery in Databases*. Springer Berlin Heidelberg, 2012.

Bhat, Sajid Yousuf, and Muhammad Abulaish. "A density-based approach for mining overlapping communities from social network interactions." In Proceedings of the 2nd International Conference on Web Intelligence, Mining and Semantics, p. 9. ACM, 2012.

Bhowmik, Avradeep, and Joydeep Ghosh. "Monotone Retargeting for Unsupervised Rank Aggregation with Object Features." *arXiv preprint arXiv:*1605.04465 (2016).

Bhutani, Rashmi. "Categorical Difference based Feature Weighting Schemes for Review Analysis." International Journal of Computer Systems (ISSN: 2394-1065), Volume 02—Issue 04, April, 2015

Binder, D. A. (1978). Comment on 'Estimating mixtures of normal distributions and switching regressions'. j *Amer. Statist. Assoc.* 73746-747.

Blashfield, R. K., Aldenderfer, M. S. and Morey, L. C. (1982). cluster analysis literature on validation. In *Classifying Social Data*. (H. Hudson, ed.) 167-176. Jossey-Bass, San Francisco.

Blei, D. M.; Ng, A. Y.; and Jordan, M. I. 2003. Latent dirichlet allocation. *Journal of Machine Learning Research* 3:993-1022.

Blitzer, J.; Dredze, M.; and Pereira, F. 2007. Biographies, bollywood, boom-boxes and blenders: Domain adaptation for sentiment classification. In *ACL 2007, Proceedings of the 45th Annual Meeting of the Association for Computational Linguistics*, Jun. 23-30, 2007, Prague, Czech Republic.

Bock, H. H. (1985). On significance tests in cluster analysis. J. *Classification* 277-108.

Boley, Daniel, Vivian Borst, and Maria Gini. "An unsupervised clustering tool for unstructured data." In IJCAI 99 Int'l Joint Conf. on Artificial Intelligence. 1999.

Boley, D., Principal Direction Divisive Partitioning. Data Mining and Knowledge Discovery, 2(4):325-344, 1998.

Boratto L, 2012 veprints.unica.it; Group recommendation with automatic detection and classification of groups Bordes, Antoine, et al. "A semantic matching energy function for learning with multi-relational data." *Machine Learning* 94.2 (2014): 233-259.

Bordes, Antoine, Léon Bottou, and Patrick Gallinari. "Sgd-qn: Careful quasi-newton stochastic gradient descent." *Journal of Machine Learning Research* 10. July (2009): 1737-1754.

Bottou, Léon. "Large-scale machine learning with stochastic gradient descent." *Proceedings of COMPSTAT'2010*. Physica-Verlag HD, 2010. 177-186.

Bottou, Léon. "Stochastic gradient descent tricks." *Neural Networks: Tricks of the Trade*. Springer Berlin Heidelberg, 2012. 421-436.

Boulanger-Lewandowski, Nicolas, Yoshua Bengio, and Pascal Vincent. "Modeling temporal dependencies in high-dimensional sequences: Application to polyphonic music generation and transcription." *arXiv preprint arXiv:* 1206.6392 (2012).

Boulanger-Lewandowski, Nicolas, Yoshua Bengio, and Pascal Vincent. "High-dimensional sequence transduction."

2013 IEEE International Conference on Acoustics, Speech and Signal Processing. IEEE, 2013.

Boureau, Y-lan, and Yann L. Cun. "Sparse feature learning for deep belief networks." *Advances in neural information processing systems.* 2008.

Boutilier, Craig, Richard S. Zemel, and Benjamin Marlin. "Active collaborative filtering." *Proceedings of the Nineteenth conference on Uncertainty in Artificial Intelligence.* Morgan Kaufmann Publishers Inc., 2002.

Box, G. Draper, N. Empirical model-building and response surfaces. Wiley.

Bradley, P. S., and U. M. Fayyad. Refining Initial Points for K-Means Clustering. In Proc. of the 15th Intl. Conf. on Machine Learning, pages 91-99, Madison, WI, July 1998. Morgan Kaufmann Publishers Inc.

Braida, Filipe, et al. "Transforming collaborative filtering into supervised learning." *Expert Systems with Applications* 42.10 (2015): 4733-4742.

Brakel, Philemon, and Benjamin Schrauwen. "Energy-based temporal neural networks for imputing missing values." *International Conference on Neural Information Processing.* Springer Berlin Heidelberg, 2012.

Brakel, Philémon. *The estimation and application of unnormalized statistical models.* Diss. Ghent University, 2014.

Breese, John S., David Heckerman, and Carl Kadie. "Empirical analysis of predictive algorithms for collaborative filtering." *Proceedings of the Fourteenth conference on Uncertainty in artificial intelligence.* Morgan Kaufmann Publishers Inc., 1998.

Breiman, L. Meisel, W. S., and Purcell, E. (1977). Variable kernel estimates of multivariate densities and their calibration. *Technometrics* 19 135-144.

Brieman, L., Friedman, J. H., Olshen, R. A., and Stone, C. J. (1984). *Classification and Regression Trees.* Wadsworth, Belmont, CA Broadbent, S. R. and Hammersley, J. M. (1957). Percolation Processes, I: Crystals and Mazes. *Proc. Cambridge Philos. Soc.* 53629-641

Brooks, Stephen. "Markov chain Monte Carlo method and its application." *Journal of the royal statistical society: series D (the Statistician)* 47.1 (1998): 69-100.

Bruna, Joan, Pablo Sprechmann, and Yann LeCun. "Super-Resolution with Deep Convolutional Sufficient Statistics." *arXiv preprint arXiv:*1511.05666 (2015).

Bu, Yingyi, Bill Howe, Magdalena Balazinska, and Michael D. Ernst. "The HaLoop approach to large-scale iterative data analysis." The VLDB Journal—The International Journal on Very Large Data Bases 21, no. 2 (2012): 169-190.

Budiman, Arif, Mohamad Ivan Fanany, and Chan Basaruddin. "Online marginalized linear stacked denoising autoencoders for learning from big data stream." 2015 *International Conference on Advanced Computer Science and Information Systems (ICACSIS).* IEEE, 2015.

Budiman, Arif, Mohamad Ivan Fanany, and Chan Basaruddin. "Stacked denoising autoencoder for feature representation learning in pose-based action recognition." 2014 *IEEE 3rd Global Conference on Consumer Electronics (GCCE).* IEEE, 2014.

Buja, A., Hurify, C. and Mcdonald, J. A. (1986). A data viewer for multivariate data. *Computer Science and Statistics: Proceedings of the 18th Symposium on the Interface* 171-174.

Burda, Yuri, Roger Grosse, and Ruslan Salakhutdinov. "Importance weighted autoencoders." *arXiv preprint arXiv:*1509.00519 (2015).

Burnap, Alex, et al. "Improving preference prediction accuracy with feature learning." *ASME 2014 International Design Engineering Technical Conferences and Computers and Information in Engineering Conference.* American Society of Mechanical Engineers, 2014.

Cacoullos, T. (1966). Estimation of a multivariate density. *Ann. Math. Statist.* 18 179-189.

Cai, Rui, Lei Zhang, and Wei-Ying Ma. "Scalable music recommendation by search." U.S. Pat. No. 8,438,168, issued May 7, 2013.

Cai, Rui, Chao Zhang, Lei Zhang, and Wei-Ying Ma. "Scalable music recommendation by search." In Proceedings of the 15th ACM international conference on Multimedia, pp. 1065-1074. ACM, 2007.

Cai, Xiongcai, et al. "Collaborative filtering for people to people recommendation in social networks." *Australasian Joint Conference on Artificial Intelligence.* Springer Berlin Heidelberg, 2010.

Cai, Xiongcai, et al. "Learning collaborative filtering and its application to people to people recommendation in social networks." 2010 *IEEE International Conference on Data Mining.* IEEE, 2010.

Calma, Adrian, et al. "From Active Learning to Dedicated Collaborative Interactive Learning." *ARCS* 2016 (2016).

Campbell, Colin, Nello Cristianini, and Alex Smola. "Query learning with large margin classifiers." *ICML.* 2000.

Carlin, Bradley P., and Siddhartha Chib. "Bayesian model choice via Markov chain Monte Carlo methods." *Journal of the Royal Statistical Society. Series B (Methodological)* (1995): 473-484.

Carrizosa, Emilio, and Dolores Romero Morales. "Supervised classification and mathematical optimization." *Computers & Operations Research* 40, no. 1 (2013): 150-165.

Cha, Miriam, Youngjune Gwon, and H. T. Kung. "Multimodal sparse representation learning and applications." *arXiv preprint arXiv:*1511.06238 (2015).

Chakankar, Abhijit, Sanjukta Pal Mathur, and Krishna Venuturimilli. "Sentiment analysis of users' reviews and comments."

Chakrabarti, Soumen, et al. "Text Search-Enhanced with Types and Entities." *Text Mining* (2009): 233.

Chang, Chin-Chun, and Hsin-Yi Chen. "Semi-supervised clustering with discriminative random fields." *Pattern Recognition* 45, no. 12 (2012): 4402-4413.

Cheeseman, P., Self, M., Kelly, J., Taylor, W., Freeman, D., Stutz, J. Bayesian classification, In AAAI 88, The 7th National Conference on Artificial Intelligence, 607-611. AAAI Press.

Chen, Chao, et al. "WEMAREC: Accurate and Scalable Recommendation through Weighted and Ensemble Matrix Approximation." *Proceedings of the 38th International ACM SIGIR Conference on Research and Development in Information Retrieval.* ACM, 2015.

Chen, H., Gnanadesikan, R., and Kettenring, J. R. (1974). Statistical methods for grouping corporations. *Sankhya* B 36 1-28.

Chen, Hongjie, et al. "Parallel inference of dirichlet process gaussian mixture models for unsupervised acoustic modeling: A feasibility study." *Proceedings of Interspeech.* 2015.

Chen, Jianshu, et al. "End-to-end Learning of Latent Dirichlet Allocation by Mirror-Descent Back Propagation." *arXiv preprint arXiv:*1508.03398 (2015).

Chen, Jianshu, et al. "End-to-end Learning of LDA by Mirror-Descent Back Propagation over a Deep Architecture." *Advances in Neural Information Processing Systems*. 2015.

Chen, Lin, and Wan-Yu Deng. "Instance-Wise Denoising Autoencoder for High Dimensional Data." *Mathematical Problems in Engineering* 2016 (2016).

Chen, Minmin, et al. "Marginalized denoising autoencoders for domain adaptation." *arXiv preprint arXiv:*1206.4683 (2012).

Chen, Minmin, et al. "Marginalized stacked denoising autoencoders." *Proceedings of the Learning Workshop*, Utah, UT, USA. Vol. 36. 2012.

Chen, Minmin, et al. "Marginalizing stacked linear denoising autoencoders." *Journal of Machine Learning Research* 16 (2015): 3849-3875.

Chen, Si, and Meera Hahn. "Deep Tracking: Biologically Inspired Tracking with Deep Convolutional Networks."

Chen, Y H, Journal of Computational Biology, 2012—online.liebertpub.com; The k Partition-Distance Problem Chen, Yutian, and Max Welling. "Parametric Herding." *AISTATS*. 2010.

Cheng, Hong, Yang Zhou, Xin Huang, and Jeffrey Xu Yu. "Clustering large attributed information networks: an efficient incremental computing approach." Data Mining and Knowledge Discovery 25, no. 3 (2012): 450-477.

Cheng, Jian, et al. "Fast and accurate image matching with cascade hashing for 3d reconstruction." *IEEE Conference on Computer Vision and Pattern Recognition (CVPR*2014). 2014.

Cherian, Anoop, et al. "Jensen-Bregman LogDet divergence with application to efficient similarity search for covariance matrices." *IEEE transactions on pattern analysis and machine intelligence* 35.9 (2013): 2161-2174.

Cherian, Anoop, et al. *Jensen-Bregman LogDet divergence for efficient similarity computations on positive definite tensors*. No. TR-12-013. Minnesota Univ Minneapolis Dept Of Computer Science And Engineering, 2012.

Cherla, Srikanth, et al. "A Distributed Model For Multiple-Viewpoint Melodic Prediction." *ISMIR*. 2013.

Cherla, Srikanth, et al. "Generalising the Discriminative Restricted Boltzmann Machine." *arXiv preprint arXiv:*1604.01806 (2016).

Chernoff, H. (1972). The selection of effective attributes for deciding between hypotheses using linear discriminant functions. In *Frontiers of Pattern Recognition*. (S. Watanabe, ed.) 55-60. Academic Press, New York.

Chernoff, H. (1973a). Some measures for discriminating between normal multivariate distributions with unequal covariance matrices. In *Multivariate Analysis Ill*. (P. R. Krishnaiah, ed.) 337-344. Academic Press, New York.

Chernoff, H. (1973b). The use of faces to represent points in k-dimensional space graphically. J *Amer. Statist. Assoc.* 68 361-368.

Chi, Lianhua, Bin Li, and Xingquan Zhu. "Context-Preserving Hashing for Fast Text Classification." *SDM*. 2014.

Cho, KyungHyun. "Understanding dropout: training multilayer perceptrons with auxiliary independent stochastic neurons." *International Conference on Neural Information Processing*. Springer Berlin Heidelberg, 2013.

Christophe Jouis; Ismail Biskri; Jean-Gabriel Ganascia; Magali Roux, "Next Generation Search Engines", IGI GlobalPub, Mar. 31, 2012 (ISBN-10: 1-4666-0330-5).

Christou, Ioannis T., George Gekas, and Anna Kyrikou. "A classifier ensemble approach to the TV-viewer profile adaptation problem." International Journal of Machine Learning and Cybernetics 3, no. 4 (2012): 313-326.

Cichocki, Andrzej, et al. *Nonnegative matrix and tensor factorizations: applications to exploratory multi-way data analysis and blind source separation*. John Wiley & Sons, 2009.

Cichocki, Andrzej, Rafal Zdunek, and Shun-ichi Amari. "Hierarchical ALS algorithms for nonnegative matrix and 3D tensor factorization." *International Conference on Independent Component Analysis and Signal Separation*. Springer Berlin Heidelberg, 2007.

Cichocki, Andrzej, Rafal Zdunek, and Shun-ichi Amari. "Nonnegative matrix and tensor factorization [lecture notes]." *IEEE signal processing magazine* 25.1 (2008): 142-145.

Cleveland, W., Devlin, S., Grosse, E. Regression by local fitting, Journal of Econometrics, 37, 87-114.

Clunies-Ross, C. W. and Riffenburgh, R. H. (1960). Geometry and linear discrimination. *Biometrika* 47185-189.

CLUTO 2.1.1: Software for Clustering High-Dimensional Datasets. www.cs.umn.edu/~karypis, November 2003.

Cohn, D. Minimizing statistical bias with queries, AI Lab memo AIM-1552, Massachusetts Institute of Technology. Available by anonymous ftp from publications.ai.mit.edu.

Cohn, D. Neural network exploration using optimal experiment design, In Cowan, J., Tesauro, G., Alspector, J., Advances in Neural Information Processing Systems 6. Morgan Kaufmann. Expanded version available as MIT AI Lab memo 1491 by anonymous ftp to publications.ai.mit.edu.

Cohn, D., Atlas, L., Ladner, R. Improving generalization with active learning, Machine Learning, 5(2), 201-221.

Cohn, D., Atlas, L., Ladner, R. Training connectionist networks with queries and selective sampling, In Touretzky, D., Advances in Neural Information Processing Systems 2. Morgan Kaufmann.

Cohn, David A., Zoubin Ghahramani, and Michael I. Jordan. "Active learning with statistical models." *Journal of artificial intelligence research* (1996).

Cohn, David, Les Atlas, and Richard Ladner. "Improving generalization with active learning." *Machine learning* 15.2 (1994): 201-221.

Coletta, Luiz Fernando Sommaggio, et al. "Combining classification and clustering for tweet sentiment analysis." *Intelligent Systems (BRACIS), 2014 Brazilian Conference on*. IEEE, 2014.

Collins, Michael, Sanjoy Dasgupta, and Robert E. Schapire. "A generalization of principal components analysis to the exponential family." In *Advances in neural information processing systems*, pp. 617-624. 2002.

Cormack, R. M. (1971). A review of classification (with discussion). *J Roy. Statist. Soc*. A 134321-367.

Cornfield, J. (1962). Joint dependence of risk of coronary heart disease on serum cholesterol and systolic blood pressure: a discriminant function analysis. *Federal Proceedings* 21 58-61.

Cover, T. M. (1968). Estimation by the nearest neighbor rule. *IEEE Transactions Information Theory* IT-14 50-55.

Cover, T. M. and Hart, P. E. (1967). Nearest neighbor pattern classification. *IEEE Transactions, Information Theory* IT-13 21-27.

Cowles, Mary Kathryn, and Bradley P. Carlin. "Markov chain Monte Carlo convergence diagnostics: a comparative review." *Journal of the American Statistical Association* 91.434 (1996): 883-904.

Csurka, Gabriela, et al. "Unsupervised Domain Adaptation with Regularized Domain Instance Denoising." *Computer Vision—ECCV 2016 Workshops*. Springer International Publishing, 2016.

da Silva, Nádia Félix Felipe, et al. "Using unsupervised information to improve semi-supervised tweet sentiment classification." *Information Sciences* 355 (2016): 348-365.

Dai, Andrew M., and Quoc V. Le. "Semi-supervised sequence learning." *Advances in Neural Information Processing Systems.* 2015.

Dai, Wenyuan, et al. "Boosting for transfer learning." *Proceedings of the 24th international conference on Machine learning.* ACM, 2007.

Dallal, G. E. (1975) A user's guide to J. A. Hartigan's clustering algorithms. (unpublished manuscript) Yale University.

Day, N. E. (1969). Estimating the components of a mixture of normal distributions. *Biometrika* 56463-474.

DaY, N. E., and Kerridge, D. F., (1967). A general maximum likelihood discriminant. *Biometrics* 23313-323. 94

De Carolis, Berardina, Domenico Redavid, and Angelo Bruno. "A Sentiment Polarity Analyser based on a Lexical-Probabilistic Approach." (2015)

de Giorgio, Andrea. "A study on the similarities of Deep Belief Networks and Stacked Autoencoders." (2015).

de Máster, T F 2012—ir.ii.uam.es; Novelty and Diversity Enhancement and Evaluation in Recommender Systems Dedecius, Kamil, and Vladimíra Se. "Distributed modelling of big dynamic data with generalized linear models." *Information Fusion (FUSION), 2014 17th International Conference on.* IEEE, 2014.

Deerwester, S. C.; Dumais, S. T.; Landauer, T. K.; Furnas, G. W.; and Harshman, R. A. 1990. Indexing by latent semantic analysis. *JASIS* 41(6):391-407.

Defays, D. (1977). An efficient algorithm for a complete link method. *Computer Journal* 20364-366.

Delgado, Joaquin, and Naohiro Ishii. "Memory-based weighted majority prediction." *SIGIR Workshop Recomm. Syst. Citeseer.* 1999.

Demirtas, Erkin, and Mykola Pechenizkiy. "Cross-lingual polarity detection with machine translation." *Proceedings of the Second International Workshop on Issues of Sentiment Discovery and Opinion Mining.* ACM, 2013.

Dempster, A., Laird, N., Rubin, D. Maximum likelihood from incomplete data via the EM algorithm, J. Royal Statistical Society Series B, 39, 1-38.

Deng, Jun, et al. "Autoencoder-based unsupervised domain adaptation for speech emotion recognition." *IEEE Signal Processing Letters* 21.9 (2014): 1068-1072.

Deng, Jun, et al. "Introducing shared-hidden-layer autoencoders for transfer learning and their application in acoustic emotion recognition." *2014 IEEE International Conference on Acoustics, Speech and Signal Processing (ICASSP).* IEEE, 2014.

Deng, Jun, et al. "Sparse autoencoder-based feature transfer learning for speech emotion recognition." *Affective Computing and Intelligent Interaction (ACII), 2013 Humaine Association Conference on.* IEEE, 2013.

Deng, Jun. *Feature Transfer Learning for Speech Emotion Recognition.* Diss. Dissertation, München, Technische Universität München, 2016, 2016.

Deng, Zhi-Hong, Hongliang Yu, and Yunlun Yang. "Identifying Sentiment Words Using an Optimization Model with L1 Regularization." *Thirtieth AAAI Conference on Artificial Intelligence.* 2016.

Derrac, Joaquín, Isaac Triguero, Salvador García, and Francisco Herrera. "Integrating instance selection, instance weighting, and feature weighting for nearest neighbor classifiers by coevolutionary algorithms." IEEE Transactions on Systems, Man, and Cybernetics, Part B (Cybernetics) 42, no. 5 (2012): 1383-1397.

Derrac, Joaquín, and Steven Schockaert. "Characterising Semantic Relatedness using Interpretable Directions in Conceptual Spaces." *ECAI.* 2014.

Desjardins, Guillaume, Karen Simonyan, and Razvan Pascanu. "Natural neural networks." *Advances in Neural Information Processing Systems.* 2015.

Devi, B. Naveena, Y. Rama Devi, B. Padmaja Rani, and R. Rajeshwar Rao. "Design and implementation of web usage mining intelligent system in the field of e-commerce." Procedia Engineering 30 (2012): 20-27.

Dhillon, I. S., and D. S. Modha. Concept Decompositions for Large Sparse Text Data Using Clustering. Machine Learning, 42(1/2):143-175, 2001.

Dhillon, I. S., Y. Guan, and J. Kogan. Iterative Clustering of High Dimensional Text Data Augmented by Local Search. In Proc. of the 2002 IEEE Intl. Conf. on Data Mining, pages 131-138. IEEE Computer Society, 2002.

Dhillon, Inderjit S. "Metric and Kernel Learning." (2007).

Dhillon, Inderjit S., and Joel A. Tropp. "Matrix nearness problems with Bregman divergences." *SIAM Journal on Matrix Analysis and Applications* 29.4 (2007): 1120-1146.

Dick, N. P. and Bowden, D. C. (1973). Maximum likelihood estimation for mixtures of two normal distributions. *Biometrics* 29781-790

Dieng, Adji B., et al. "TopicRNN: A Recurrent Neural Network with Long-Range Semantic Dependency." *arXiv preprint arXiv:*1611.01702 (2016).

Ding, Chris H Q, Tao Li, and Michael I. Jordan. "Convex and semi-nonnegative matrix factorizations." *IEEE transactions on pattern analysis and machine intelligence* 32.1 (2010): 45-55.

Dixon, W. J. (ed.) (1981). *BMDP Statistical Software.* University of California Press, Berkeley.

Donoho, A. W., Donoho, D. L. and Gasko, M. (1985). MacS-pin graphical data analysis software. D2 Software, Austin.

Dosovitskiy, Alexey, et al. "Discriminative unsupervised feature learning with convolutional neural networks." *Advances in Neural Information Processing Systems.* 2014.

Dragoni, Mauro, Andrea G B Tettamanzi, and Célia da Costa Pereira. "Propagating and aggregating fuzzy polarities for concept-level sentiment analysis." *Cognitive Computation* 7.2 (2015): 186-197.

Dragoni, Mauro, Andrea G B Tettamanzi, and Célia da Costa Pereira. "A fuzzy system for concept-level sentiment analysis." *Semantic Web Evaluation Challenge.* Springer International Publishing, 2014.

Dragoni, Mauro, Andrea G B Tettamanzi, and Célia da Costa Pereira. "Using fuzzy logic for multi-domain sentiment analysis." *Proceedings of the 2014 International Conference on Posters & Demonstrations Track—Volume 1272.* CEUR-WS. org, 2014.

Dragut, A B, Methodology and Computing in Applied Probability, 2012—Springer; Stock Data Clustering and Multiscale Trend Detection Dragut, Eduard C., Weiyi Meng, and Clement T. Yu. "Deep Web Query Interface Understanding and Integration." Synthesis Lectures on Data Management 7, no. 1 (2012): 1-168.

Drosou, Marina, and Evaggelia Pitoura. "Dynamic diversification of continuous data." In Proceedings of the 15th International Conference on Extending Database Technology, pp. 216-227. ACM, 2012.

Du, Tianchuan, and Vijay K. Shanker. "Deep Learning for Natural Language Processing."

Duda, R. O. and Hart, P. E. (1973). *Pattern Classification and Scene Analysis*. Wiley, New York.

Duda, R. O., P. E. Hart, and D. G. Stork. Pattern Classification. John Wiley & Sons, Inc., New York, second edition, 2001.

Dumoulin, Vincent, et al. "On the challenges of physical implementations of RBMs." *arXiv preprint arXiv: 1312.5258* (2013).

Edmonston, B. (1985). MICRO-CLUSTER: Cluster analysis software for microcomputers. *Journal of Classification* 2 127-130.

Efron, B. (1975). The efficiency of logistic regression compared to normal discriminant analysis. *j Amer. Statist. Assoc.* 70 892-898.

Efron, B. (1979). Bootstrap methods: Another look at the jack-knife. *Ann. Statist.* 7 1-26.

Efron, B. (1982). *The Jackknife, The Bootstrap, and Other Resampling Plans*, SIAM NSF-CBMS, Monograph #38.

Efron, B. (1983). Estimating the error rate of a prediction rule: Improvements on cross-validation. *J. Amer. Statist. Assoc.* 78 316-331.

Egan, Toby Marshall, Baiyin Yang, and Kenneth R. Bartlett. "The effects of organizational learning culture and job satisfaction on motivation to transfer learning and turnover intention." *Human resource development quarterly* 15.3 (2004): 279-301.

Ehmke, Jan. Integration of information and optimization models for routing in city logistics. Vol. 177. Springer Science & Business Media, 2012.

El Sayad, I., Martinet, J., Zhang, Z. M., & Eisert, P. (2015). Multilayer Semantic Analysis in Image Databases. In *Real World Data Mining Applications* (pp. 387-414). Springer International Publishing.

Elahi, Mehdi, et al. "Personality-based active learning for collaborative filtering recommender systems." *Congress of the Italian Association for Artificial Intelligence*. Springer International Publishing, 2013.

Elahi, Mehdi, Francesco Ricci, and Neil Rubens. "A survey of active learning in collaborative filtering recommender systems." *Computer Science Review* (2016).

Elahi, Mehdi, Francesco Ricci, and Neil Rubens. "Active learning strategies for rating elicitation in collaborative filtering: a system-wide perspective." *ACM Transactions on Intelligent Systems and Technology (TIST)* 5.1 (2013): 13.

Erhan, Dumitru, et al. "Collaborative filtering on a family of biological targets." *Journal of chemical information and modeling* 46.2 (2006): 626-635.

Erhan, Dumitru, et al. "The Difficulty of Training Deep Architectures and the Effect of Unsupervised Pre-Training." *AISTATS*. Vol. 5. 2009.

Erhan, Dumitru, et al. "Why does unsupervised pre-training help deep learning?" *Journal of Machine Learning Research* 11. February (2010): 625-660.

Escalante, Hugo Jair, Manuel Montes-y-Goméz, and Luis Enrique Sucar. "An energy-based model for region-labeling." *Computer vision and image understanding* 115.6 (2011): 787-803.

Ester, M., H.-P. Kriegel, J. Sander, and X. Xu. A Density-Based Algorithm for Discovering Clusters in Large Spatial Databases with Noise. In Proc. of the 2nd Intl. Conf. on Knowledge Discovery and Data Mining, pages 226-231, Portland, Oregon, August 1996. AAAI Press.

Ester, M., H.-P. Kriegel, J. Sander, M. Wimmer, and X. Xu. Incremental Clustering for Mining in a Data Warehousing Environment. In Proc. of the 24th VLDB Conf., pages 323-333, New York City, August 1998. Morgan Kaufmann.

Everitt, B. (1980). *Cluster Analysis*. 2nd ed. Halsted, New York.

Everitt, B. S. and Hand, D. J. (1981). *Finite Mixture Distributions*. Chapman and Hall, London.

Everitt, B. S., S. Landau, and M. Leese. Cluster Analysis. Arnold Publishers, London, fourth edition, May 2001.

Fang, Yi, et al. "3d deep shape descriptor." *Proceedings of the IEEE Conference on Computer Vision and Pattern Recognition*. 2015.

Farver, T. B. and Dunn, O. J. (1979). Stepwise variable selection in classification problems. *Biom. J.* 21 145-153.

Fe'ldbaum, A. A. Optimal control systems. Academic Press, New York, NY

Fedorov, V. Theory of Optimal Experiments. Academic Press.

Feng, Tao. "Deep learning for music genre classification."

Feng, Xue, Yaodong Zhang, and James Glass. "Speech feature denoising and dereverberation via deep autoencoders for noisy reverberant speech recognition." 2014 *IEEE International Conference on Acoustics, Speech and Signal Processing (ICASSP)*. IEEE, 2014.

Fernández-Tobías, Ignacio, et al. "Alleviating the new user problem in collaborative filtering by exploiting personality information." *User Modeling and User-Adapted Interaction* (2015): 1-35.

Fersini, Elisabetta, Enza Messina, and Federico Alberto Pozzi. "Sentiment analysis: Bayesian ensemble learning." *Decision support systems* 68 (2014): 26-38.

Févotte, Cédric, and Jérôme Idier. "Algorithms for nonnegative matrix factorization with the $\beta$-divergence." *Neural Computation* 23.9 (2011): 2421-2456.

Fisher, D., Iterative Optimization and Simplification of Hierarchical Clusterings. Journal of Artificial Intelligence Research, 4:147-179, 1996.

Fisher, R. A. (1936). The use of multiple measurements in taxonomic problems. *Ann. Eugenics* 7 (part 2) 179-188.

Fisherkeller, M. A., Friedman, J. H., and Tukey, J. W. (1974). Prim-9: An interactive multidimensional data display and analysis system. SLAC-Pub. 1408, Stanford Linear Accelerator Center, Stanford, California Fitch, W. M. and Marcouash, E. (1967). Construction of phylogenetic trees. *Science* 155279-284.

Fix, E. and Hodges, J. (1951). Discriminatory analysis, non-parametric discrimination: consistency properties. Technical Report. Randolph Field, Texas: USAF School of Aviation Medicine.

Forestier, Germain, and Cédric Wemmert. "Semi-supervised learning using multiple clusterings with limited labeled data." *Information Sciences* 361 (2016): 48-65.

Fouad, Khaled M., Ahmed R. Khalifa, Nagdy M. Nagdy, and Hany M. Harb. "Web-based Semantic and Personalized Information Retrieval Semantic and Personalized Information Retrieval Semantic and Personalized Information Retrieval." (2012).

Fournier, Arxiv preprint arXiv:1204.2847, 2012—arxiv.org; Segmentation similarity and agreement Fowixes, E. B. (1987). Some diagnostics for binary logistic regression via smoothing. *Biometrika* to appear.

Fowlkes, E. B. and Mallows, C. L. (1983). A method for comparing two hierarchical clusterings (with discussion). *J Amer. Statist. Assoc.* 78553-583.

Fowlkes, E. B., Gnanadesikan, R. and Kettenring, J. R. (1987). Variable selection in clustering and other contexts.

In *Design, Data, and Analysis, by Some Friends of Cuthbert Daniel* (C. L. Mallows, ed.). Wiley, New York, to appear.

Fraysse, Aurélia, and Thomas Rodet. "A measure-theoretic variational Bayesian algorithm for large dimensional problems." *SIAM Journal on Imaging Sciences* 7.4 (2014): 2591-2622.

Freund, Yoav, et al. "Selective sampling using the query by committee algorithm." *Machine learning* 28.2-3 (1997): 133-168.

Friedman, H. P. and Rubin, J. (1967). On some invariant criteria for grouping data. *Journal of American Statistical Association* 62 1159-1178.

Friedman, J. H. and Tukey, J. W. (1974). A projection pursuit algorithm for exploratory data analysis. *IEEE Trans. Comput.* C-23 881-889.

Fu, Qiang, and Arindam Banerjee. "Multiplicative mixture models for overlapping clustering." 2008 *Eighth IEEE International Conference on Data Mining*. IEEE, 2008.

Ganu, Gayatree, Yogesh Kakodkar, and AméLie Marian. "Improving the quality of predictions using textual information in online user reviews." Information Systems 38, no. 1 (2013): 1-15.

Gao, Jun, Weiming Hu, Zhongfei Mark Zhang, and Ou Wu. "Unsupervised ensemble learning for mining top-n outliers." In Pacific-Asia Conference on Knowledge Discovery and Data Mining, pp. 418-430. Springer, Berlin, Heidelberg, 2012.

Garcia-Durán, Alberto, et al. "Combining two and three-way embedding models for link prediction in knowledge bases." *Journal of Artificial Intelligence Research* 55 (2016): 715-742.

Geman, S., Bienenstock, E., Doursat, R. Neural networks and the bias/variance dilemma, Neural Computation, 4, 1-58.

Gemulla, Rainer, et al. "Large-scale matrix factorization with distributed stochastic gradient descent." *Proceedings of the 17th ACM SIGKDD international conference on Knowledge discovery and data mining*. ACM, 2011.

Geras, Krzysztof J., and Charles Sutton. "Composite denoising autoencoders." *Joint European Conference on Machine Learning and Knowledge Discovery in Databases*. Springer International Publishing, 2016.

Geras, Krzysztof J., and Charles Sutton. "Scheduled denoising autoencoders." *arXiv preprint arXiv:*1406.3269 (2014).

Geyer, Charles J., and Elizabeth A. Thompson. "Annealing Markov chain Monte Carlo with applications to ancestral inference." *Journal of the American Statistical Association* 90.431 (1995): 909-920.

Ghaemi, Reza, Md Nasir Sulaiman, Hamidah Ibrahim, and Norwati Mustapha. "A novel fuzzy C-means algorithm to generate diverse and desirable cluster solutions used by genetic-based clustering ensemble algorithms." Memetic Computing 4, no. 1 (2012): 49-71.

Ghahramani, Z. Jordan, M. Supervised learning from incomplete data via an EM approach, In Cowan, J., Tesauro, G., Alspector, J., Advances in Neural Information Processing Systems 6. Morgan Kaufmann.

Ghahramani, Zoubin, Sam Roweis, and N. I. P. S. Tutorial. "Probabilistic models for unsupervised learning." *Neural Information Processing Systems* (Denver, Colorado 12 (1999).

Ghifary, Muhammad, W. Bastiaan Kleijn, and Mengjie Zhang. "Sparse representations in deep learning for noise-robust digit classification." 2013 *28th International Conference on Image and Vision Computing New Zealand (IVCNZ 2013)*. IEEE, 2013.

Giesbrecht, Eugenie. "Using product review sites for automatic generation of domain resources for sentiment analysis: Case studies." *Methods for the automatic acquisition of Language Resources and their evaluation methods* (2010): 43.

Gilks, Walter R. *Markov chain monte carlo*. John Wiley & Sons, Ltd, 2005.

Gilks, Walter R., Sylvia Richardson, and David J. Spiegelhalter. "Introducing markov chain monte carlo." *Markov chain Monte Carlo in practice* 1 (1996): 19.

Glazyrin, Nikolay. "Mid-level features for audio chord estimation using stacked denoising autoencoders." (2013).

Glorot, X.; Bordes, A.; and Bengio, Y. 2011. Domain adaptation for large-scale sentiment classification: A deep learning approach. In *Proceedings of the 28th International Conference on Machine Learning, ICML 2011*, Bellevue, Washington, USA, June 28-Jul. 2, 2011, 513-520.

Glorot, Xavier, and Yoshua Bengio. "Understanding the difficulty of training deep feedforward neural networks." *Aistats*. Vol. 9. 2010.

Glorot, Xavier, Antoine Bordes, and Yoshua Bengio. "Domain adaptation for large-scale sentiment classification: A deep learning approach." *Proceedings of the 28th International Conference on Machine Learning (ICML-11)*. 2011.

Gnanadesikan, R. (1977). *Methods for Statistical Data Analysis of Multivariate Observations*. Wiley, New York.

Gnanadesikan, R. and Kettenring, J. R. (1984). A pragmatic review of multivariate methods in applications. In *Statistics: An Appraisal*. (H. A. David and H. T. David, eds.).

Gnanadesikan, R., Kettenring, J. R. and Landwehr, J. M. (1982). Projection plots for displaying clusters. In *Statistics and Probability: Essays in Honor of C. R. Rao*. (G. Kallianpur, P. R. Krishnaiah and J. K. Ghosh, eds.) 281-294. North-Holland, Amsterdam.

Gnanadesikan, R., Kettenring, J. R., and Landwehr, J. M. (1977). Interpreting and assessing the results of cluster analyses. *Bull Int. Statis. Inst.* 47451-463.

Goh, Gyuhyeong. "Applications of Bregman Divergence Measures in Bayesian Modeling." (2015).

Goldman, L., Weinberg, M., Weisberg, M., Olshen, R., Cook, F., Sargent, R. K., Lamas, G. A., Dennis, C., Deckelbam, L., Fineberg, H., Stiratelu, R. and the Medical Housestaffs At Yale-New Haven Hospital and Brigham and Women's Hospital (1982). A computer-derived protocol to aid in the diagnosis of emergency room patients with acute chest pain. The *New England Journal of Medicine* 307588-596.

Goldstein, Tom, and Stanley Osher. "The split Bregman method for L1-regularized problems." *SIAM journal on imaging sciences* 2.2 (2009): 323-343.

Gong, G. (1982). Cross-validation, the jackknife, and the bootstrap: excess error estimation in forward logistic regression. Ph.D. dissertation. Stanford University Technical Report No. 80. Department of Statistics.

Gonzalez, Graciela H., et al. "Recent advances and emerging applications in text and data mining for biomedical discovery." *Briefings in bioinformatics* 17.1 (2016): 33-42.

Goodfellow, Ian J., et al. "Pylearn2: a machine learning research library." *arXiv preprint arXiv:*1308.4214 (2013).

Goodfellow, Ian, et al. "Measuring invariances in deep networks." *Advances in neural information processing systems.* 2009.

Gordon, Ajit P. Singh Geoffrey J. "Relational Learning via Collective Matrix Factorization." (2008).

Gordon, L. and Olshen, R. A. (1978). Asymptotically efficient solutions to the classification problem. *Ann. Statist.* 6 515-533.

Gordon, L. and Olshen, R. A. (1980). Consistent nonparametric regression from recursive partitioning schemes. *J. Mult. Anal.* 10 611-627.

Gordon, L. and Olshen, R. A. (1984). Almost surely consistent nonparametric regression from recursive partitioning schemes. *J. Mult. Anal.* 15 147-163.

Goroshin, Rostislav, and Yann LeCun. "Saturating auto-encoders." *arXiv preprint arXiv:*1301.3577 (2013).

Gower, J. C. and Ross, G. J. S. (1969). Minimum spanning trees and single linkage cluster analysis. *Appl. Statist.* 18 54-65.

Goyal, Ankit, and Amey Parulekar. "Sentiment Analysis for Movie Reviews."

Gray, J. B. and Ling, R. F. (1984). K-clustering as a detection tool for influential subsets regression (with discussion). *Technometrics* 26 305-330.

Green, Peter J. "Reversible jump Markov chain Monte Carlo computation and Bayesian model determination." *Biometrika* 82.4 (1995): 711-732.

Grolman, Edita, et al. "Utilizing Transfer Learning for In-Domain Collaborative Filtering." *Knowledge-Based Systems* (2016).

Gu, Jiatao, and Victor O K Li. "Efficient Learning for Undirected Topic Models." *arXiv preprint arXiv:* 1506.07477 (2015).

Gu, Shixiang, and Luca Rigazio. "Towards deep neural network architectures robust to adversarial examples." *arXiv preprint arXiv:*1412.5068 (2014).

Güder, Mennan. *Multimedia Data Modeling And Semantic Analysis By Multimodal Decision Fusion.* Diss. Middle East Technical University, 2015.

Pedronette, Daniel Carlos Guimarães, and Ricardo Da S. Torres. "Exploiting pairwise recommendation and clustering strategies for image re-ranking." *Information Sciences* 207 (2012): 19-34.

Gulhane, Ashwini, Prashant L. Paikrao, and D. S. Chaudhari. "A review of image data clustering techniques." *International Journal of Soft Computing and Engineering* 2, no. 1 (2012): 212-215.

Gülten, Sitki, and Andrzej Ruszczyński. "Two-stage portfolio optimization with higher-order conditional measures of risk." Annals of Operations Research 229, no. 1 (2015): 409-427.

Guo, Jiang, et al. "Cross-lingual dependency parsing based on distributed representations." *Proceedings of the 53rd Annual Meeting of the Association for Computational Linguistics and the 7th International Joint Conference on Natural Language Processing.* Vol. 1. 2015.

Guo, Rui, Wei Wang, and Hairong Qi. "Hyperspectral image unmixing using autoencoder cascade." *IEEE 7th Workshop on Hyperspectral Image and Signal Processing: Evolution in Remote Sensing.* 2015.

Guo, Yuchen, et al. "Active Learning with Cross-Class Knowledge Transfer." *Thirtieth AAAI Conference on Artificial Intelligence.* 2016.

Guo, Z., Zhang, Z. M., Xing, E. P., & Faloutsos, C. (2016). Multimodal Data Mining in a Multimedia Database Based on Structured Max Margin Learning. *ACM Transactions on Knowledge Discovery from Data (TKDD)*, 10(3), 23.

Guo, Zhen, and Mark Zhang. "Knowledge discovery from citation networks." U.S. Pat. Nos. 9,269,051 and 8,930,304.

Guo, Zhenyu. *Data Famine in Big Data Era.* Diss. The University Of British Columbia (Vancouver, 2014.

Guo, Zhenyu. *Data famine in big data era: machine learning algorithms for visual object recognition with limited training data.* Diss. University of British Columbia, 2014.

Gupta, Sunil Kumar, et al. "A Bayesian framework for learning shared and individual subspaces from multiple data sources." *Pacific-Asia Conference on Knowledge Discovery and Data Mining.* Springer Berlin Heidelberg, 2011.

Gupta, Sunil Kumar, et al. "A matrix factorization framework for jointly analyzing multiple nonnegative data sources." *Data Mining for Service.* Springer Berlin Heidelberg, 2014. 151-170.

Haff, L. R. (1986). On linear log-odds and estimation of discriminant coefficients. *Commun. Statist.—Theor. Meth.* 15 2131-2144.

Halkidi, M., Y. Batistakis, and M. Vazirgiannis. Cluster validity methods: part I. SIGMOD Record (ACM Special Interest Group on Management of Data), 31(2):40-45, June 2002.

Halkidi, M., Y. Batistakis, and M. Vazirgiannis. Clustering validity checking methods: part II. SIGMOD Record (ACM Special Interest Group on Management of Data), 31 (3):19-27, September 2002.

Hall, D. J. and Khanna, D. (1977). The ISODATA method of computation for relative perception of similarities and differences in complex and real data. In *Statistical Methods for Digital Computers* (Vol. 3). (K Enslein, A. Ralston, and H. W. Wilf, eds.) New York: John Wiley.

Hamerly, G., and C. Elkan. Alternatives to the k-means algorithm that find better clusterings. In Proc. of the 11th Intl. Conf. on Information and Knowledge Management, pages 600-607, McLean, Virginia, 2002. ACM Press.

Han, J., M. Kamber, and A. Tung. Spatial Clustering Methods in Data Mining: A review. In H. J. Miller and J. Han, editors, Geographic Data Mining and Knowledge Discovery, pages 188-217. Taylor and Francis, London, December 2001.

Han, Kun. *Supervised speech separation and processing.* Diss. The Ohio State University, 2014.

Hand, D. J. (1981). *Discrimination and Classification.* Wiley, New York.

Hardoon, David R., Sandor Szedmak, and John Shawe-Taylor. "Canonical correlation analysis: An overview with application to learning methods." *Neural computation* 16.12 (2004): 2639-2664.

Harpale, Abhay S., and Yiming Yang. "Personalized active learning for collaborative filtering." *Proceedings of the 31st annual international ACM SIGIR conference on Research and development in information retrieval.* ACM, 2008.

Hartigan, J. A. (1967). Representation of similarity matrices by trees. *J Amer. Statist. Assoc.* 62 1140-1158.

Hartigan, J. A. (1975). *Clustering Algorithms.* Wiley, New York.

Hartigan, J. A. (1977). Distribution problems in clustering. In *Classification and Clustering* (J. Van Ryzin, ed.) 45-71. Academic Press, New York.

Hartigan, J. A. (1978). Asymptotic distributions for clustering criteria. *Ann. Statist.* 6 117-131.

Hartigan, J. A. (1981). Consistency of single linkage for high density clusters. *J. Amer. Statist Assoc.* 76388-394.

Hartigan, J. A. and Hartigan, P. M. (1985). The dip test of multimodality. *Ann. of Statist.* 1370-84.

Hassan Khan, Farhan, Usman Qamar, and Saba Bashir. "Building Normalized SentiMI to enhance semi-supervised sentiment analysis." *Journal of Intelligent & Fuzzy Systems* 29.5 (2015): 1805-1816.

Hastie, T., R. Tibshirani, and J. H. Friedman. The Elements of Statistical Learning: Data Mining, Inference, Prediction. Springer, New York, 2001.

Hayashi, Kohei, et al. "Exponential family tensor factorization for missing-values prediction and anomaly detection." 2010 *IEEE International Conference on Data Mining*. IEEE, 2010.

He, Yulan, and Deyu Zhou. "Self-training from labeled features for sentiment analysis." *Information Processing & Management* 47.4 (2011): 606-616.

He, Yulan, Chenghua Lin, and Harith Alani. "Automatically extracting polarity-bearing topics for cross-domain sentiment classification." *Proceedings of the 49th Annual Meeting of the Association for Computational Linguistics: Human Language Technologies—Volume* 1. Association for Computational Linguistics, 2011.

He, Z. Z., Zhang, Z. F., Chen, C. M., & Wang, Z. G. (2015). E-commerce business model mining and prediction. *Frontiers of Information Technology & Electronic Engineering*, 16(9), 707-719.

Heckerman, D., Geiger, D., Chickering, D. Learning Bayesian networks: the combination of knowledge and statistical data, Tech report MSR-TR-94-09, Microsoft.

Heller, Katherine A., and Zoubin Ghahramani. "A Nonparametric Bayesian Approach to Modeling Overlapping Clusters." *AISTATS*. 2007.

Henderson, Matthew, Blaise Thomson, and Steve Young. "Word-based dialog state tracking with recurrent neural networks." *Proceedings of the 15th Annual Meeting of the Special Interest Group on Discourse and Dialogue (SIGDIAL)*. 2014.

Herlocker, Jon, Joseph A. Konstan, and John Riedl. "An empirical analysis of design choices in neighborhood-based collaborative filtering algorithms." *Information retrieval* 5.4 (2002): 287-310.

Herlocker, Jonathan L., et al. "An algorithmic framework for performing collaborative filtering." *Proceedings of the 22nd annual international ACM SIGIR conference on Research and development in information retrieval*. ACM, 1999.

Hermans, J., Habbema, J., and Schaefer, R. (1982). The ALLOC8O package for discriminant analysis, *Stat. Software Newsletter*, 8 15-20.

Hey, Jody, and Rasmus Nielsen. "Integration within the Felsenstein equation for improved Markov chain Monte Carlo methods in population genetics." *Proceedings of the National Academy of Sciences* 104.8 (2007): 2785-2790.

Hinton, Geoffrey E. "Training products of experts by minimizing contrastive divergence." *Neural computation* 14.8 (2002): 1771-1800.

Hinton, Geoffrey E., Michael Revow, and Peter Dayan. "Recognizing handwritten digits using mixtures of linear models." *Advances in neural information processing systems* (1995): 1015-1022.

Hinton, Geoffrey E., Simon Osindero, and Yee-Whye Teh. "A fast learning algorithm for deep belief nets." *Neural computation* 18.7 (2006): 1527-1554.

Hjelm, R. Devon, et al. "Iterative Refinement of Approximate Posterior for Training Directed Belief Networks." *arXiv preprint arXiv:*1511.06382 (2015).

Hodge, V., Tom Jackson, and Jim Austin. "Intelligent decision support using pattern matching." In Proceedings of the 1st International Workshop on Future Internet Applications for Traffic Surveillance and Management (FI-ATS-M 2011), Sofia, Bulgaria, pp. 44-54. 2011.

Hodson, F. R., Sneath, P. H. A. and Doran, J. E. (1966). Some experiments in the numerical analysis of archaeological data. *Biometrika* 53311-324.

Hofmann, Thomas. "Collaborative filtering via gaussian probabilistic latent semantic analysis." *Proceedings of the 26th annual international ACM SIGIR conference on Research and development in information retrieval*. ACM, 2003.

Hofmann, Thomas. "Latent semantic models for collaborative filtering." *ACM Transactions on Information Systems (TOIS)* 22.1 (2004): 89-115.

Hosmer, D. W. (1973). A comparison of iterative maximum likelihood estimates of the parameters of a mixture of two normal distributions under three different typos of sample. *Biometrics* 29761-770.

Hosseini-Asl, Ehsan. "Sparse feature learning for image analysis in segmentation, classification, and disease diagnosis." (2016).

Hou, Yimeng. "Performance Evaluation of Feature Learning For Stroke Classification In A Microwave-based Medical Diagnostic System."

Hu, Hengyuan, Lisheng Gao, and Quanbin Ma. "Deep Restricted Boltzmann Networks." *arXiv preprint arXiv:* 1611.07917 (2016).

Huang, Dongling, and Lan Luo. "Consumer preference elicitation of complex products using fuzzy support vector machine active learning." *Marketing Science* 35.3 (2016): 445-464.

Huang, Zan, Hsinchun Chen, and Daniel Zeng. "Applying associative retrieval techniques to alleviate the sparsity problem in collaborative filtering." *ACM Transactions on Information Systems (TOIS)* 22.1 (2004): 116-142.

Huber, P. J. (1985). Projection pursuit (with discussion). *Ann. Statist.* 6701-726. International Mathematical and Statistical Library (1977). Reference manual library 1, ed. 6. Vol. 1. Houston.

Huelsenbeck, John P., and Fredrik Ronquist. "MRBAYES: Bayesian inference of phylogenetic trees." *Bioinformatics* 17.8 (2001): 754-755.

Huynh, Trung, Yulan He, and Stefan Rüger. "Learning higher-level features with convolutional restricted Boltzmann machines for sentiment analysis." *European Conference on Information Retrieval*. Springer International Publishing, 2015.

Iigaya, Kiyohito, et al. "The modulation of savouring by prediction error and its effects on choice." *Elife* 5 (2016): e13747.

Ilango, V., R. Subramanian, and V. Vasudevan. "A five step procedure for outlier analysis in data mining." European Journal of Scientific Research 75, no. 3 (2012): 327-339.

Im, Daniel Jiwoong, et al. "Denoising criterion for variational auto-encoding framework." *arXiv preprint arXiv:* 1511.06406 (2015).

Im, Daniel Jiwoong. *Analyzing Unsupervised Representation Learning Models Under the View of Dynamical Systems*. Diss. University of Guelph, 2014.

Ingale, Ms Sonali D., and R. R. Deshmukh. "A Survey on Sentiment Mining." International Journal on Recent and Innovation Trends in Computing and Communication ISSN: 2321-8169 Volume: 2 Issue: 11 3595-3601 (2014)

Ishii, Takaaki, et al. "Reverberant speech recognition based on denoising autoencoder." *INTERSPEECH*. 2013.

Jain, A. K., and R. C. Dubes. Algorithms for Clustering Data. Prentice Hall Advanced Reference Series. Prentice Hall, March 1988. www.cse.msu.edu/~jain/Clustering Jain Dubes.pdf.

Jain, A. K., M. N. Murty, and P. J. Flynn. Data clustering: A review. ACM Computing Surveys, 31(3):264-323, September 1999.

Jain, Prateek, and Nagarajan Natarajan. "Regret Bounds for Non-decomposable Metrics with Missing Labels." arXiv preprint arXiv:1606.02077 (2016).

Jain, Sarthak, and Shashank Batra. "Cross-Lingual Sentiment Analysis using modified BRAE." Proceedings of the 2015 Conference on Empirical Methods in Natural Language Processing, pages 159-168, Lisbon, Portugal, 17-21 Sep. 2015.

Jambu, M. and Lebeaux, M. O. (1983). Cluster Analysis and Data Analysis. North-Holland Publishing Company, Amsterdam.

James, W. and Stein, C. (1961). Estimation with quadratic loss. Proc. Fourth Berkeley Symp. Math. Statist. Prob. 1 311-319.

Jardine, C. J., Jardine, N. and Sibson, R. (1967). The structure and construction of taxonomic hierarchies. Math. Biosci. 1 173-179.

Jardine, N., and R. Sibson. Mathematical Taxonomy. Wiley, New York, 1971.

Jayasimhan, Anusha, and Jayant Gadge. "Anomaly detection using a clustering technique." International Journal of Applied Information Systems (IJAIS)-ISSN (2012): 2249-0868.

Jennrich, R. and Moore, R. H. (1975). Maximum likelihood estimation by means of nonlinear least squares. Proceedings of the Statistical Computing Section, American Statistical Association, 57-65.

Jennrich, R. I. (1962). Linear Discrimination in the Case of Unequal Covariance Matrices. Unpublished manuscript.

Ji, Z., Xie, Y., Pang, Y., Chen, L., & Zhang, Z. (2016). Zero-Shot Learning with Multi-Battery Factor Analysis. arXiv preprint arXiv:1606.09349.

Ji, Z., Yu, Y., Pang, Y., Guo, J., & Zhang, Z. (2017). Manifold regularized cross-modal embedding for zero-shot learning. Information Sciences, 378, 48-58.

Jiang, Ke, Brian Kulis, and Michael I. Jordan. "Small-variance asymptotics for exponential family Dirichlet process mixture models." Advances in Neural Information Processing Systems. 2012.

Jiang, Wenhao, et al. "The l2, 1-Norm Stacked Robust Autoencoders for Domain Adaptation." Thirtieth AAAI Conference on Artificial Intelligence. 2016.

Jiang, Wenhao. Learning representations with information on hand. Diss. The Hong Kong Polytechnic University, 2014.

Jiang, Xinwei, et al. "Supervised latent linear gaussian process latent variable model for dimensionality reduction." IEEE Transactions on Systems, Man, and Cybernetics, Part B (Cybernetics) 42.6 (2012): 1620-1632.

Jin, Rong, and Luo Si. "A bayesian approach toward active learning for collaborative filtering." Proceedings of the 20th conference on Uncertainty in artificial intelligence. AUAI Press, 2004.

Joaquin, Delgado, Ishii Naohiro, and Ura Tomoki. "Content-based collaborative information filtering: Actively learning to classify and recommend documents." International Workshop on Cooperative Information Agents. Springer Berlin Heidelberg, 1998.

Joenväärä, Juha, Robert Kosowski, and Pekka Tolonen. "Revisiting'stylized facts' about hedge funds-insights from a novel aggregation of the main hedge fund databases." SSRN eLibrary (2012).

Johnson, Rie, and Tong Zhang. "Accelerating stochastic gradient descent using predictive variance reduction." Advances in Neural Information Processing Systems. 2013.

Johnson, Rie, and Tong Zhang. "Supervised and Semi-Supervised Text Categorization using One-Hot LSTM for Region Embeddings." arXiv preprint arXiv:1602.02373 (2016).

Johnson, Rie. "Semi-supervised learning with multi-view embedding: Theory and application with convolutional neural networks." stat 1050 (2015): 6.

Johnson, S. C. (1967). Hierarchical clustering schemes. Psychometrika 32241-254.

Johnston, Brian, et al. "A Fast Algorithm and Testbed Evaluation for Sound Source Localization Using Sensor Networks." IEEE Vehicular Technology Conference (VTC). 2005.

Kaikan, Shiran, et al. "Probabilistic Approach to Geometry." (2008).

Kalaivani, P., and K. L. Shunmuganathan. "Sentiment classification of movie reviews by supervised machine learning approaches." Indian Journal of Computer Science and Engineering 4.4 (2013): 285-292.

Kamyshanska, Hanna, and Roland Memisevic. "On autoencoder scoring." ICML (3). 2013.

Kamyshanska, Hanna, and Roland Memisevic. "The potential energy of an autoencoder." IEEE transactions on pattern analysis and machine intelligence 37.6 (2015): 1261-1273.

Kanamori, Takafumi, and Atsumi Ohara. "A Bregman extension of quasi-Newton updates I: an information geometrical framework." Optimization Methods and Software 28.1 (2013): 96-123.

Kanamori, Takafumi, and Atsumi Ohara. "A Bregman extension of quasi-Newton updates II: Analysis of robustness properties." Journal of Computational and Applied Mathematics 253 (2013): 104-122.

Kandaswamy, Chetak, and Telmo Amaral. Tuning parameters of deep neural network algorithms for identifying best cost function. Vol. 20. Technical Report 2/2013, Instituto de Engenharia Biomédica/NNIG, 2013.

Kandaswamy, Chetak, et al. "Improving deep neural network performance by reusing features trained with transductive transference." International Conference on Artificial Neural Networks. Springer International Publishing, 2014.

Kandaswamy, Chetak, et al. "Improving transfer learning accuracy by reusing stacked denoising autoencoders." 2014 IEEE International Conference on Systems, Man, and Cybernetics (SMC). IEEE, 2014.

Karhunen, Juha, Tapani Raiko, and KyungHyun Cho. "Unsupervised Deep Learning: A Short Review." Advances in Independent Component Analysis and Learning Machines (2015): 125.

Karimi, Rasoul, Alexandros Nanopoulos, and Lars Schmidt-Thieme. "A supervised active learning framework for recommender systems based on decision trees." User Modeling and User-Adapted Interaction 25.1 (2015): 39-64.

Karypis, G., E.-H. Han, and V. Kumar. Multilevel Refinement for Hierarchical Clustering. Technical Report TR 99-020, University of Minnesota, Minneapolis, MN, 1999.

Kaufman, L., and P. J. Rousseeuw. Finding Groups in Data: An Introduction to Cluster Analysis. Wiley Series in Probability and Statistics. John Wiley and Sons, New York, November 1990.

Keshavarzi, M., M. A. Dehghan, and M. Mashinchi. "Applications of classification based on similarities and dissimilarities." *Fuzzy Information and Engineering* 4, no. 1 (2012): 75-91.

Kettenring, J. R., Rogers, W. H., Smith, M. E., and Warner, J. L. (1976). Cluster analysis applied to the validation of course objectives. *J. Educ. Statist.* 1 39-57.

Khan, Farhan Hassan, Usman Qamar, and Saba Bashir. "Senti-CS: Building a lexical resource for sentiment analysis using subjective feature selection and normalized Chi-Square-based feature weight generation." *Expert Systems* 33.5 (2016): 489-500.

Khashabi, Daniel, et al. "Clustering With Side Information: From a Probabilistic Model to a Deterministic Algorithm." *arXiv preprint arXiv:*1508.06235 (2015).

Khribi, Mohamed Koutheaïr, Mohamed Jemni, and Olfa Nasraoui. "Automatic recommendations for e-learning personalization based on web usage mining techniques and information retrieval." 2008 *Eighth IEEE International Conference on Advanced Learning Technologies*. IEEE, 2008.

Kim, Kyoungok, and Jaewook Lee. "Sentiment visualization and classification via semi-supervised nonlinear dimensionality reduction." *Pattern Recognition* 47.2 (2014): 758-768.

Kim, Minje, and Paris Smaragdis. "Adaptive Denoising Autoencoders: A Fine-tuning Scheme to Learn from Test Mixtures." *International Conference on Latent Variable Analysis and Signal Separation*. Springer International Publishing, 2015.

Kim, Yoon, and Owen Zhang. "Credibility adjusted term frequency: A supervised term weighting scheme for sentiment analysis and text classification." *arXiv preprint arXiv:*1405.3518 (2014).

Kiros, Ryan, et al. "Skip-thought vectors." *Advances in neural information processing systems*. 2015.

Kitto, Kirsty, and Fabio Boschetti. "Attitudes, ideologies and self-organization: information load minimization in multi-agent decision making."*Advances in Complex Systems* 16, no. 02n03 (2013): 1350029.

Klašnja-Milićević, Aleksandra, et al. "E-Learning personalization based on hybrid recommendation strategy and learning style identification." *Computers & Education* 56.3 (2011): 885-899.

Klein, Stefan, et al. "Adaptive stochastic gradient descent optimisation for image registration." *International journal of computer vision* 81.3 (2009): 227-239.

Kleinberg, J. M., An Impossibility Theorem for Clustering. In Proc. of the 16th Annual Conf. on Neural Information Processing Systems, Dec. 9-14, 2002.

Kleiner, B. and Hartigan, J. A. (1981). Representing points in many dimensions by trees and castles (with discussion). *j Amer. Statist. Assoc.* 76260-276.

Kong, Dani Yogatama Lingpeng, and Noah A. Smith. "Bayesian Optimization of Text Representations."

Koolen, Wouter M., and Tim Van Erven. "Second-order quantile methods for experts and combinatorial games." *Proceedings of The 28th Conference on Learning Theory*. 2015.

Koren, Yehuda. "Collaborative filtering with temporal dynamics." *Communications of the ACM* 53.4 (2010): 89-97.

Kouno, Kazuhei, et al. "Unsupervised Domain Adaptation for Word Sense Disambiguation using Stacked Denoising Autoencoder." (2015).

Koyejo, Oluwasanmi, Cheng Lee, and Joydeep Ghosh. "The trace norm constrained matrix-variate Gaussian process for multitask bipartite ranking." *arXiv preprint arXiv:* 1302.2576 (2013).

Krizhevsky, Alex, and Geoffrey E. Hinton. "Using very deep autoencoders for content-based image retrieval." *ESANN*. 2011.

Kruliš, Martin, Tomáš Skopal, Jakub Lokoč, and Christian Beecks. "Combining CPU and GPU architectures for fast similarity search." Distributed and Parallel Databases 30, no. 3-4 (2012): 179-207.

Kulis, Brian, and Peter L. Bartlett. "Implicit online learning." *Proceedings of the 27th International Conference on Machine Learning (ICML-10)*. 2010.

Kulis, Brian, Mátyás A. Sustik, and Inderjit S. Dhillon. "Low-rank kernel learning with Bregman matrix divergences." *Journal of Machine Learning Research* 10. February (2009): 341-376.

Kushwaha, Nidhi, et al. "SemPMF: Semantic Inclusion by Probabilistic Matrix Factorization for Recommender System." *Trends in Practical Applications of Scalable Multi-Agent Systems, the PAAMS Collection*. Springer International Publishing, 2016. 327-334.

Lachenbruch P. A. (1975) *Discriminant Analysis*. Hafner Press, New York.

Lachenbruch, P. A. (1982). Robustness of discriminant functions. *SUGI-SAS Group Proceedings* 7626-632.

Lakshmana, Madhusudan, et al. "Learning Semantically Coherent and Reusable Kernels in Convolution Neural Nets for Sentence Classification." *arXiv preprint arXiv:* 1608.00466 (2016).

Landwehr J. M., Pregibon, D., and Shoemaker, K C. (1984). Graphical methods for assessing logistic regression models (with discussion). J Amer. *Statist. Assoc.* 7961-83.

Lang, Ken. "Newsweeder: Learning to filter netnews." *Proceedings of the 12th international conference on machine learning*. 1995.

Lange, Kenneth. "Markov Chain Monte Carlo Methods." *Mathematical and Statistical Methods for Genetic Analysis*. Springer New York, 1997. 142-163.

Längkvist, Martin, and Amy Loutfi. "Learning feature representations with a cost-relevant sparse autoencoder." *International journal of neural systems* 25.01 (2015): 1450034.

Langseth, Helge, and Thomas D. Nielsen. "Scalable learning of probabilistic latent models for collaborative filtering." *Decision Support Systems* 74 (2015): 1-11.

Larget, Bret, and Donald L. Simon. "Markov chain Monte Carlo algorithms for the Bayesian analysis of phylogenetic trees." *Molecular Biology and Evolution* 16 (1999): 750-759.

Larochelle, Hugo, Dumitru Erhan, and Pascal Vincent. "Deep Learning using Robust Interdependent Codes." *AISTATS*. 2009.

Larochelle, Hugo, et al. "Exploring strategies for training deep neural networks." *Journal of Machine Learning Research* 10. January (2009): 1-40.

Larochelle, Hugo, Yoshua Bengio, and Joseph Turian. "Tractable multivariate binary density estimation and the restricted Boltzmann forest." *Neural computation* 22.9 (2010): 2285-2307.

Larsen, B., and C. Aone. Fast and Effective Text Mining Using Linear-Time Document Clustering. In Proc. of the 5th Intl. Conf. on Knowledge Discovery and Data Mining, pages 16-22, San Diego, California, 1999. ACM Press.

Laskey, Kathryn Blackmond, and Laura Martignon. "Bayesian learning of loglinear models for neural connectivity." *Proceedings of the Twelfth international conference on Uncertainty in artificial intelligence*. Morgan Kaufmann Publishers Inc., 1996.

Lauly, Stanislas, Alex Boulanger, and Hugo Larochelle. "Learning multilingual word representations using a bag-of-words autoencoder." *arXiv preprint arXiv:*1401.1803 (2014).

Lauly, Stanislas, et al. "An autoencoder approach to learning bilingual word representations." *Advances in Neural Information Processing Systems*. 2014.

Le Capitaine, H Fuzzy Systems, IEEE Transactions on, 2012—ieeexplore.ieee.org; A relevance-based learning model of fuzzy similarity measures Le, Hai-Son Phuoc. "Probabilistic Models for Collecting, Analyzing, and Modeling Expression Data." (2013).

Le, Q. V., and Mikolov, T. 2014. Distributed representations of sentences and documents. In *Proceedings of the 31th International Conference on Machine Learning, ICML 2014, Beijing, China, 21-26 Jun. 2014*, 1188-1196.

Le, Quoc V., et al. "ICA with reconstruction cost for efficient overcomplete feature learning." *Advances in Neural Information Processing Systems*. 2011.

LeCun, Yann, and Fu Jie Huang. "Loss Functions for Discriminative Training of Energy-Based Models." *AISTATS*. 2005.

LeCun, Yann, et al. "A tutorial on energy-based learning." *Predicting structured data* 1 (2006): 0.

Lee, Honglak, et al. "Unsupervised feature learning for audio classification using convolutional deep belief networks." *Advances in neural information processing systems*. 2009.

Lee, Kwangchun, and Dan Lee. "A Market-Driven Product Line Scoping." *Software Engineering Research, Management and Applications* 2011 (2012): 27-46.

Lee, Wee Sun. "Collaborative learning for recommender systems." *ICML*. Vol. 1. 2001.

Lemme, Andre, René Felix Reinhart, and Jochen Jakob Steil. "Efficient online learning of a non-negative sparse autoencoder." *ESANN*. 2010.

Lennington, R. K. and Rossbach, M. E. (1978). CLASSY: An adaptive maximum likelihood clustering algorithm. Paper presented at 1978 meeting of the Classification Society.

Levine, Sergey, et al. "End-to-end training of deep visuomotor policies." *Journal of Machine Learning Research* 17.39 (2016): 1-40.

Levisohn, J. R. and Funk, S. G. (1974). CLUSTER: A hierarchical clustering program for large data sets (n>100). Research Memo #40, Thurstone Psychometric Laboratory, University of North Carolina.

Lewis, David D., and William A. Gale. "A sequential algorithm for training text classifiers." *Proceedings of the 17th annual international ACM SIGIR conference on Research and development in information retrieval*. Springer-Verlag New York, Inc., 1994.

Li, Chunyuan, et al. "Preconditioned stochastic gradient Langevin dynamics for deep neural networks." *arXiv preprint arXiv:*1512.07666 (2015).

Li, Fuxin, et al. "Kernel Learning by Unconstrained Optimization." *AISTATS*. 2009.

Li, Nana, et al. "Structural Correspondence Learning for Cross-lingual Sentiment Classification with One-to-many Mappings." *arXiv preprint arXiv:*1611.08737 (2016).

Li, Shoushan, et al. "Imbalanced sentiment classification." *Proceedings of the 20th ACM international conference on Information and knowledge management*. ACM, 2011.

Li, X., Zhao, X., Zhang, Z., Wu, F., Zhuang, Y., Wang, J., & Li, X. (2016). Joint Multilabel Classification With Community-Aware Label Graph Learning. *IEEE Transactions on Image Processing*, 25(1), 484-493.

Li, Youguo, and Haiyan Wu. "A clustering method based on K-means algorithm." *Physics Procedia* 25 (2012): 1104-1109.

Li, Y., Yang, M., & Zhang, Z. (2016). Multi-View Representation Learning: A Survey from Shallow Methods to Deep Methods. *arXiv preprint arXiv:*1610.01206.

Li, Y., Yang, M., Xu, Z., & Zhang, Z. M. (2016, February). Learning with Marginalized Corrupted Features and Labels Together. In *Thirtieth AAAI Conference on Artificial Intelligence*.

Li, Yingming, et al. "Bayesian Multi-Task Relationship Learning with Link Structure." *IEEE Transactions on Knowledge and Data Engineering* 28.4 (2016): 873-887.

Li, Yingming, Ming Yang, and Zhongfei Zhang. "Multi-View Representation Learning: A Survey from Shallow Methods to Deep Methods." *arXiv preprint arXiv:* 1610.01206 (2016).

Li, Yu, Liu Lu, and Li Xuefeng. "A hybrid collaborative filtering method for multiple-interests and multiple-content recommendation in E-Commerce." *Expert Systems with Applications* 28.1 (2005): 67-77.

Lin, Chenghua, Yulan He, and Richard Everson. "A comparative study of Bayesian models for unsupervised sentiment detection." *Proceedings of the Fourteenth Conference on Computational Natural Language Learning*. Association for Computational Linguistics, 2010.

Lin, Yuming, et al. "An information theoretic approach to sentiment polarity classification." *Proceedings of the 2nd Joint WICOW/AIRWeb Workshop on Web Quality*. ACM, 2012.

Linden, A. Weber, F. Implementing inner drive by competence reflection, In Roitblat, H., Proceedings of the 2nd International Conference on Simulation of Adaptive Behavior. MIT Press, Cambridge, MA Ling, R. F. (1973). A probability theory of cluster analysis. *J. Amer. Statist. Assoc.* 68159-169.

Liu, Bing. "Sentiment analysis and opinion mining." *Synthesis lectures on human language technologies* 5.1 (2012): 1-167.

Liu, KCL cc.gatech.edu; Vista: Looking Into the Clusters in Very Large Multidimensional Datasets Liu, Pengfei, et al. "Multi-timescale long short-term memory neural network for modelling sentences and documents." *Proceedings of the Conference on Empirical Methods in Natural Language Processing*, Lisbon. 2015.

Liu, Pengfei, Xipeng Qiu, and Xuanjing Huang. "Deep Multi-Task Learning with Shared Memory." *arXiv preprint arXiv:*1609.07222 (2016).

Liu, Pengfei, Xipeng Qiu, and Xuanjing Huang. "Recurrent Neural Network for Text Classification with Multi-Task Learning." *arXiv preprint arXiv:*1605.05101 (2016).

Liu, Yanan, Xiaoqing Feng, and Zhiguang Zhou. "Multimodal video classification with stacked contractive autoencoders." *Signal Processing* 120 (2016): 761-766.

Liua, Xiaobo, et al. "Ensemble Inductive Transfer Learning★." *Journal of Fiber Bioengineering and Informatics* 8.1 (2015): 105-115.

Lloret, Elena, Alexandra Balahur, José M. Gómez, Andrés Montoyo, and Manuel Palomar. "Towards a unified framework for opinion retrieval, mining and summarization." Journal of Intelligent Information Systems 39, no. 3 (2012): 711-747.

Long, Mingsheng, et al. "Adaptation regularization: A general framework for transfer learning." *IEEE Transactions on Knowledge and Data Engineering* 26.5 (2014): 1076-1089.

Loohach, Richa, and Kanwal Garg. "An Insight Overview Of Issues And Challenges Associated With Clustering Algorithms." mairec.org;

Lou, Xiaojun, Junying Li, and Haitao Liu. "Improved fuzzy C-means clustering algorithm based on cluster density." Journal of Computational Information Systems 8, no. 2 (2012): 727-737.

Lu, Huibin, Zhengping Hu, and Hongxiao Gao. "Multiview sample classification algorithm based on L1-graph domain adaptation learning." *Mathematical Problems in Engineering* 2015 (2015).

Lu, Jie, et al. "Transfer learning using computational intelligence: a survey." *Knowledge-Based Systems* 80 (2015): 14-23.

Lu, Le. "Learning Image Patch Representation for Detection, Recognition and Dynamic Foreground/Background Extraction."

Lu, Xugang, et al. "Ensemble modeling of denoising autoencoder for speech spectrum restoration." *INTERSPEECH*. 2014.

Lu, Xugang, et al. "Speech enhancement based on deep denoising autoencoder." *Interspeech*. 2013.

Luo, Chunyong, et al. "Active learning with transfer learning." *Proceedings of ACL 2012 Student Research Workshop*. Association for Computational Linguistics, 2012.

Luo, Ping, Xiaogang Wang, and Xiaoou Tang. "Pedestrian parsing via deep decompositional network." *Proceedings of the IEEE International Conference on Computer Vision*. 2013.

Maas, A. L.; Daly, R. E.; Pham, P. T.; Huang, D.; Ng, A. Y.; and Potts, C. 2011. Learning word vectors for sentiment analysis. In *The 49th Annual Meeting of the Association for Computational Linguistics: Human Language Technologies, Proceedings of the Conference*, 19-24 Jun. 2011, Portland, Oregon, USA, 142-150.

Maas, Andrew, et al. "Recurrent neural networks for noise reduction in robust ASR." (2012).

MacKay, D. J. Information-based objective functions for active data selection, Neural Computation, 4(4), 590-604.

Maclaurin, Dougal, and Ryan P. Adams. "Firefly Monte Carlo: Exact MCMC with subsets of data." *arXiv preprint arXiv*:1403.5693 (2014).

Macqueen, J. Some methods for classification and analysis of multivariate observations. *Proc. Fifth Berkeley Symp. Math. Statist. Prob.* 1281-297. University of California Press, 1967.

Madhulatha, T S Arxiv preprint arXiv:1205.1117, 2012—arxiv.org; An Overview on Clustering Methods Makhzani, Alireza, and Brendan J. Frey. "Winner-take-all autoencoders." *Advances in Neural Information Processing Systems*. 2015.

Malik, Zeeshan. "Towards On-line Domain-Independent Big Data Learning: Novel Theories and Applications." (2015).

Maltz, David, and Kate Ehrlich. "Pointing the way: active collaborative filtering." *Proceedings of the SIGCHI conference on Human factors in computing systems*. ACM Press/Addison-Wesley Publishing Co., 1995.

Manouselis, Nikos, Riina Vuorikari, and Frans Van Assche. "Simulated analysis of MAUT collaborative filtering for learning object recommendation." *Proceedings of the 1st Workshop on Social Information Retrieval for Technology Enhanced Learning*. 2007.

Mao, Yi. *Domain knowledge, uncertainty, and parameter constraints*. Diss. Georgia Institute of Technology, 2010.

Marc'Aurelio Ranzato, Y., and Lan Boureau Sumit Chopra Yann LeCun. "A unified energy-based framework for unsupervised learning." *Proc. Conference on AI and Statistics (AI-Stats)*. Vol. 24. 2007.

Marjoram, Paul, et al. "Markov chain Monte Carlo without likelihoods." *Proceedings of the National Academy of Sciences* 100.26 (2003): 15324-15328.

Marks, S. and Dunn, O. J. (1974). Discriminant functions when covariance matrices are unequal. *J. Amer. Statist. Assoc.* 69 555-559.

Marlin, Benjamin. *Collaborative filtering: A machine learning perspective*. Diss. University of Toronto, 2004.

Martínez, Sergio, Aida Valls, and David Sánchez. "Semantically-grounded construction of centroids for datasets with textual attributes." Knowledge-Based Systems 35 (2012): 160-172.

Marwala, Tshilidzi, and Bodie Crossingham. "Bayesian approach to rough set." *arXiv preprint arXiv*:0704.3433 (2007).

Marwala, Tshilidzi, and Bodie Crossingham. "Bayesian Approach to Neuro-Rough Models." *arXiv preprint arXiv*:0705.0761 (2007).

Mau, Bob, Michael A. Newton, and Bret Larget. "Bayesian phylogenetic inference via Markov chain Monte Carlo methods." *Biometrics* 55.1 (1999): 1-12.

McCallumzy, Andrew Kachites, and Kamal Nigamy. "Employing EM and pool-based active learning for text classification." *Proc. International Conference on Machine Learning (ICML)*. 1998.

Mccullagh, P. and Nelder, J. A. (1983). *Generalized Linear Models*. Chapman and Hall, London.

Mcdonald, Ryan, et al. "Efficient large-scale distributed training of conditional maximum entropy models." *Advances in Neural Information Processing Systems*. 2009.

Mckay, R. J. (1978). A graphical aid to selection of variables in two-group discriminant analysis. *Appl. Statist.* 27259-263.

Mckay, R. J. and Campbell, N. A. (1982a). Variable selection techniques in discriminant analysis. I. Description. *Br. J. Math. Stat. Psychol.* 351-29.

Mckay, R. J. and Campbell, N. A. (1982b). Variable selection techniques in discriminant analysis. II. Allocation. *Br. J. Math. Stat. Psychol.* 353041.

McLaughlin, Matthew R., and Jonathan L. Herlocker. "A collaborative filtering algorithm and evaluation metric that accurately model the user experience." *Proceedings of the 27th annual international ACM SIGIR conference on Research and development in information retrieval*. ACM, 2004.

Meeds, Edward, et al. "Modeling dyadic data with binary latent factors." *Advances in neural information processing systems*. 2006.

Melis, David Alvarez. *The Matrix Multiplicative Weights Algorithm for Domain Adaptation*. Diss. New York University, 2013.

Melville, Prem, and Vikas Sindhwani. "Recommender systems." *Encyclopedia of machine learning*. Springer US, 2011. 829-838.

Melville, Prem, Raymond J. Mooney, and Ramadass Nagarajan. "Content-boosted collaborative filtering for improved recommendations." *Aaai/iaai*. 2002.

Memisevic, Roland, Leonid Sigal, and David J. Fleet. "Shared kernel information embedding for discriminative inference." *IEEE transactions on pattern analysis and machine intelligence* 34.4 (2012): 778-790.

Memisevic, Roland. *Non-linear latent factor models for revealing structure in high-dimensional data*. Diss. University of Toronto, 2008.

Mesnil, Grégoire, et al. "Unsupervised and Transfer Learning Challenge: a Deep Learning Approach." *ICML Unsupervised and Transfer Learning* 27 (2012): 97-110.

Meuleau, Nicolas, and Marco Dorigo. "Ant colony optimization and stochastic gradient descent." *Artificial Life* 8.2 (2002): 103-121.

Mianowska, Bernadetta, and Ngoc Thanh Nguyen. "Tuning user profiles based on analyzing dynamic preference in document retrieval systems." Multimedia tools and applications 65, no. 1 (2013): 93-118.

Miao, Yishu, Lei Yu, and Phil Blunsom. "Neural Variational Inference for Text Processing." *arXiv preprint arXiv:1511.06038* (2015).

Michener, C. D. and Sokal R. R. (1957). A quantitative approach to a problem in classification. *Evolution* ii 130-162.

Mihalkova, Lilyana, Tuyen Huynh, and Raymond J. Mooney. "Mapping and revising Markov logic networks for transfer learning." *AAAI*. Vol. 7. 2007.

Mikolov, T.; Sutskever, I.; Chen, K.; Corrado, G. S.; and Dean, J. 2013. Distributed representations of words and phrases and their compositionality. In *Advances in Neural Information Processing Systems 26: 27th Annual Conference on Neural Information Processing Systems 2013. Proceedings of a meeting held Dec. 5-8, 2013, Lake Tahoe, Nevada, United States.*, 3111-3119.

Milligan, G. W., Clustering Validation: Results and Implications for Applied Analyses. In P. Arabie, L. Hubert, and G. D. Soete, editors, Clustering and Classification, pages 345-375. World Scientific, Singapore, January 1996.

Min, Renqiang, et al. "A deep non-linear feature mapping for large-margin knn classification." 2009 *Ninth IEEE International Conference on Data Mining*. IEEE, 2009.

Min, Renqiang. *A non-linear dimensionality reduction method for improving nearest neighbour classification*. Library and Archives Canada=Bibliothèque et Archives Canada 2006.

Mirelli, Vincent, et al. "Statistical machine learning algorithms for target classification from acoustic signature." *Proc. MSS Battlespace Acoustic and Magnetic Sensors* (2009).

Mirkin, B., Mathematical Classification and Clustering, volume 11 of Nonconvex Optimization and Its Applications. Kluwer Academic Publishers, August 1996.

Mirowski, Piotr, et al. "Feature-rich continuous language models for speech recognition." *Spoken Language Technology Workshop (SLT), 2010 IEEE*. IEEE, 2010.

Mitchell, T., Machine Learning. McGraw-Hill, Boston, MA, 1997.

Miyato, Takeru, Andrew M. Dai, and Ian Goodfellow. "Virtual Adversarial Training for Semi-Supervised Text Classification." *arXiv preprint arXiv:1605.07725* (2016).

Mnih, Volodymyr, Hugo Larochelle, and Geoffrey E. Hinton. "Conditional restricted Boltzmann machines for structured output prediction." *arXiv preprint arXiv:1202.3748* (2012).

Mobasher, Bamshad, Xin Jin, and Yanzan Zhou. "Semantically enhanced collaborative filtering on the web." *Web Mining: From Web to Semantic Web*. Springer Berlin Heidelberg, 2004. 57-76.

Mohamed, Shakir. *Generalised Bayesian matrix factorisation models*. Diss. University of Cambridge, 2011.

Mojena, R. (1977). Hierarchical grouping methods and stopping rules—An evaluation. *Computer Journal* 20359-363.

Mojena, R. and Wishart, D. (1980). Stopping rules for Ward's clustering method. *Proceedings of COMPSTAT*. Physica Verlag 426-432.

Mooney, Raymond J., and Loriene Roy. "Content-based book recommending using learning for text categorization." *Proceedings of the fifth ACM conference on Digital libraries*. ACM, 2000.

Morgan, J. N. and Messenger, R. C. (1973). THMD: a sequential search program for the analysis of nominal scale dependent variables. Institute for Social Research, U of Michigan, Ann Arbor.

Morgan, J. N. and Sonquist, J. A. (1963). Problems in the analysis of survey data, and a proposal. *J. Amer. Statist. Assoc.* 58415-435.

Murtagh, F., Multidimensional Clustering Algorithms. Physica-Verlag, Heidelberg and Vienna, 1985.

Murugesan, Keerthiram, et al. "Adaptive Smoothed Online Multi-Task Learning." *Advances In Neural Information Processing Systems*. 2016.

Narayanan, Vivek, Ishan Arora, and Arjun Bhatia. "Fast and accurate sentiment classification using an enhanced Naive Bayes model." *International Conference on Intelligent Data Engineering and Automated Learning*. Springer Berlin Heidelberg, 2013.

Naresh, Tangudu, G. Ramesh Naidu, and S. Vishnu Murty. "Learning Subject Areas by Using Unsupervised Observation of Most Informative Terms in Text Databases."

Navarro-Arribas, Guillermo, and Vicenç Torra. "Information fusion in data privacy: A survey." Information Fusion 13, no. 4 (2012): 235-244.

Nelder, J. A. and Wedderburn, R. W. M. (1972). Generalized linear models. *J Roy. Statist. Soc. A* 135 370-384.

Nelwamondo, Fulufhelo V., Shakir Mohamed, and Tshilidzi Marwala. "Missing data: A comparison of neural network and expectation maximisation techniques." *arXiv preprint arXiv:0704.3474* (2007).

Neukart, Florian. "Are deep artificial neural network architectures a suitable approach for solving complex business-related problem statements?"

Ng, Andrew. "Sparse autoencoder." *CS294A Lecture notes* 72 (2011): 1-19.

Ngiam, Jiquan, et al. "Multimodal deep learning." *Proceedings of the 28th international conference on machine learning (ICML-11)*. 2011.

Nguyen, Dai Quoc, et al. "Sentiment classification on polarity reviews: an empirical study using rating-based features." (2014): 128-135.

Nguyen, Hieu T., and Arnold Smeulders. "Active learning using pre-clustering." *Proceedings of the twenty-first international conference on Machine learning*. ACM, 2004.

Nguyen, Khanh, and Brendan O'Connor. "Posterior calibration and exploratory analysis for natural language processing models." *arXiv preprint arXiv:1508.05154* (2015).

Nielsen, Frank, and Richard Nock. "Sided and symmetrized Bregman centroids." *IEEE transactions on Information Theory* 55.6 (2009): 2882-2904.

Norlund, Tobias. "The Use of Distributional Semantics in Text Classification Models: Comparative performance analysis of popular word embeddings." (2016).

Nowlan, S. Soft competitive adaptation: Neural network learning algorithms based on fitting statistical mixtures, Tech report CS-91-126, Carnegie Mellon University.

Noy, Asaf, and Koby Crammer. "Robust Algorithms via PAC-Bayes and Laplace Distributions." *Measures of Complexity*. Springer International Publishing, 2015. 371-394.

Ogata, Hiroaki, and Yoneo Yano. "Combining knowledge awareness and information filtering in an open-ended collaborative learning environment." *International Journal of Artificial Intelligence in Education (IJAIED)* 11 (2000): 33-46.

Okita, Tsuyoshi. "CA684: Deep Learning 4 Apr. 2014."

Olshen, R. A., Gilpin, E., Henning, H. Lewinter, M., Collins, D., and Ross., J., Jr. (1985). Twelve month prognosis following myocardial infarction: classification trees, logistic regression, and stepwise linear discrimination. *Proceedings of the Berkeley Conference in Honor of Jerzy Neyman and Jack Kiefer*. (L. LeCam and R. Olshen, eds.) 1 245-267. Wadsworth Advanced Books and Software, Monterey, California and the Institute of Mathematical Statistics, Hayward, California Ong, Cheng Soon. "Linking losses for density ratio and class-probability estimation."

Osadchy, Margarita, Yann Le Cun, and Matthew L. Miller. "Synergistic face detection and pose estimation with energy-based models." *Journal of Machine Learning Research* 8. May (2007): 1197-1215.

Paass, G. Kindermann, J. Bayesian query construction for neural network models, In Tesauro, G., Touretzky, D., Leen, T., Advances in Neural Information Processing Systems 7. MIT Press.

Pak, Alexander, et al. "Normalization of term weighting scheme for sentiment analysis." *Language and Technology Conference*. Springer International Publishing, 2011.

Paltoglou, Georgios, and Mike Thelwall. "A study of information retrieval weighting schemes for sentiment analysis." *Proceedings of the 48th Annual Meeting of the Association for Computational Linguistics*. Association for Computational Linguistics, 2010.

Pan, Sinno Jialin, and Qiang Yang. "A survey on transfer learning." *IEEE Transactions on knowledge and data engineering* 22.10 (2010): 1345-1359.

Pan, Sinno Jialin, James T. Kwok, and Qiang Yang. "Transfer Learning via Dimensionality Reduction." *AAAI*. Vol. 8. 2008.

Pan, Sinno Jialin. "Transfer Learning." (2014): 537-570.

Pan, Weike, Erheng Zhong, and Qiang Yang. "Transfer learning for text mining." *Mining Text Data*. Springer US, 2012. 223-257.

Pazzani, Michael J., and Daniel Billsus. "Content-based recommendation systems." *The adaptive web*. Springer Berlin Heidelberg, 2007. 325-341.

Pearl, J. Probablistic Reasoning in Intelligent Systems. Morgan Kaufmann.

Pelleg. D., and A. W. Moore. X-means: Extending K-means with Efficient Estimation of the Number of Clusters. In Proc. of the 17th Intl. Conf. on Machine Learning, pages 727-734. Morgan Kaufmann, San Francisco, CA, 2000.

Peng, Yong, Shen Wang, and Bao-Liang Lu. "Marginalized denoising autoencoder via graph regularization for domain adaptation." *International Conference on Neural Information Processing*. Springer Berlin Heidelberg, 2013.

Pennock, David M., Eric Horvitz, and C. Lee Giles. "Social choice theory and recommender systems: Analysis of the axiomatic foundations of collaborative filtering." *AAAI/IAAI*. 2000.

Pennock, David M., et al. "Collaborative filtering by personality diagnosis: A hybrid memory-and model-based approach." *Proceedings of the Sixteenth conference on Uncertainty in artificial intelligence*. Morgan Kaufmann Publishers Inc., 2000.

Penny, W., R. Everson, and S. Roberts. "ICA: model order selection and dynamic source models." *Independent component analysis: Principles and practice* (2001): 299-314.

Peters, Georg, and Richard Weber. "Dynamic clustering with soft computing." Wiley Interdisciplinary Reviews: Data Mining and Knowledge Discovery 2, no. 3 (2012): 226-236.

Pham, Son Bao. "Sentiment Classification on Polarity Reviews: An Empirical Study Using Rating-based Features." *ACL 2014* (2014): 128.

Phapatanaburi, Khomdet, et al. "Noise robust voice activity detection by combination magnitude and phase-based spectral feature with denoising autoencoder."

Pitrik, József, and Dániel Virosztek. "On the joint convexity of the Bregman divergence of matrices." *Letters in Mathematical Physics* 105.5 (2015): 675-692.

Pivovarov, Rimma, and Noémie Elhadad. "A hybrid knowledge-based and data-driven approach to identifying semantically similar concepts." Journal of biomedical informatics 45, no. 3 (2012): 471-481.

Plasencia-Calana, Yenisel, Heydi Méndez-Vázquez, and Rainer Larin. "Face Composite Sketch Recognition By BoVW-Based Discriminative Representations."

Plutowski, M. White, H. Selecting concise training sets from clean data, IEEE Transactions on Neural Networks, 4, 305-318.

Pölitz, Christian. "Sampling Methods for Random Subspace Domain Adaptation."

Pollard, D. (1982). A central limit theorem for k-means clustering. *Ann. Prob.* 10919-926.

Popescul, Alexandrin, David M. Pennock, and Steve Lawrence. "Probabilistic models for unified collaborative and content-based recommendation in sparse-data environments." *Proceedings of the Seventeenth conference on Uncertainty in artificial intelligence*. Morgan Kaufmann Publishers Inc., 2001.

Potapov, Alexey, Vita Batishcheva, and Maxim Peterson. "Limited generalization capabilities of autoencoders with logistic regression on training sets of small sizes." *IFIP International Conference on Artificial Intelligence Applications and Innovations*. Springer Berlin Heidelberg, 2014.

Potapov, Alexey, Vita Potapova, and Maxim Peterson. "A feasibility study of an autoencoder meta-model for improving generalization capabilities on training sets of small sizes." *Pattern Recognition Letters* 80 (2016): 24-29.

Poultney, Christopher, Sumit Chopra, and Yann L. Cun. "Efficient learning of sparse representations with an energy-based model." *Advances in neural information processing systems*. 2006.

Pozzi, Federico Alberto, Elisabetta Fersini, and Enza Messina. "Bayesian model averaging and model selection for polarity classification." *International Conference on Application of Natural Language to Information Systems*. Springer Berlin Heidelberg, 2013.

Prakash, S., T. Chakravarthy, and E. Kaveri. "Statistically weighted reviews to enhance sentiment classification." *Karbala International Journal of Modern Science* 1.1 (2015): 26-31.

Pregibon, D. (1981). Logistic regression diagnostics. *Ann. Statist.* 9 705-724.

Quattoni, Ariadna, Michael Collins, and Trevor Darrell. "Transfer learning for image classification with sparse prototype representations." *Computer Vision and Pattern Recognition*, 2008. CVPR 2008. IEEE Conference on. IEEE, 2008.

Raaijmakers, Stephan, and Wessel Kraaij. "Classifier calibration for multi-domain sentiment classification." *ICWSM.* 2010.

Rabiner, L. R., Levinson, S. E., Rosenberg, A. E. and Wilpon, J. G. (1979). Speaker independent recognition of isolated words using clustering techniques. IEEE Trans. Accoust. Speech Signal Process. 27336-349.

Raftery, Adrian E., and Steven M. Lewis. "[Practical Markov Chain Monte Carlo]: comment: one long run with diagnostics: implementation strategies for Markov Chain Monte Carlo." *Statistical science* 7.4 (1992): 493-497.

Raiko, Tapani, et al. "Iterative neural autoregressive distribution estimator nade-k." *Advances in neural information processing systems.* 2014.

Raina, Rajat, Andrew Y. Ng, and Daphne Koller. "Constructing informative priors using transfer learning." *Proceedings of the 23rd international conference on Machine learning.* ACM, 2006.

Raina, Rajat, et al. "Self-taught learning: transfer learning from unlabeled data." *Proceedings of the 24th international conference on Machine learning.* ACM, 2007.

Rao, C. R. (1948). The utilization of multiple measurements in problems of biological classification. *J. Roy. Statist. Soc. Ser. B* 10159-203.

Rao, C. R. (1952). *Advanced Statistical Methods in Biometric Research.* Wiley, New York.

Rao, C. R. (1960). Multivariate analysis: an indispensable statistical aid in applied research. *Sankhya* 22317-338.

Rao, C. R. (1962). Use of discriminant and allied functions in multivariate analysis. *Sankhya* A24 149-154.

Rao, C. R. (1965). *Linear Statistical Inference and Its Applications.* Wiley, New York.

Ravanbakhsh, Siamak, et al. "Stochastic Neural Networks with Monotonic Activation Functions." *stat* 1050 (2016): 14.

Ravi, Kumar, and Vadlamani Ravi. "A survey on opinion mining and sentiment analysis: Tasks, approaches and applications." *Knowledge-Based Systems* 89 (2015): 14-46.

Recht, Benjamin, et al. "Hogwild: A lock-free approach to parallelizing stochastic gradient descent." *Advances in Neural Information Processing Systems.* 2011.

Remus, Robert. "Modeling and Representing Negation in Data-driven Machine Learning-based Sentiment Analysis." *ESSEM@ AI\* IA.* 2013.

Resnick, Paul, et al. "GroupLens: an open architecture for collaborative filtering of netnews." *Proceedings of the 1994 ACM conference on Computer supported cooperative work.* ACM, 1994.

Ricci, Francesco, Lior Rokach, and Bracha Shapira. *Introduction to recommender systems handbook.* Springer US, 2011.

Richhariya, Pankaj, and Prashant K. Singh. "A survey on financial fraud detection methodologies." International Journal of Computer Applications 45, no. 22 (2012).

Rifai, S.; Dauphin, Y.; Vincent, P.; Bengio, Y.; and Muller, X. 2011a. The manifold tangent classifier. In *Advances in Neural Information Processing Systems 24: 25th Annual Conference on Neural Information Processing Systems 2011. Proceedings of a meeting held* 12-14 Dec. 2011, Granada, Spain., 2294-2302.

Rifai, S.; Vincent, P.; Muller, X.; Glorot, X.; and Bengio, Y. 2011b. Contractive auto-encoders: Explicit invariance during feature extraction. In *Proceedings of the 28th International Conference on Machine Learning, ICML 2011,* Bellevue, Washington, USA, Jun. 28-Jul. 2, 2011, 833-840.

Riffenburgh, R. H. and Clunies-Ross, C. W. (1960). Linear discriminant analysis. *Pacific Science* 14 251-256.

Ríos, Sebastián A., Roberto A. Silva, and Felipe Aguilera. "A dissimilarity measure for automate moderation in online social networks." In Proceedings of the 4th International Workshop on Web Intelligence & Communities, p. 3. ACM, 2012.

Robinson, L F cis.jhu.edu; Detecting Time-dependent Structure in Network Data via a new Class of Latent Process Models Roche, Alexis. "Variational sampling in a nutshell." (2015).

Rodrigues, Thiago Fredes. "A probabilistic and incremental model for online classification of documents: DV-INBC." (2016).

Rohlf, F. J. (1977). Computational efficacy of agglomerative clustering algorithms. Technical Report RC-6831. IBM Watson Research Center Rohlf, F. J. (1982). Single-link clustering algorithms. In *Handbook of Statistics: Vol.* 2, (P. R. Krishnaiah and L. N. Kanal, eds.) 267-284. North-Holland Publishing Company, Amsterdam.

Romesburg, C., Cluster Analysis for Researchers. Life Time Learning, Belmont, CA, 1984.

Rong, Wenge, et al. "Auto-encoder based bagging architecture for sentiment analysis." *Journal of Visual Languages & Computing* 25.6 (2014): 840-849.

Roshchina, Alexandra, John Cardiff, and Paolo Rosso. "Evaluating the Similarity Estimator Component of the TWIN Personality-based Recommender System." (2012).

Ross, David A., and Richard S. Zemel. "Multiple cause vector quantization." *Advances in Neural Information Processing Systems.* 2002.

Rotman, S. R., Fisher, A. D., and Staelin, D. H. (1981). Analysis of multiple-angle microwave observations of snow and ice using cluster analysis techniques. *J. Glaciology* 27 89-97.

Rousu, J cs.helsinki.fi; Efficient Range Partitioning in Classification Learning Roweis, Sam T., and Lawrence K. Saul. "Nonlinear dimensionality reduction by locally linear embedding." *Science* 290.5500 (2000): 2323-2326.

Roy, Nicholas, and Andrew McCallum. "Toward optimal active learning through monte carlo estimation of error reduction." *ICML,* Williamstown (2001): 441-448.

Rubens, Neil, and Masashi Sugiyama. "Influence-based collaborative active learning." *Proceedings of the 2007 ACM conference on Recommender systems.* ACM, 2007.

Rubens, Neil, Dain Kaplan, and Masashi Sugiyama. "Active learning in recommender systems." *Recommender systems handbook.* Springer US, 2011. 735-767.

Rubens, Neil, et al. "Active learning in recommender systems." *Recommender Systems Handbook.* Springer US, 2015. 809-846.

Ryan, T., Joiner, B., and Ryan, B. (1982). *Minitab Reference Manual.* Duxbury Press, Boston.

Rybina, K rn.inf.tu-dresden.de; Sentiment analysis of contexts around query terms in documents Salakhutdinov, Ruslan, and Andriy Mnih. "Bayesian probabilistic matrix factorization using Markov chain Monte Carlo." *Proceedings of the 25th international conference on Machine learning*. ACM, 2008.

Salakhutdinov, Ruslan, and Geoffrey E. Hinton. "Learning a Nonlinear Embedding by Preserving Class Neighbourhood Structure." *AISTATS*. 2007.

Salimans, Tim, Diederik P. Kingma, and Max Welling. "Markov chain Monte Carlo and variational inference: Bridging the gap." *International Conference on Machine Learning*. 2015.

Salman, R 2012—digarchive.library.vcu.edu; Contributions To K-Means Clustering And Regression Via Classification Algorithms Sander, J., M. Ester, H.-P. Kriegel, and X. Xu. Density-Based Clustering in Spatial Databases: The Algorithm GDBSCAN and its Applications. Data Mining and Knowledge Discovery, 2(2):169-194, 1998.

Santhosh kumar, B., V. Vijayaganth, Data Clustering Using K-Means Algorithm For High Dimensional Data, International Journal of Advanced Research In Technology (ijart.org); 2(1)22-32, February 2012

Santos-Rodríguez, Raúl, et al. "Cost-sensitive learning based on Bregman divergences." *Machine Learning* 76.2-3 (2009): 271-285.

Sarwar, Badrul M., et al. "Recommender systems for large-scale e-commerce: Scalable neighborhood formation using clustering." *Proceedings of the fifth international conference on computer and information technology*. Vol. 1. 2002.

Sarwar, Badrul, et al. "Item-based collaborative filtering recommendation algorithms." *Proceedings of the 10th international conference on World Wide Web*. ACM, 2001.

SAS Institute, Inc. (1985). SAS User's Guide: Statistics, Version S Edition. SAS Institute, Inc., Cary, NC Savaresi, S. M., and D. Boley. A comparative analysis on the bisecting K-means and the PDDP clustering algorithms. Intelligent Data Analysis, 8(4):345-362, 2004.

Scaria, Aju Thalappillil, Rose Marie Philip, and Sagar V. Mehta. "Predicting Star Ratings of Movie Review Comments." (2011)

Scellier, Benjamin Franck Christophe. *Deep Neural Networks*. Diss. 2015.

Schaal, S. Atkeson, C. Robot juggling: An implementation of memory-based learning, Control Systems, 14, 57-71.

Schafer, J. Ben, et al. "Collaborative filtering recommender systems." *The adaptive web*. Springer Berlin Heidelberg, 2007. 291-324.

Scheible, Christian, and Hinrich Schütze. "Multi-Domain Sentiment Relevance Classification with Automatic Representation Learning." *EACL*. 2014.

Schifanella, Claudio, Maria Luisa Sapino, and K. Selçuk Candan. "On context-aware co-clustering with metadata support." Journal of Intelligent Information Systems 38, no. 1 (2012): 209-239.

Schlüter, Tim, and Stefan Conrad. "Hidden markov model-based time series prediction using motifs for detecting inter-time-serial correlations." In Proceedings of the 27th Annual ACM Symposium on Applied Computing, pp. 158-164. ACM, 2012.

Schmidhuber, J. Storck, J. Reinforcement driven information acquisition in nondeterministic environments, Tech report, Fakultät für Informatik, Technische Universität München.

Schohn, Greg, and David Cohn. "Less is more: Active learning with support vector machines." *ICML*. 2000.

Scholz, Matthias, and Ricardo Vigário. "Nonlinear PCA: a new hierarchical approach." *ESANN*. 2002.

Scholz, Matthias, et al. "Non-linear PCA: a missing data approach." *Bioinformatics* 21.20 (2005): 3887-3895.

Schraudolph, Nicol N. "Local gain adaptation in stochastic gradient descent." *Artificial Neural Networks*, 1999. ICANN 99. Ninth International Conference on (Conf. Publ. No. 470). Vol. 2. IET, 1999.

Seah, Chun-Wei, Ivor W. Tsang, and Yew-Soon Ong. "Transfer ordinal label learning." *IEEE transactions on neural networks and learning systems* 24.11 (2013): 1863-1876.

Seber, G. A. F. (1984). *Multivariate Observations*. Wiley, New York.

Sener, Ozan, et al. "Learning Transferrable Representations for Unsupervised Domain Adaptation." *Advances In Neural Information Processing Systems*. 2016.

Sermanet, Pierre, Koray Kavukcuoglu, and Yann LeCun. "Eblearn: Open-source energy-based learning in C++." *2009 21st IEEE International Conference on Tools with Artificial Intelligence*. IEEE, 2009.

Settles, Burr. "Active learning literature survey." University of Wisconsin, Madison 52.55-66 (2010): 11.

Seung, H. Sebastian, Manfred Opper, and Haim Sompolinsky. "Query by committee." *Proceedings of the fifth annual workshop on Computational learning theory*. ACM, 1992.

Seymour, Zachary, Yingming Li, and Zhongfei Zhang. "Multimodal Skipgram Using Convolutional Pseudowords." arXiv preprint arXiv:1511.04024 (2015).

Shamir, Ohad, and Tong Zhang. "Stochastic Gradient Descent for Non-smooth Optimization: Convergence Results and Optimal Averaging Schemes." *ICML* (1). 2013.

Sharma, Manu, et al. "Transfer Learning in Real-Time Strategy Games Using Hybrid CBR/RL." *IJCAI*. Vol. 7. 2007.

Sharma, Puneet, Srinivasa M. Salapaka, and Carolyn L. Beck. "Entropy-based framework for dynamic coverage and clustering problems." IEEE Transactions on Automatic Control 57, no. 1 (2012): 135-150.

Sheikh, Imran, et al. "LearningWord Importance with the Neural Bag-of-Words Model." *ACL, Representation Learning for NLP (Repl4NLP) workshop*. 2016.

Shen, Yelong, et al. "A Deep Embedding Model for Co-occurrence Learning." 2015 *IEEE International Conference on Data Mining Workshop (ICDMW)*. IEEE, 2015.

Shepard, R. N. and Arabie, P. (1979). Additive clustering: representation of similarities as combinations of discrete overlapping properties. *Psychological Review* 8687-123.

Shibata, R. (1981). An optimal selection of regression variables. *Biometrika* 6845-54.

Shickel, Benjamin, et al. "Self-Reflective Sentiment Analysis." Proceedings of the 3rd Workshop on Computational Linguistics and Clinical Psychology: From Linguistic Signal to Clinical Reality, pages 23-32, San Diego, California, Jun. 16, 2016.

Shu, Le. *Graph and Subspace Learning for Domain Adaptation*. Diss. Temple University, 2015.

Shu, Xiangbo, et al. "Weakly-shared deep transfer networks for heterogeneous-domain knowledge propagation." *Proceedings of the 23rd ACM international conference on Multimedia*. ACM, 2015.

Sibson, R. (1973). SLINK: An optimally efficient algorithm for single-link cluster methods. *Computer Journal* 1630-34.

Siddiqui, Muazzam Ahmed. "An empirical evaluation of text classification and feature selection methods." *Artificial Intelligence Research* 5.2 (2016): p 70.

Siegel, J. H., Goldwyn, R. M., and Friedman, H. P. (1971). Pattern and process in the evolution of human septic shock. *Surgery* 70232-245.

Silverman, B. W. (1986). *Density Estimation for Statistics and Data Analysis*. Chapman and Hall, London.

Singh, Ajit P. *Efficient matrix models for relational learning*. No. CMU-ML-09-111. Carnegie-Mellon Univ Pittsburgh Pa Machine Learning Dept, 2009.

Singh, Ajit P., and Geoffrey J. Gordon. "A unified view of matrix factorization models." *Joint European Conference on Machine Learning and Knowledge Discovery in Databases*. Springer Berlin Heidelberg, 2008.

Singh, Ajit P., and Geoffrey J. Gordon. "Relational learning via collective matrix factorization." *Proceedings of the 14th ACM SIGKDD international conference on Knowledge discovery and data mining*. ACM, 2008.

Singh, Ritambhara, et al. "Transfer String Kernel for Cross-Context DNA-Protein Binding Prediction." *IEEE/ACM Transactions on Computational Biology and Bioinformatics* (2016).

Sironi, U C A unige.ch; Bond Trading, Market Anomalies And Neural Networks: An Analysis With Kohonen Nets Slavakis, Konstantinos, et al. "Stochastic approximation vis-a-vis online learning for big data analytics [lecture notes]." *IEEE Signal Processing Magazine* 31.6 (2014): 124-129.

Smythe, R. T. and Wierman, J. C. (1978). First passage percolation on the square lattice. *Lecture Notes in Mathematics* 671. Springer-Verlag, Berlin.

Sneath, P. H. A. and Sokal, R. R. (1973). *Numerical Taxonomy*. Freeman, San Francisco.

Snijders, Tom A B. "Markov chain Monte Carlo estimation of exponential random graph models." *Journal of Social Structure* 3.2 (2002): 1-40.

Sobhani, Amin. *P300 classification using deep belief nets*. Diss. Colorado State University. Libraries, 2007.

Socher, R.; Pennington, J.; Huang, E. H.; Ng, A. Y.; and Manning, C. D. 2011. Semi-supervised recursive autoencoders for predicting sentiment distributions. In *Proceedings of the 2011 Conference on Empirical Methods in Natural Language Processing, EMNLP 2011, 27-31 Jul. 2011, John McIntyre Conference Centre, Edinburgh, UK, A meeting of SIGDAT, a Special Interest Group of the ACL*, 151-161.

Socher, Richard, et al. "Recursive deep models for semantic compositionality over a sentiment treebank." *Proceedings of the conference on empirical methods in natural language processing (EMNLP)*. Vol. 1631. 2013.

Sohn, Kihyuk, and Honglak Lee. "Learning invariant representations with local transformations." *arXiv preprint arXiv:1206.6418* (2012).

Sokal, R. R. (1974). Classification: purposes, principles, progress, prospects. *Science* 185 1115-1123.

Sokolova, Marina, and David Schramm. "Building a Patient-based Ontology for User-written Web Messages." *RANLP*. 2011.

Song, J., Tang, S., Xiao, J., Wu, F., & Zhang, Z. M. (2016). LSTM-in-LSTM for generating long descriptions of images. *Computational Visual Media*, 2(4), 379-388.

Song, Sanming, et al. "Local Autoencoding for Parameter Estimation in a Hidden Potts-Markov Random Field." *IEEE Transactions on Image Processing* 25.5 (2016): 2324-2336.

Späth, H., Cluster Analysis Algorithms for Data Reduction and Classification of Objects, volume 4 of Computers and Their Application. Ellis Horwood Publishers, Chichester, 1980. ISBN 0-85312-141-9.

Specht, D. A general regression neural network, IEEE Trans. Neural Networks, 2(6), 568-576.

SPSS, INC. (1986). SPSSX (a computer program). McGraw-Hill, New York.

Sra, Suvrit, Stefanie Jegelka, and Arindam Banerjee. *Approximation algorithms for Bregman clustering, co-clustering and tensor clustering*. Vol. 7. Technical Report 177, MPI for Biological Cybernetics, 2008.

Sra, Suvrit. "Positive definite matrices and the S-divergence." *Proceedings of the American Mathematical Society* 144.7 (2016): 2787-2797.

Srebro, Nathan, and Ruslan R. Salakhutdinov. "Collaborative filtering in a non-uniform world: Learning with the weighted trace norm." *Advances in Neural Information Processing Systems*. 2010.

Srivastava, N.; Hinton, G. E.; Krizhevsky, A.; Sutskever, I.; and Salakhutdinov, R. 2014. Dropout: a simple way to prevent neural networks from overfitting. *Journal of Machine Learning Research* 15(1):1929-1958.

Srivastava, Nitish, and Ruslan Salakhutdinov. "Learning representations for multimodal data with deep belief nets." *International conference on machine learning workshop*. 2012.

Stahl, Frederic, and Ivan Jordanov. "An overview of the use of neural networks for data mining tasks." *Wiley Interdisciplinary Reviews: Data Mining and Knowledge Discovery* 2, no. 3 (2012): 193-208.

Stasis, Spyridon, Ryan Stables, and Jason Hockman. "Semantically Controlled Adaptive Equalisation in Reduced Dimensionality Parameter Space." *Applied Sciences* 6.4 (2016): 116.

Stein, C. (1956). Inadmissibility of the usual estimator for the mean of a multivariate normal distribution. *Third Berkeley Symp. Math. Statist. Prob.* 1 197-206.

Steinbach, M., G. Karypis, and V. Kumar. A Comparison of Document Clustering Techniques. In Proc. of KDD Workshop on Text Mining, Proc. of the 6th Intl. Conf. on Knowledge Discovery and Data Mining, Boston, MA, August 2000.

Stock, Michiel, et al. "Efficient Pairwise Learning Using Kernel Ridge Regression: an Exact Two-Step Method." *arXiv preprint arXiv:1606.04275* (2016).

Stone, C. J. (1977). Consistent nonparametric regression (with discussion). *Ann. Statist.* 5595-645.

Stone, M. (1977). Cross-validation: a review. *Math. Operationforsch. Statist. Ser. Statist.* 9 127-139.

Stowell, Dan, and Richard E. Turner. "Denoising without access to clean data using a partitioned autoencoder." *arXiv preprint arXiv:1509.05982* (2015).

Stražar, Martin, and Tomaž Curk. "Learning the kernel matrix via predictive low-rank approximations." *arXiv preprint arXiv:1601.04366* (2016).

Streib, A P 2012—aco.gatech.edu; Markov Chains At The Interface Of Combinatorics, Computing, And Statistical Physics Su, Xiaoyuan, and Taghi M. Khoshgoftaar. "A survey of collaborative filtering techniques." *Advances in artificial intelligence* 2009 (2009): 4.

Su, Yu, and Frédéric Jurie. "Improving image classification using semantic attributes." International journal of computer vision 100, no. 1 (2012): 59-77.

Sugiyama, Masashi, Taiji Suzuki, and Takafumi Kanamori. *Density ratio estimation in machine learning.* Cambridge University Press, 2012.

Sun, Fan, et al. "Evaluation of LibSVM and mutual information matching classifiers for multi-domain sentiment analysis." *The 23rd Irish Conference on Artificial Intelligence and Cognitive Science,* Dublin City University: Computer Science Research Institute. 2012.

Sun, Miao, et al. "Cross-domain sentiment classification using deep learning approach." 2014 *IEEE 3rd International Conference on Cloud Computing and Intelligence Systems.* IEEE, 2014.

Sun, Shiliang. "A review of deterministic approximate inference techniques for Bayesian machine learning." *Neural Computing and Applications* 23.7-8 (2013): 2039-2050.

Sundaram, Hari, Yu-Ru Lin, Munmun De Choudhury, and Aisling Kelliher. "Understanding community dynamics in online social networks: a multidisciplinary review." IEEE Signal Processing Magazine 29, no. 2 (2012): 33-40.

Swamy, G. M., P. McGeer, R. Brayton, In the Proceedings of the International Workshop on Logic Synthesis, Tahoe CA, May 1993 "A Fully Implicit Quine-McClusky Procedure using BDDs".

Swamy, G. M., S. Edwards, R. Brayton, In the Proceedings of the IEEE International Conference on VLSI Design, Hyderabad, January 1998. "Efficient Verification and Synthesis using Design Commonalities".

Swamy, Gitanjali, R, Brayton, ISBN:0-591-32212-9, University of California, Berkeley, 1996 Incremental methods for formal verification and logic synthesis".

Takács, Gábor, et al. "Scalable collaborative filtering approaches for large recommender systems." *Journal of machine learning research* 10. March (2009): 623-656.

Tang, Duyu, Bing Qin, and Ting Liu. "Document modeling with gated recurrent neural network for sentiment classification." *Proceedings of the 2015 Conference on Empirical Methods in Natural Language Processing.* 2015.

Tang, Duyu, Bing Qin, and Ting Liu. "Learning semantic representations of users and products for document level sentiment classification." *Proc. ACL.* 2015.

Tang, Jian, Meng Qu, and Qiaozhu Mei. "Pte: Predictive text embedding through large-scale heterogeneous text networks." *Proceedings of the 21th ACM SIGKDD International Conference on Knowledge Discovery and Data Mining.* ACM, 2015.

Tarter, M. and Kronmal, R. (1970). On multivariate density estimates based on orthogonal expansions. *Ann. Math. Statist.* 4 718-722.

Taylor, Matthew E., and Peter Stone. "Transfer learning for reinforcement learning domains: A survey." *Journal of Machine Learning Research* 10. July (2009): 1633-1685.

Teh, Yee Whye. *Bethe free energy and contrastive divergence approximations for undirected graphical models.* Diss. University of Toronto, 2003.

Tejwani, Rahul. "Sentiment Analysis: A Survey." *arXiv preprint arXiv:*1405.2584 (2014).

Thalmann, Daniel, Hemsoo Hahn, and Nuno Correia. "ICIG 2013."

Thibodeau-Laufer, Eric, and Jason Yosinski. "Deep Generative Stochastic Networks Trainable by Backprop."

Thönnes, Elke. "Markov chain Monte Carlo (MCMC)." (2003).

Thrun, S. Möller, K. Active exploration in dynamic environments, In Moody, J., Hanson, S., Lippmann, R., Advances in Neural Information Processing Systems 4. Morgan Kaufmann.

Thuett, J., Cornfield, J. and Kannel, W. (1967). A multivariate analysis of the risk of coronary heart disease in Framingham. *J of Chronic Diseases* 20511-524.

Thyon, R. C. (1939). *Cluster Analysis.* edwards Brothers, Ann Arbor, MI

Tian, Ran, Naoaki Okazaki, and Kentaro Inui. "The Mechanism of Additive Composition." *arXiv preprint arXiv:* 1511.08407 (2015).

Tian, YingLi, and Tony Ro. "Deep Learning Models for Multimodal Sensing and Processing: A Survey."

Tidke, B. A., R. G. Mehta, and D. P. Rana. "A novel approach for high dimensional data clustering." Int J Eng Sci Adv Technology 2, no. 3 (2012): 645-51.

Tieleman, Tijmen, and Geoffrey Hinton. "Using fast weights to improve persistent contrastive divergence." *Proceedings of the 26th Annual International Conference on Machine Learning.* ACM, 2009.

Tilak, Gayatri, Tamás Széll, Rémy Chicheportiche, and Anirban Chakraborti. "Study of statistical correlations in intraday and daily financial return time series." In Econophysics of Systemic Risk and Network Dynamics, pp. 77-104. Springer Milan, 2013.

Titterington, D., Smith, A., Makov, U. Statistical Analysis of Finite Mixture Distributions. Wiley.

Toh, Zhiqiang, and Jian Su. "NLANGP at SemEval-2016 Task 5: Improving Aspect Based Sentiment Analysis using Neural Network Features." *Proceedings of SemEval* (2016): 282-288.

Toh, Zhiqiang, and Jian Su. "Nlangp: Supervised machine learning system for aspect category classification and opinion target extraction." (2015).

Toh, Zhiqiang, and Wenting Wang. "Dlirec: Aspect term extraction and term polarity classification system." *Proceedings of the 8th International Workshop on Semantic Evaluation (SemEval 2014).* 2014.

Tong, Simon, and Daphne Koller. "Support vector machine active learning with applications to text classification." *Journal of machine learning research* 2. November (2001): 45-66.

Torkamani, Mohamad Ali. "Adversarial Structured Output Prediction." (2014).

Toussaint, G. T. (1974). Bibliography on estimation of misclassification. *IEEE Transactions on Information Theory* IT-20 472A79.

Treerattanapitak, Kiatichai, and Chuleerat Jaruskulchai. "Exponential fuzzy C-means for collaborative filtering." Journal of Computer Science and Technology 27, no. 3 (2012): 567-576.

Tsai, Kun Hua, et al. "A learning objects recommendation model based on the preference and ontological approaches." *Sixth IEEE International Conference on Advanced Learning Technologies (ICALT'06).* IEEE, 2006.

Tsuruoka, Yoshimasa, Jun'ichi Tsujii, and Sophia Ananiadou. "Stochastic gradient descent training for 11-regularized log-linear models with cumulative penalty." *Proceedings of the Joint Conference of the 47th Annual Meeting of the ACL and the 4th International Joint Conference on Natural Language Processing of the AFNLP: Volume 1—Volume 1.* Association for Computational Linguistics, 2009.

Tu, Chunhao, Shuo Jiao, and Woon Yuen Koh. "Comparison of clustering algorithms on generalized propensity score in observational studies: a simulation study." Journal of Statistical Computation and Simulation 83, no. 12 (2013): 2206-2218.

Turney, P. D., and Pantel, P. 2010. From frequency to meaning: Vector space models of semantics. *J. Artif. Intell. Res. (JAIR)* 37:141-188.

Udell, Madeleine, et al. "Generalized low rank models." *arXiv preprint arXiv:*1410.0342 (2014).

Van Giessen, A, 2012 repository.tudelft.nl; Dimension Reduction Methods for Classification.

Vandic, Damir, Jan-Willem Van Dam, and Flavius Frasincar. "Faceted product search powered by the Semantic Web." Decision Support Systems 53, no. 3 (2012): 425-437.

Vapnik, V. N. and Chervonenkis, A. Y A. (1971). On the uniform convergence of relative frequencies of events to their probabilities. *Theor. Prob. Appl.* 16264-280.

Vapnik, V. N. and Chervonenkis, A. Y A. (1974). *Theory of Pattern Recognition* (in Russian). Nauka, Moscow.

Vasconcelos, Cristina Nader, Vinicius Jardim, Asla Sá, and Paulo Cezar Carvalho. "Photo tagging by collection-aware people recognition." Institute of Computing, Brasil (2012).

Vasileios, E, 2012 ics.forth.gr; A real-time semantics-aware activity recognition system Veldman, D. J. (1967). *FORTRAN Programming for the Behavioral Sciences*. Holt, Rinehart and Winston, New York.

Vincent, P.; Larochelle, H.; Bengio, Y.; and Manzagol, P. 2008. Extracting and composing robust features with denoising autoencoders. In *Machine Learning, Proceedings of the Twenty-Fifth International Conference (ICML 2008)*, Helsinki, Finland, Jun. 5-9, 2008, 1096-1103.

Vincent, Pascal, et al. "Extracting and composing robust features with denoising autoencoders." *Proceedings of the 25th international conference on Machine learning*. ACM, 2008.

Vincent, Pascal, et al. "Stacked denoising autoencoders: Learning useful representations in a deep network with a local denoising criterion." *Journal of Machine Learning Research* 11. December (2010): 3371-3408.

Vincent, Pascal. "A connection between score matching and denoising autoencoders." *Neural computation* 23.7 (2011): 1661-1674.

Vinodhini, G., and R. M. Chandrasekaran. "Sentiment analysis and opinion mining: a survey." *International Journal* 2.6 (2012).

Vlachos, Michail, and Daniel Svonava. "Recommendation and visualization of similar movies using minimum spanning dendrograms." Information Visualization 12, no. 1 (2013): 85-101.

Volkovich, Zeev, Dvora Toledano-Kitai, and G-W. Weber. "Self-learning K-means clustering: a global optimization approach." Journal of Global Optimization (2013): 1-14.

Volkovich, Zeev, Gerhard-Wilhelm Weber, Renata Avros, and Orly Yahalom. "On an adjacency cluster merit approach." International Journal of Operational Research 13, no. 3 (2012): 239-255.

Vrijenhoek, R. C., Douglas, M. E., and Meffe, G. K-(1985). Conservation genetics of endangered fish populations in Arizona. *Science* 229 100-402.

Vucetic, Slobodan, and Zoran Obradovic. "Collaborative filtering using a regression-based approach." *Knowledge and Information Systems* 7.1 (2005): 1-22.

Wager, S.; Wang, S. I.; and Liang, P. 2013. Dropout training as adaptive regularization. In *Advances in Neural Information Processing Systems 26: 27th Annual Conference on Neural Information Processing Systems 2013. Proceedings of a meeting held Dec.* 5-8, 2013, Lake Tahoe, Nevada, United States., 351-359.

Wald, A. (1944). On a statistical problem arising in the classification of an individual into one of two groups. *Ann. Math. Statist.* 15145-162.

Walker, S. B. and Duncan, D. B. (1967). Estimation of the probability of an event as a function of several independent variables. *Biometrika* 54 167-179.

Wan, Chin Heng, Lam Hong Lee, Rajprasad Rajkumar, and Dino Isa. "A hybrid text classification approach with low dependency on parameter by integrating K-nearest neighbor and support vector machine." Expert Systems with Applications 39, no. 15 (2012): 11880-11888.

Wang, Baohua, and Xiaolong Wang. "Deceptive financial reporting detection: a hierarchical clustering approach based on linguistic features." Procedia Engineering 29 (2012): 3392-3396.

Wang, Baiyang, and Diego Klabjan. "Regularization for Unsupervised Deep Neural Nets." *arXiv preprint arXiv:* 1608.04426 (2016).

Wang, Fei, Tao Li, and Changshui Zhang. "Semi-Supervised Clustering via Matrix Factorization." *SDM*. 2008.

Wang, Hao, Xingjian Shi, and Dit-Yan Yeung. "Relational Stacked Denoising Autoencoder for Tag Recommendation." *AAAI*. 2015.

Wang, Jinlong, Shunyao Wu, and Gang Li. "Clustering with instance and attribute level side information." International Journal of Computational Intelligence Systems 3, no. 6 (2010): 770-785.

Wang, Jindong. "Introduction to Transfer Learning." (2016).

Wang, Liming, et al. "A Bregman matrix and the gradient of mutual information for vector Poisson and Gaussian channels." IEEE Transactions on Information Theory 60.5 (2014): 2611-2629.

Wang, Liming, et al. "Information-Theoretic Compressive Measurement Design." (2016).

Wang, Naiyan, and Dit-Yan Yeung. "Learning a deep compact image representation for visual tracking." *Advances in neural information processing systems*. 2013.

Wang, Shuhui, et al. "Multi-feature metric learning with knowledge transfer among semantics and social tagging." *Computer Vision and Pattern Recognition (CVPR), 2012 IEEE Conference on*. IEEE, 2012.

Wang, Sida, and Christopher D. Manning. "Baselines and bigrams: Simple, good sentiment and topic classification." *Proceedings of the 50th Annual Meeting of the Association for Computational Linguistics: Short Papers—Volume* 2. Association for Computational Linguistics, 2012.

Wang, Sida, and Christopher D. Manning. "Fast "dropout" training for logistic regression." *NIPS workshop on log-linear models*. 2012.

Wang, Tian, and Kyunghyun Cho. "Larger-Context Language Modelling." *arXiv preprint arXiv:*1511.03729 (2015).

Wang, Yiren, and Fei Tian. "Recurrent Residual Learning for Sequence Classification." Proceedings of the 2016 Conference on Empirical Methods in Natural Language Processing, pages 938-943, Austin, Texas, Nov. 1-5, 2016.

Wang, Ziqiang, Xia Sun, and Xu Qian. "Efficient Kernel Discriminative Geometry Preserving Projection for Document Classification." Przegląd Elektrotechniczny 88, no. 5b (2012): 56-59.

Watanabe, Kazuho, Masato Okada, and Kazushi Ikeda. "Divergence measures and a general framework for local variational approximation." *Neural Networks* 24.10 (2011): 1102-1109.

Watve, A 2012—cse.msu.edu; Data Transformation For Improved Query Performance

Weisberg, S. Applied Linear Regression. Wiley.

Weiss, Karl, Taghi M. Khoshgoftaar, and DingDing Wang. "A survey of transfer learning." *Journal of Big Data* 3.1 (2016): 1-40.

Weiss, Karl, Taghi M. Khoshgoftaar, and DingDing Wang. "Transfer Learning Techniques." *Big Data Technologies and Applications*. Springer International Publishing, 2016. 53-99.

Welling, Max, et al. "Bayesian inference & Big Data: a snapshot from a workshop." *ISBA Bull* 21.4 (2014): 8-11.

Weston, Jason, et al. "Deep learning via semi-supervised embedding." *Neural Networks: Tricks of the Trade*. Springer Berlin Heidelberg, 2012. 639-655.

Whitehead, S. A study of cooperative mechanisms for faster reinforcement learning, Technical report CS-365, University of Rochester, Rochester, NY Wishart, D. (1969). Mode Analysis: A generalization of nearest neighbor which reduces chaining effects in *Numerical Taxonomy*, (A. J. Cole, ed.), Academic Press, London.

Wolfe, J. H. (1970). Pattern clustering by multivariate mixture analysis. *Multivariate Behavioral Research S* 329-350.

Wolfe, J. H. (1971). A Monte-Carlo study of the sampling distribution of the likelihood ratio for mixtures of multinormal distributions. *Research Memorandum* 72-2, Naval Personnel and Research Training Laboratory, San Diego.

Wu, Dongrui, Brent J. Lance, and Thomas D. Parsons. "Collaborative filtering for brain-computer interaction using transfer learning and active class selection." *PloS one* 8.2 (2013): e56624.

Wu, F., Jiang, X., Li, X., Tang, S., Lu, W., Zhang, Z., & Zhuang, Y. (2015). Cross-modal learning to rank via latent joint representation. *IEEE Transactions on Image Processing*, 24(5), 1497-1509.

Wu, F., Lu, X., Song, J., Yan, S., Zhang, Z. M., Rui, Y., & Zhuang, Y. (2016). Learning of Multimodal Representations With Random Walks on the Click Graph. *IEEE Transactions on Image Processing*, 25(2), 630-642.

Wu, F., Wang, Z., Zhang, Z., Yang, Y., Luo, J., Zhu, W., & Zhuang, Y. (2015). Weakly Semi-Supervised Deep Learning for Multi-Label Image Annotation. *IEEE Transactions on Big Data*, 1(3), 109-122.

Wu, H. C., Robert W P Luk, Kam-Fai Wong, and Jian-Yun Nie. "A split-list approach for relevance feedback in information retrieval." Information Processing & Management 48, no. 5 (2012): 969-977.

Wu, Ke, et al. "Text window denoising autoencoder: building deep architecture for Chinese word segmentation." *Natural Language Processing and Chinese Computing*. Springer Berlin Heidelberg, 2013. 1-12.

Wu, Lei, et al. "Learning Bregman distance functions and its application for semi-supervised clustering." *Advances in neural information processing systems*. 2009.

Wu, Pengcheng, et al. "Online multimodal deep similarity learning with application to image retrieval." *Proceedings of the 21st ACM international conference on Multimedia*. ACM, 2013.

Xia, Rui, and Chengqing Zong. "A POS-based Ensemble Model for Cross-domain Sentiment Classification." *IJCNLP.* 2011.

Xia, Rui, Chengqing Zong, and Shoushan Li. "Ensemble of feature sets and classification algorithms for sentiment classification." *Information Sciences* 181.6 (2011): 1138-1152.

Xia, Rui, et al. "Dual Training and Dual Prediction for Polarity Classification." *ACL* (2). 2013.

Xia, Rui, et al. "Instance Selection and Instance Weighting for Cross-Domain Sentiment Classification via PU Learning." *IJCAI.* 2013.

Xia, Rui, et al. "Instance-Based Domain Adaptation in NLP via In-Target-Domain Logistic Approximation." *AAAI.* 2014.

Xia, Rui, et al. "Modeling gender information for emotion recognition using denoising autoencoder." 2014 *IEEE International Conference on Acoustics, Speech and Signal Processing (ICASSP).* IEEE, 2014.

Xie, Chenhao, et al. "Cross-Site Virtual Social Network Construction." 2015 *IEEE International Conference on Data Mining Workshop (ICDMW).* IEEE, 2015.

Xu, Rui, Jie Xu, and Donald C. Wunsch. "A comparison study of validity indices on swarm-intelligence-based clustering." IEEE Transactions on Systems, Man, and Cybernetics, Part B (Cybernetics) 42, no. 4 (2012): 1243-1256.

Xu, W.; Liu, X.; and Gong, Y. 2003. Document clustering based on non-negative matrix factorization. In *SIGIR 2003: Proceedings of the 26th Annual International ACM SIGIR Conference on Research and Development in Information Retrieval*, Jul. 28-Aug. 1, 2003, Toronto, Canada, 267-273.

Xu, Yi, et al. "Convex Approximation to the Integral Mixture Models Using Step Functions." *Data Mining (ICDM), 2015 IEEE International Conference on.* IEEE, 2015.

Xu, Zhixiang Eddie, et al. "From sBoW to dCoT marginalized encoders for text representation." *Proceedings of the 21st ACM international conference on information and knowledge management*. ACM, 2012.

Xue, Gui-Rong, et al. "Scalable collaborative filtering using cluster-based smoothing." *Proceedings of the 28th annual international ACM SIGIR conference on Research and development in information retrieval*. ACM, 2005.

Yanagimoto, Hidekazu, Mika Shimada, and Akane Yoshimura. "Document similarity estimation for sentiment analysis using neural network." *Computer and Information Science (ICIS), 2013 IEEE/ACIS 12th International Conference on*. IEEE, 2013.

Yang, D 2012—wpi.edu; Mining and Managing Neighbor-Based Patterns in Data Streams Yang, Min, et al. "LCCT: a semisupervised model for sentiment classification." *Human Language Technologies: The 2015 Annual Conference of the North American Chapter of the ACL*. Association for Computational Linguistics (ACL)., 2015.

Yang, Yi, and Jacob Eisenstein. "Fast Easy Unsupervised Domain Adaptation with Marginalized Structured Dropout." *ACL* (2). 2014.

Yang, Ziheng, and Bruce Rannala. "Bayesian phylogenetic inference using DNA sequences: a Markov Chain Monte Carlo method." *Molecular biology and evolution* 14.7 (1997): 717-724.

Yao, Li, et al. "On the equivalence between deep nade and generative stochastic networks." *Joint European Conference on Machine Learning and Knowledge Discovery in Databases*. Springer Berlin Heidelberg, 2014.

Yessenalina, Ainur, Yejin Choi, and Claire Cardie. "Automatically generating annotator rationales to improve sentiment classification." *Proceedings of the ACL 2010 Conference Short Papers*. Association for Computational Linguistics, 2010.

Yildiz, Izzet B., Katharina von Kriegstein, and Stefan J. Kiebel. "From birdsong to human speech recognition: Bayesian inference on a hierarchy of nonlinear dynamical systems." *PLoS Comput Biol* 9.9 (2013): e1003219.

Yilmaz, Yusuf Kenan. *Generalized tensor factorization.* Diss. Bogaziçi University, 2012.

Yin, Wotao. "Analysis and generalizations of the linearized Bregman method." *SIAM Journal on Imaging Sciences* 3.4 (2010): 856-877.

Yogatama, Dani, and Noah A. Smith. "Bayesian optimization of text representations." *arXiv preprint arXiv:* 1503.00693 (2015).

Yogatama, Dani, and Noah A. Smith. "Making the Most of Bag of Words: Sentence Regularization with Alternating Direction Method of Multipliers." *ICML.* 2014.

Yoshii, Kazuyoshi, et al. "Infinite Positive Semidefinite Tensor Factorization for Source Separation of Mixture Signals." *ICML* (3). 2013.

Yu, Hongkun, et al. "Data-Driven Contextual Valence Shifter Quantification for Multi-Theme Sentiment Analysis." *Proceedings of the 25th ACM International on Conference on Information and Knowledge Management.* ACM, 2016.

Yu, Hongliang, Zhi-Hong Deng, and Shiyingxue Li. "Identifying Sentiment Words Using an Optimization-based Model without Seed Words." *ACL* (2). 2013.

Yu, Kai, Anton Schwaighofer, and Volker Tresp. "Collaborative ensemble learning: Combining collaborative and content-based information filtering via hierarchical Bayes." *Proceedings of the Nineteenth conference on Uncertainty in Artificial Intelligence.* Morgan Kaufmann Publishers Inc., 2002.

Yu, Kai, et al. "Probabilistic memory-based collaborative filtering." *IEEE Transactions on Knowledge and Data Engineering* 16.1 (2004): 56-69.

Yu, S., Li, X., Zhao, X., Zhang, Z., & Wu, F. (2015). Tracking news article evolution by dense subgraph learning. *Neurocomputing,* 168, 1076-1084.

Zahn, C. T., Graph-Theoretical Methods for Detecting and Describing Gestalt Clusters. IEEE Transactions on Computers, C-20(1):68-86, January 1971.

Zhai, S. (2015). Manifold Regularized Discriminative Neural Networks. *arXiv preprint arXiv:*1511.06328.

Zhai, S., & Zhang, Z. (2015). Dropout Training of Matrix Factorization and Autoencoder for Link Prediction in Sparse Graphs. *arXiv preprint arXiv:*1512.04483.

Zhai, Shuangfei, and Zhongfei Zhang. "Semisupervised Autoencoder for Sentiment Analysis." *arXiv preprint arXiv:*1512.04466 (2015).

Zhai, Shuangfei, et al. "Doubly Convolutional Neural Networks." *Advances In Neural Information Processing Systems.* 2016.

Zhai, Shuangfei, et al. "Generative Adversarial Networks as Variational Training of Energy Based Models." *arXiv preprint arXiv:*1611.01799 (2016).

Zhai, Shuangfei, et al. "S3Pool: Pooling with Stochastic Spatial Sampling." *arXiv preprint arXiv:*1611.05138 (2016).

Zhang, B., M. Hsu, and U. Dayal. K-Harmonic Means—A Data Clustering Algorithm. Technical Report HPL-1999-124, Hewlett Packard Laboratories, Oct. 29, 1999.

Zhang, Pengjing, et al. "A Deep Neural Network for Modeling Music." *Proceedings of the 5th ACM on International Conference on Multimedia Retrieval.* ACM, 2015.

Zhang, Tong. "Solving large scale linear prediction problems using stochastic gradient descent algorithms." *Proceedings of the twenty-first international conference on Machine learning.* ACM, 2004.

Zhang, Xi, et al. "Learning from Synthetic Data Using a Stacked Multichannel Autoencoder." 2015 *IEEE 14th International Conference on Machine Learning and Applications (ICMLA).* IEEE, 2015.

Zhang, Xiang, and Yann LeCun. "Universum Prescription: Regularization using Unlabeled Data." *arXiv preprint arXiv:*1511.03719 (2015).

Zhang, Xiao. "Rademacher Complexity of the Restricted Boltzmann Machine." *arXiv preprint arXiv:*1512.01914 (2015).

Zhang, Xiao-Lei, and Ji Wu. "Deep belief networks based voice activity detection." *IEEE Transactions on Audio, Speech, and Language Processing* 21.4 (2013): 697-710.

Zhang, Y 2012 cs.cmu.edu; Learning with Limited Supervision by Input and Output Coding Zhang, Yu, Bin Cao, and Dit-Yan Yeung. "Multi-domain collaborative filtering." *arXiv preprint arXiv:*1203.3535 (2012).

Zhao, Junbo, Michael Mathieu, and Yann LeCun. "Energy-based Generative Adversarial Network." *arXiv preprint arXiv:*1609.03126 (2016).

Zhao, Rui, and Kezhi Mao. "Cyberbullying Detection based on Semantic-Enhanced Marginalized Denoising Auto-Encoder."

Zhao, X., Li, X., & Zhang, Z. (2015). Joint Structural Learning to Rank with Deep Linear Feature Learning. *IEEE Transactions on Knowledge and Data Engineering,* 27(10), 2756-2769.

Zhao, X., Li, X., Zhang, Z., Shen, C., Zhuang, Y., Gao, L., & Li, X. (2015). Scalable Linear Visual Feature Learning via Online Parallel Nonnegative Matrix Factorization.

Zhao, X., Zhang, C., & Zhang, Z. (2015). Distributed cross-media multiple binary subspace learning. *International Journal of Multimedia Information Retrieval,* 4(2), 153-164.

Zhao, Y. and G. Karypis. Empirical and theoretical comparisons of selected criterion functions for document clustering. Machine Learning, 55(3):311-331, 2004.

Zheng, Hai-Tao, and Yong Jiang. "Towards group behavioral reason mining." Expert Systems with Applications 39, no. 16 (2012): 12671-12682.

Zheng, Yu. "Methodologies for cross-domain data fusion: An overview." *IEEE transactions on big data* 1.1 (2015): 16-34.

Zhou, Guangyou, Tingting He, and Jun Zhao. "Bridging the language gap: Learning distributed semantics for cross-lingual sentiment classification." *Natural Language Processing and Chinese Computing.* Springer Berlin Heidelberg, 2014. 138-149.

Zhou, Guanyu, Kihyuk Sohn, and Honglak Lee. "Online incremental feature learning with denoising autoencoders." *Ann Arbor* 1001 (2012): 48109.

Zhou, Guo-Bing, et al. "Minimal gated unit for recurrent neural networks." *International Journal of Automation and Computing* 13.3 (2016): 226-234.

Zhou, Huiwei, et al. "Learning bilingual sentiment word embeddings for cross-language sentiment classification." ACL, 2015.

Zhou, Huiwei, Long Chen, and Degen Huang. "Cross-Lingual Sentiment Classification Based on Denoising Autoencoder." *Natural Language Processing and Chinese Computing.* Springer Berlin Heidelberg, 2014. 181-192.

Zhou, X 2012—gradworks.umi.com; Learning functions on unknown manifolds

Zhou, Xiang-Dong, Cheng-Lin Liu, and Masaki Nakagawa. "Online handwritten Japanese character string recognition using conditional random fields." 2009 10*th International Conference on Document Analysis and Recognition*. IEEE, 2009.

Zhou, Yun, Timothy M. Hospedales, and Norman Fenton. "When and where to transfer for Bayesian network parameter learning." *Expert Systems with Applications* 55 (2016): 361-373.

Zhu, Jun, Ning Chen, and Eric P. Xing. "Bayesian inference with posterior regularization and applications to infinite latent SVMs." *Journal of Machine Learning Research* 15.1 (2014): 1799-1847.

Zhu, Xiaofeng, et al. "Multi-view classification for identification of Alzheimer's disease." *International Workshop on Machine Learning in Medical Imaging*. Springer International Publishing, 2015.

Zhuang, Y., Gao, H., Wu, F., Tang, S., Zhang, Y., & Zhang, Z. (2015). Probabilistic Word Selection via Topic Modeling. *IEEE Transactions on Knowledge and Data Engineering*, 27(6), 1643-1655.

Zinkevich, Martin, et al. "Parallelized stochastic gradient descent." *Advances in neural information processing systems*. 2010.

Ziser, Yftah, and Roi Reichart. "Neural Structural Correspondence Learning for Domain Adaptation." *arXiv preprint arXiv:*1610.01588 (2016).

Zuccolotto, P AStA Advances in Statistical Analysis, 2012—Springer; Principal component analysis with interval imputed missing values Zuo, Hua, et al. "Feature Spaces-based Transfer Learning." (2015).

ai.stanford.edu/amaas/data/sentiment/
en.wikipedia.org/wiki/Hinge_loss;
en.wikipedia.org/wiki/Markov_chain_Monte_Carlo;
en.wikipedia.org/wiki/Support_vector_machine;
twiecki.github.io/blog/2015/11/10/mcmc-sampling/;
www.cs.columbia.edu/~kathy/cs4701/documents/jason_s-vm_tutorial.pdf;
www.cs.cornell.edu/selman/cs475/lectures/intro-mcmc-lukas.pdf;
www.cs.jhu.edu/mdredze/datasets/sentiment/
www.cs.princeton.edu/courses/archive/spr06/cos598C/papers/AndrieuFreitasDoucetJordan2003.pdf.
www.csie.ntu.edu.tw/~cjlin/papers/l2mcsvm/l2mcsvm.pdf;
www.jmlr.org/papers/volume4/steinwart03a/steinwart03a.pdf; arxiv.org/pdf/1306.0239.pdf. Silva, Pedro Henrique Lopes, and Filipe Eduardo Mata dos Santos. "Captcha Recognition."
www.mcmchandbook.net/HandbookChapter1.pdf;
www.robots.ox.ac.uk/~az/lectures/ml/lect2.pdf;
www.vlfeat.org/api/svm-advanced.html.

What is claimed is:

1. A method of modelling data, comprising:
training an objective function of a linear classifier using semisupervised learning based on a set of at least partially labelled noised semantic data, to derive a set of classifier weights corresponding to a plurality of dimensions;
approximating a marginalized loss function, based on a posterior probability distribution on the set of classifier weights of the linear classifier; and
implementing a compact classifier dependent on the marginalized loss function, for reconstructing an input with respect to the marginalized loss function, wherein the reconstructed input has a different accuracy of reconstruction selectively dependent on a respective dimension,
wherein the accuracy of reconstruction for a respective dimension is selectively dependent on a sensitivity of the linear classifier to differences in the input with respect to that respective dimension.

2. The method according to claim 1, further comprising automatically classifying unlabeled data using the compact classifier.

3. The method according to claim 1, wherein the compact classifier comprises an artificial neural network comprising a hidden layer, trained according to stochastic gradient descent training.

4. The method according to claim 1, wherein the accuracy of reconstruction for a respective dimension is selectively dependent on a sensitivity of the linear classifier to differences in the input with respect to that respective dimension.

5. The method according to claim 1, wherein the posterior probability distribution is estimated with a Laplace distribution.

6. The method according to claim 1, wherein the at least partially labelled noised semantic data comprises a bag of words.

7. The method according to claim 6, wherein each of the plurality of dimensions comprises a class label, and the different accuracy of reconstruction corresponds to weighting of words based on respective correlation with the class label.

8. The method according to claim 1, wherein the linear classifier comprises a support vector machine classifier with squared hinge loss and $l_2$ regularization.

9. The method according to claim 1, wherein low frequency discriminative semantic data is given a higher weight than high frequency nondiscriminative data.

10. The method according to claim 1, wherein the loss function comprises a Bregman divergence.

11. A system for modelling data, comprising:
an input port, configured to receive a semantic input;
an automated compact classifier configured to classify the semantic input according to a plurality of dimensions each associated with a respective class label; and
an output port, configured to communicate a set of associated class labels for the semantic input;
wherein:
the automated compact classifier is dependent on a marginalized loss function;
the marginalized loss function is based on a posterior probability distribution on a set of classifier weights of a linear classifier corresponding to the plurality of dimensions for reconstructing a semantic input;
the linear classifier is trained based on an objective function using semisupervised learning using on a set of at least partially labelled noised semantic data; and
the reconstructed semantic input has a different accuracy of reconstruction selectively dependent on a respective class label,
wherein the accuracy of reconstruction for a respective dimension is selectively dependent on a sensitivity of the linear classifier to differences in the input with respect to that respective dimension.

12. The system according to claim 11, wherein the marginalized loss function is approximated as a Bregman divergence.

13. The system according to claim 11, wherein the objective function is trained with a bag of words, and the linear classifier comprises a classifier selected from the group consisting of:

a Support Vector Machine classifier with squared hinge loss and $l_2$ regularization; and a Logistic Regression classifier.

14. The system according to claim 11, wherein the posterior probability distribution is automatically estimated using a Laplace approximation which stochastically estimates the set of classifier weights using a covariance matrix constrained to be diagonal.

15. The system according to claim 11, wherein the posterior probability distribution is automatically estimated using a Markov chain Monte Carlo method.

16. The system according to claim 11, wherein the compact classifier comprises an artificial neural network comprising a hidden layer, trained according to stochastic gradient descent training.

17. The system according to claim 11, wherein each of the plurality of dimensions comprises a class label, and the different accuracy of reconstruction corresponds to weighting of a word in the semantic input based on a respective correlation of the word with the class label, wherein a low frequency discriminative word is given a higher weight than high frequency nondiscriminative word.

18. A computer readable medium containing non-transitory instructions for controlling at least one programmable automated processor to perform a method, comprising:

instructions for receiving a semantic input;

instructions for automatically classifying the semantic input according to a plurality of dimensions each associated with a respective class label with a compact classifier comprising instructions for implementing a marginalized loss function; and instructions for communicating a set of associated class labels for the semantic input;

wherein:

the marginalized loss function is based on a posterior probability distribution on a set of classifier weights of a linear classifier corresponding to the plurality of dimensions for reconstructing a semantic input;

the linear classifier is trained based on an objective function using semisupervised learning using on a set of at least partially labelled noised semantic data; and the reconstructed semantic input has a different accuracy of reconstruction selectively dependent on a respective class label, wherein the accuracy of reconstruction for a respective dimension is selectively dependent on a sensitivity of the linear classifier to differences in the input with respect to that respective dimension.

19. The computer readable medium according to claim 18, wherein:

the marginalized loss function is approximated as a Bregman divergence;

the objective function is trained with a bag of words;

the linear classifier comprises a classifier selected from the group consisting of a Support Vector Machine classifier with squared hinge loss and $l_2$ regularization; and a Logistic Regression classifier the posterior probability distribution is automatically estimated using at least one of a Laplace approximation which stochastically estimates the set of classifier weights using a covariance matrix constrained to be diagonal, and a Markov chain Monte Carlo method.

20. The computer readable medium according to claim 18, wherein:

the compact classifier comprises an artificial neural network comprising a hidden layer; and each of the plurality of dimensions comprises a class label, and the different accuracy of reconstruction corresponds to weighting of a word in the semantic input based on a respective correlation of the word with the class label, wherein a low frequency discriminative word is given a higher weight than high frequency nondiscriminative word.

* * * * *